United States Patent
Oshima et al.

(10) Patent No.: US 11,780,973 B2
(45) Date of Patent: Oct. 10, 2023

(54) METHOD FOR PRODUCING LOW-MOLECULAR-WEIGHT POLYTETRAFLUOROETHYLENE

(71) Applicants: OSAKA UNIVERSITY, Suita (JP); DAIKIN INDUSTRIES, LTD., Osaka (JP)

(72) Inventors: Akihiro Oshima, Suita (JP); Takayuki Tanaka, Osaka (JP); Hideki Nakaya, Osaka (JP); Kazuyuki Satoh, Osaka (JP); Ryosuke Senba, Osaka (JP)

(73) Assignees: OSAKA UNIVERSITY, Osaka (JP); DAIKIN INDUSTRIES, LTD., Osaka (JP)

( * ) Notice: Subject to any disclaimer, the term of this patent is extended or adjusted under 35 U.S.C. 154(b) by 327 days.

(21) Appl. No.: 17/259,859

(22) PCT Filed: Jul. 12, 2019

(86) PCT No.: PCT/JP2019/027810
§ 371 (c)(1),
(2) Date: Jan. 12, 2021

(87) PCT Pub. No.: WO2020/013336
PCT Pub. Date: Jan. 16, 2020

(65) Prior Publication Data
US 2021/0347953 A1    Nov. 11, 2021

(30) Foreign Application Priority Data

Jul. 13, 2018  (JP) .................................. 2018-133303
Dec. 27, 2018  (JP) .................................. 2018-245039

(51) Int. Cl.
*C08J 3/28*   (2006.01)
*C08F 8/50*   (2006.01)
*C08F 114/26*   (2006.01)

(52) U.S. Cl.
CPC .................. *C08J 3/28* (2013.01); *C08F 8/50* (2013.01); *C08F 114/26* (2013.01); *C08J 2327/18* (2013.01)

(58) Field of Classification Search
CPC . C08J 3/28; C08J 2327/18; C08F 8/50; C08F 114/26
See application file for complete search history.

(56) References Cited

U.S. PATENT DOCUMENTS 4,916,198 A     4/1990  Scheve et al.
10,538,605 B2 * 1/2020  Yoshida ..................... C08J 3/28
11,326,034 B2 * 5/2022  Ikeda ................... B29C 45/0001
2019/0023818 A1  1/2019  Yoshida et al.
2019/0023856 A1  1/2019  Yoshida et al.

FOREIGN PATENT DOCUMENTS

| CN | 103172880 B | 2/2015 |
| CN | 105968247 A | 9/2016 |
| EP | 2 076 553 B1 | 8/2011 |
| JP | 47-19609 B | 6/1972 |
| JP | 10-147617 A | 6/1998 |
| JP | 2002-105124 A | 4/2002 |
| JP | 2005-154277 A | 6/2005 |
| JP | 2006-063140 A | 3/2006 |
| JP | 2007-83096 A | 4/2007 |
| WO | 2018/026012 A1 | 2/2018 |
| WO | 2018/026017 A1 | 2/2018 |

OTHER PUBLICATIONS

International Preliminary Report on Patentability (with translation of Witten Opinion) dated Jan. 19, 2021, issued by the International Bureau in application No. PCT/JP2019/027810.
Partial European Search Report dated Mar. 9, 2022 in counterpart European Application No. 19835005.0.
Oshima et al., "ESR Study on Free Radicals Trapped in Crosslinked Polytetrafluoroethylene (PTFE)", Radiation Physics and Chemistry, 1997, vol. 50., No. 6, pp. 601-606 (6 pages total).
Lunkwitz et al., "Modification of perfluorinated polymers by high-energy irradiation", Journal of Fluorine Chemistry, Jun. 2004, vol. 125, pp. 863-873 (11 pages total).
Extended European Search Report dated Jun. 10, 2022 in counterpart European Application No. 19835005.0.
Nishioka et al., "Effects of Gamma Radiation on Some Physical Properties of Polytetrafluoroethylene Resin", Journal of Applied Science, 1959, vol. II, Issue 4, pp. 114-119 (6 pages total).
International Search Report for PCT/JP2019/027810 dated Aug. 27, 2019 (PCT/ISA/210).

* cited by examiner

*Primary Examiner* — Sanza L. McClendon
(74) *Attorney, Agent, or Firm* — Sughrue Mion, PLLC

(57) ABSTRACT

Provided is a method for producing low-molecular-weight polytetrafluoroethylene which is less likely to generate C6-C14 perfluorocarboxylic acids and salts thereof. The disclosure relates to a method for producing low-molecular-weight polytetrafluoroethylene having a melt viscosity at 380° C. of $1.0 \times 10^2$ to $7.0 \times 10^5$ Pa·s. The method includes (1) irradiating high-molecular-weight polytetrafluoroethylene with radiation in a substantially oxygen-free state and decomposing the high-molecular-weight polytetrafluoroethylene into a low-molecular-weight component and (2) deactivating, in a substantially oxygen-free state, at least part of main-chain radicals and end radicals generated by the irradiation and providing the low-molecular-weight polytetrafluoroethylene.

24 Claims, 2 Drawing Sheets

METHOD FOR PRODUCING LOW-MOLECULAR-WEIGHT POLYTETRAFLUOROETHYLENE

CROSS REFERENCE TO RELATED APPLICATIONS

This application is a National Stage of International Application No. PCT/JP2019/027810 filed Jul. 12, 2019, claiming priority based on Japanese Patent Application No. 2018-133303 filed Jul. 13, 2018 and Japanese Patent Application No. 2018-245039 filed Dec. 27, 2018.

TECHNICAL FIELD

The disclosure relates to methods for producing low-molecular-weight polytetrafluoroethylene.

BACKGROUND ART

Low-molecular-weight polytetrafluoroethylene (also referred to as "polytetrafluoroethylene wax" or "polytetrafluoroethylene micropowder") having a molecular weight of several thousands to several hundreds of thousands has excellent chemical stability and a very low surface energy, as well as low fibrillatability. Thus, low-molecular-weight polytetrafluoroethylene is used as an additive for improving the smoothness and the texture of film surfaces in production of articles such as plastics, inks, cosmetics, coating materials, and greases (for example, see Patent Literature 1).

Examples of known methods for producing low-molecular-weight polytetrafluoroethylene include polymerization, radiolysis, and pyrolysis. Conventional radiolysis is commonly such that radiation is applied to high-molecular-weight polytetrafluoroethylene in the air atmosphere to provide low-molecular-weight polytetrafluoroethylene.

Also examined are methods of reducing perfluorocarboxylic acids and salts thereof that may be generated as by-products of radiolysis (for example, see Patent Literature documents 2 and 3).

CITATION LIST

Patent Literature

Patent Literature 1: JP H10-147617 A
Patent Literature 2: WO2018/026012
Patent Literature 3: WO2018/026017

SUMMARY OF INVENTION

Technical Problem

The disclosure aims to provide methods for producing low-molecular-weight polytetrafluoroethylene that are less likely to generate C6-C14 perfluorocarboxylic acids and salts thereof.

Solution to Problem

The disclosure relates to a method for producing low-molecular-weight polytetrafluoroethylene having a melt viscosity at 380° C. of $1.0 \times 10^2$ to $7.0 \times 10^5$ Pa·s, the method including: (1) irradiating high-molecular-weight polytetrafluoroethylene with radiation in a substantially oxygen-free state and decomposing the high-molecular-weight polytetrafluoroethylene into a low-molecular-weight component; and (2) deactivating, in a substantially oxygen-free state, at least part of main-chain radicals and end radicals generated by the irradiation and providing the low-molecular-weight polytetrafluoroethylene.

The disclosure also relates to a method for producing low-molecular-weight polytetrafluoroethylene having a melt viscosity at 380° C. of $1.0 \times 10^2$ to $7.0 \times 10^5$ Pa·s, the method including: (1) irradiating high-molecular-weight polytetrafluoroethylene with radiation in a substantially oxygen-free state and decomposing the high-molecular-weight polytetrafluoroethylene into a low-molecular-weight component; and (2a) warming or heating the low-molecular-weight component obtained in the step (1) at a temperature of not lower than a room temperature transition temperature (19° C. that is a $\beta_1$ dispersion temperature) of polytetrafluoroethylene in a substantially oxygen-free state and providing the low-molecular-weight polytetrafluoroethylene.

The warming or heating in the step (2a) is preferably performed at a temperature of 70° C. or higher.

The warming or heating in the step (2a) is preferably performed for 10 minutes or longer.

The disclosure also relates to a method for producing low-molecular-weight polytetrafluoroethylene having a melt viscosity at 380° C. of $1.0 \times 10^2$ to $7.0 \times 10^5$ Pa·s, the method including: (1) irradiating high-molecular-weight polytetrafluoroethylene with radiation in a substantially oxygen-free state and decomposing the high-molecular-weight polytetrafluoroethylene into a low-molecular-weight component; and (2b) maintaining the low-molecular-weight component obtained in the step (1) in a substantially oxygen-free environment for five minutes or longer and providing the low-molecular-weight polytetrafluoroethylene.

The maintaining in the step (2b) is preferably performed for 10 hours or longer.

The disclosure also relates to a method for producing low-molecular-weight polytetrafluoroethylene having a melt viscosity at 380° C. of $1.0 \times 10^2$ to $7.0 \times 10^5$ Pa·s, the method including: (1) irradiating high-molecular-weight polytetrafluoroethylene with radiation in a substantially oxygen-free state and decomposing the high-molecular-weight polytetrafluoroethylene into a low-molecular-weight component; and (2) deactivating, in a substantially oxygen-free state, at least part of main-chain radicals and end radicals generated by the irradiation and providing the low-molecular-weight polytetrafluoroethylene, the steps (1) and (2) being performed simultaneously.

The radiation in the step (1) preferably has a dose of 100 kGy or higher.

The radiation in the step (1) also preferably has a dose of 250 kGy or higher

The radiation in the step (1) also preferably has a dose of 300 kGy or higher.

The radiation in the step (1) also preferably has a dose of 100 to 1000 kGy.

The radiation in the step (1) also preferably has a dose of 150 to 750 kGy.

The radiation in the step (1) also preferably has a dose of 250 to 500 kGy.

The step (1) is preferably performed substantially in the absence of an additive.

The step (1) is also preferably performed substantially in the absence of a chain-transferable substance.

The step (1) is also preferably performed substantially in the absence of a halogen gas and an organic compound that contains at least one selected from the group consisting of a hydrogen atom and a chain-transferable halogen atom.

In the step (1), an amount of an additive is also preferably less than 0.001% by mass relative to the high-molecular-weight polytetrafluoroethylene.

In the step (1), an amount of a chain-transferable substance is also preferably less than 0.001% by mass relative to the high-molecular-weight polytetrafluoroethylene.

In the step (1), an amount of a halogen gas and an organic compound that contains at least one selected from the group consisting of a hydrogen atom and a chain-transferable halogen atom is also preferably less than 0.001% by mass relative to the high-molecular-weight polytetrafluoroethylene.

The substantially oxygen-free state is also preferably maintained during a period from start of the step (1) to completion of the step (2).

The step (1) is also preferably performed in an atmosphere having an oxygen concentration of lower than 2.0 vol %.

The step (2) is also preferably performed in an atmosphere having an oxygen concentration of lower than 2.0 vol %.

An oxygen concentration in an atmosphere is also preferably maintained at lower than 2.0 vol % during a period from start of the step (1) to completion of the step (2).

The step (1) is also preferably performed in an atmosphere having an oxygen concentration of lower than 1.0 vol %.

The step (2) is also preferably performed in an atmosphere having an oxygen concentration of lower than 1.0 vol %.

An oxygen concentration in an atmosphere is also preferably maintained at lower than 1.0 vol % during a period from start of the step (1) to completion of the step (2).

An oxygen adsorbent is also preferably used to maintain an oxygen concentration at lower than 1.0 vol % in an atmosphere where the step (1), the step (2), or each of the steps (1) and (2) is performed.

The step (2) is also preferably performed in the presence of a radical-scavenging substance.

The radical-scavenging substance is also preferably a substance having an ability to generate a free hydrogen atom.

The radical-scavenging substance also preferably includes at least one selected from the group consisting of hydrogen gas, fluorine gas, chlorine gas, bromine gas, iodine gas, alkane gas, alkene gas, alkyne gas, fluoroalkanes, tetrafluoroethylene, carbon monooxide, nitrogen monooxide, nitrogen dioxide, water, amines, alcohols, and ketones.

The radical-scavenging substance is also preferably hydrogen gas.

The radical-scavenging substance is also preferably water.

The step (2) is also preferably performed in the presence of an oxygen adsorbent and the radical-scavenging substance is water generated from the oxygen adsorbent.

The low-molecular-weight polytetrafluoroethylene also preferably has a melt viscosity at 380° C. of $1.0 \times 10^3$ to $7.0 \times 10^5$ Pa·s.

The high-molecular-weight polytetrafluoroethylene also preferably has a standard specific gravity of 2.130 to 2.230.

The high-molecular-weight polytetrafluoroethylene and the low-molecular-weight polytetrafluoroethylene are also preferably each in the form of powder.

The production method also preferably further includes, before the step (1), (3) providing a molded article in response to heating the high-molecular-weight polytetrafluoroethylene up to a temperature that is not lower than a primary melting point thereof, the molded article having a specific gravity of 1.0 g/cm³ or higher.

The disclosure also relates to a method for producing low-molecular-weight polytetrafluoroethylene having a melt viscosity at 380° C. of $1.0 \times 10^2$ to $7.0 \times 10^5$ Pa·s, the method including: (X) irradiating high-molecular-weight polytetrafluoroethylene with radiation under conditions including a sample temperature during the irradiation of not lower than a room temperature transition temperature (19° C. that is a $\beta_1$ dispersion temperature) of polytetrafluoroethylene and not higher than 320° C. and a dose rate of 0.1 kGy/s or higher and providing the low-molecular-weight polytetrafluoroethylene.

The disclosure also relates to a method for producing low-molecular-weight polytetrafluoroethylene having a melt viscosity at 380° C. of $1.0 \times 10^2$ to $7.0 \times 10^5$ Pa·s, the method including: (Y1) irradiating polytetrafluoroethylene having a melt viscosity at 380° C. of $1.0 \times 10^2$ to $7.0 \times 10^5$ Pa·s with radiation in a substantially oxygen-free state and decomposing the polytetrafluoroethylene into a low-molecular-weight component; and (Y2) deactivating, in a substantially oxygen-free state, at least part of main-chain radicals and end radicals generated by the irradiation and providing the low-molecular-weight polytetrafluoroethylene.

The disclosure also relates to a low-molecular-weight polytetrafluoroethylene obtainable by any of the above production methods.

The disclosure also relates to a low-molecular-weight polytetrafluoroethylene having a melt viscosity at 380° C. of $1.0 \times 10^2$ to $7.0 \times 10^5$ Pa·s, exhibiting peaks that are obtainable by electron spin resonance measurement in the air and that satisfy the following relational expressions (1) and (2), and containing less than 25 ppb by mass of perfluorooctanoic acid and salts thereof. The relational expression (1) is Peak M2/Peak A1≥1.0, wherein Peak M2 represents an absolute value of a negative peak intensity that corresponds to a peroxy radical scavenged on a molecular-chain end of the low-molecular-weight polytetrafluoroethylene; and Peak A1 represents an absolute value of a negative peak intensity that corresponds to an alkyl peroxy radical scavenged on a main chain of the low-molecular-weight polytetrafluoroethylene. The relational expression (2) is Peak M2/Peak M3<1.0, wherein Peak M2 represents the absolute value of the negative peak intensity that corresponds to a peroxy radical scavenged on a molecular-chain end of the low-molecular-weight polytetrafluoroethylene; and Peak M3 represents an absolute value of a positive peak intensity that corresponds to a peroxy radical scavenged on a molecular-chain end of the low-molecular-weight polytetrafluoroethylene.

The disclosure also relates to a low-molecular-weight polytetrafluoroethylene containing: at least one hydrogen-atom-containing molecular structure selected from the group consisting of =CHF, —CHF—, —CH$_2$F, —CHF$_2$, and —CH$_3$; CF$_3$— at a molecular-chain end; and at least one double-bond-containing molecular structure selected from the group consisting of —CF=CF—, —CF=CF$_2$, and —CF=CF—CF$_3$, the low-molecular-weight polytetrafluoroethylene having a melt viscosity at 380° C. of $1.0 \times 10^2$ to $7.0 \times 10^5$ Pa·s and containing less than 25 ppb by mass of perfluorooctanoic acid and salts thereof.

The disclosure also relates to a low-molecular-weight polytetrafluoroethylene containing: at least one molecular structure selected from the group consisting of —CF$_2$CF (CF$_3$)CF$_2$— and —CF(CF$_3$)$_2$; CF$_3$— at a molecular-chain end; and at least one double-bond-containing molecular structure selected from the group consisting of —CF=CF—, —CF=CF$_2$, and —CF=CF—CF$_3$, the lowmolecular-weight polytetrafluoroethylene having a melt viscosity at 380° C. of $1.0 \times 10^2$ to $7.0 \times 10^5$ Pa s and containing less than 25 ppb by mass of perfluorooctanoic acid and salts thereof.

The low-molecular-weight polytetrafluoroethylene is also preferably obtainable by any of the above production methods.

The low-molecular-weight polytetrafluoroethylene also preferably contains five or less carboxyl groups at molecular-chain ends per $10^6$ main-chain carbon atoms.

Advantageous Effects of Invention

The disclosure can provide methods for producing low-molecular-weight polytetrafluoroethylene that are less likely to generate C6-C14 perfluorocarboxylic acids and salts thereof.

DESCRIPTION OF EMBODIMENTS

Figure 1:
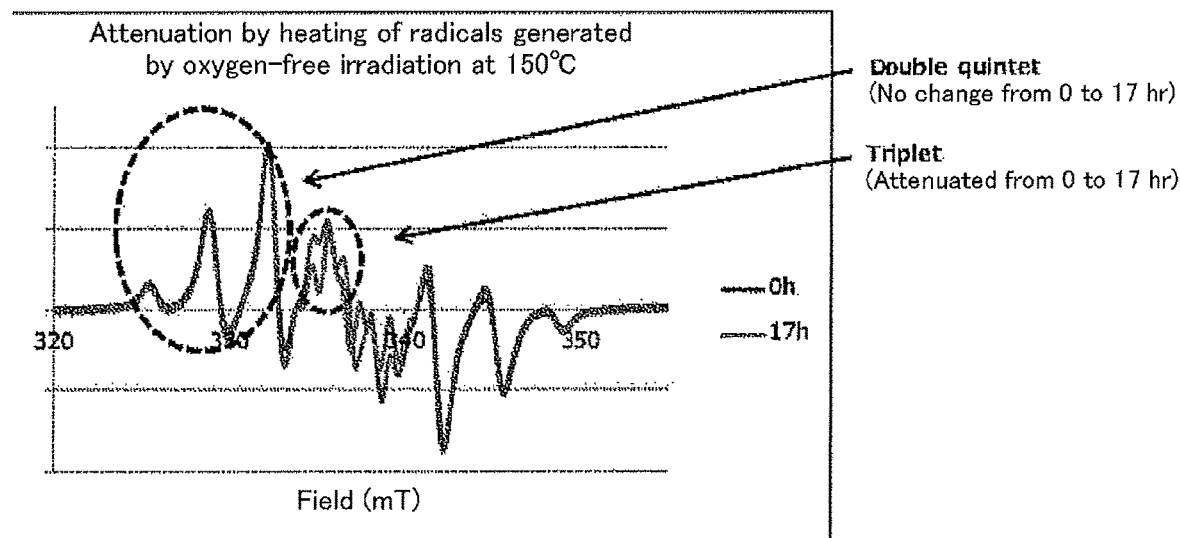
FIG. 1 is a diagram of the electron spin resonance (ESR) spectrum of a sample heated at 150° C. in a vacuum in Example 1-3.

The disclosure will be specifically described hereinbelow.

The disclosure relates to a method for producing low-molecular-weight polytetrafluoroethylene (PTFE) having a melt viscosity at 380° C. of $1.0 \times 10^2$ to $7.0 \times 10^5$ Pa·s, including (1) irradiating high-molecular-weight PTFE in a substantially oxygen-free state and decomposing the high-molecular-weight PTFE into a low-molecular-weight component and (2) deactivating, in a substantially oxygen-free state, at least part of main-chain radicals and end radicals generated by the irradiation and providing the low-molecular-weight PTFE.

Irradiation of high-molecular-weight PTFE with radiation in the air atmosphere, which is a common condition of a conventional method for producing low-molecular-weight PTFE, generates not only low-molecular-weight PTFE having a higher heat of crystallization and a lower melt viscosity than high-molecular-weight PTFE but also C6-C14 perfluorocarboxylic acids or salts thereof as by-products. These compounds as by-products are non-naturally occurring, difficult-to-decompose substances and include C8 perfluorooctanoic acid and salts thereof, C9 perfluorononanoic acid and salts thereof, and C10 perfluorodecanoic acid, C11 perfluoroundecanoic acid, C12 perfluorododecanoic acid, C13 perfluorotridecanoic acid, and C14 perfluorotetradecanoic acid and salts thereof which are pointed out that they are highly bioaccumulative.

Irradiation of high-molecular-weight PTFE with radiation under irradiation conditions of a conventional production method unfortunately causes oxidative degradation due to oxygen and efficient scission of the main chain, generating 25 ppb or more of C8 perfluorooctanoic acid or salts thereof.

The inventors found that 25 ppb or more of C6-C14 perfluorocarboxylic acids or salts thereof may also be generated as a result of reactions of main-chain radicals and end radicals generated by irradiation in a substantially oxygen-free state at room temperature with oxygen in the air after the irradiation.

In the production method of the disclosure, the high-molecular-weight PTFE is irradiated with radiation in a substantially oxygen-free state and radicals generated by the irradiation are deactivated without reacting with oxygen. Thus, C6-C14 perfluorocarboxylic acids and salts thereof are not generated or are less likely to be generated.

The production method of the disclosure allows the inside of the system to be a uniformly substantially oxygen-free environment in the system. Thus, even when the production method is applied to a scaled-up system where 10 kg or more of high-molecular-weight PTFE is treated at once, for example, C6-C14 perfluorocarboxylic acids or salts thereof are not generated or are less likely to be generated.

In the step (1), high-molecular-weight PTFE is irradiated with radiation in a substantially oxygen-free state, so that the molecular weight of the high-molecular-weight PTFE is decomposed into a low-molecular-weight component.

The molecular weight decomposition into a low-molecular-weight component is presumably achieved by scission of the main chain of the high-molecular-weight PTFE by the irradiation.

Examples of the radiation include any ionizing radiation, such as electron beams, gamma rays, X-rays, neutron beams, and high energy ions. Electron beams, gamma rays, or X-rays are preferred for industrial use.

Electron beams may be generated from an electron accelerator, for example.

Gamma rays may be generated from a radioisotope, for example.

X-rays may be generated by applying particle beams from a particle accelerator to a target such as metal, for example. Alternatively, quasi-monochromatic X-rays can be generated by inverse compton scattering (laser compton scattering) resulting from collision of laser beams with high energy electron beams. Further, X-rays may be generated by synchrotron radiation or X-rays may be generated using an undulator or a wiggler provided on the lower stage of a particle accelerator.

The radiation preferably has an absorbed dose of 100 kGy or higher, more preferably 150 kGy or higher, still more preferably 200 kGy or higher, particularly preferably 250 kGy or higher, most preferably 300 kGy or higher, for example. The absorbed dose is preferably 1000 kGy or lower, more preferably 750 kGy or lower, still more preferably 500 kGy or lower.

The numerical range may be suitably applied to irradiation at room temperature (25° C.), for example.

The irradiation may be performed continually until the absorbed dose reaches a desired value, or may be performed intermittently and repeatedly until the absorbed doses add up to a desired value.

An absorbed dose within the above range enables decomposition of the high-molecular-weight PTFE into a low-molecular-weight component even in a substantially oxygen-free state. The absorbed dose is preferably optimized in accordance with the target molecular weight.

The irradiation may be performed with any absorbed dose rate. For γ-rays emitted from cobalt 60, for example, the absorbed dose rate is preferably 0.1 kGy/h or higher, more preferably 1 kGy/h or higher, still more preferably 2 kGy/h or higher.

For electron beams from an electron accelerator, the absorbed dose rate is preferably 0.1 kGy/s or higher, more preferably 1 kGy/s or higher, still more preferably 10 kGy/s or higher. Alternatively, the absorbed dose rate is preferably 0.1 kGy/pass or higher, more preferably 1 kGy/pass or higher, still more preferably 10 kGy/pass or higher.

For particle beams from a particle accelerator, particularly for X-rays generated by applying electron beams from an electron accelerator to a target for X-ray generation, the absorbed dose rate is preferably 0.1 kGy/s or higher, more preferably 1 kGy/s or higher, still more preferably 10 kGy/s or higher. Alternatively, the absorbed dose rate is preferably 0.1 kGy/pass or higher, more preferably 1 kGy/pass or higher, still more preferably 10 kGy/pass or higher.

The irradiation is preferably performed such that the whole PTFE sample uniformly undergoes the reaction and that uniform absorbed dose distribution is obtained. In the case of γ-rays from cobalt 60, for example, the penetrability of γ-rays is attenuated by the distance squared. Thus, irradiating a thick sample with γ-rays forms a distribution between the front surface irradiated with γ-rays and the back surface. For this reason, the PTFE sample is preferably reversed periodically or rotated, for example. It should be noted that particularly a thick sample may have a dose distribution of about 20% to 30% between a peripheral portion and a central portion even when reversed. Thus, in order to form a uniform dose distribution, a sample to be irradiated preferably has an elaborated density distribution or irradiation pattern.

For electron beams from an electron accelerator, the penetration depth thereof changes in accordance with (accelerating voltage of electrons)/(accelerating energy of electrons on sample surface). Thus, in order to form a uniform absorbed dose distribution, preferably, a sample is made to have a thickness that is not greater than the penetration depth of electrons or a sample is reversed periodically.

For X-rays generated by applying electron beams from an electron accelerator to a target for X-ray generation, the penetrability of X-rays is attenuated by the distance squared. Thus, irradiating a thick sample with X-rays forms a distribution between the front surface irradiated with X-rays and the back surface. For this reason, the PTFE sample is preferably reversed periodically or rotated, for example. It should be noted that particularly a thick sample may have a dose distribution of about 20% to 30% between a peripheral portion and a central portion even when reversed. Thus, in order to form a uniform dose distribution, a sample to be irradiated preferably has an elaborated density distribution or irradiation pattern.

The temperature of a sample during the irradiation may be any temperature within the range from the γ dispersion temperature around −80° C. to the melting point of high-molecular-weight PTFE. It is known that the molecular chain of high-molecular-weight PTFE is crosslinked around the melting point thereof. Thus, in order to provide low-molecular-weight PTFE, the temperature is preferably 320° C. or lower, more preferably 310° C. or lower, still more preferably 300° C. or lower. From an economic viewpoint, the irradiation is preferably performed at a temperature within the range from room temperature to about 50° C. In order to improve the decomposition efficiency by radiation, the temperature may be increased before irradiation.

The sample temperature may vary within the range from −80° C. to 320° C. during the irradiation.

Examples of combination of the sample temperature and the absorbed dose during the irradiation are shown below, but the combination is not limited thereto.

For irradiation at −80° C., the absorbed dose of the radiation is preferably 100 kGy or higher, more preferably 200 kGy or higher, still more preferably 250 kGy or higher, most preferably 300 kGy or higher, while preferably 1200 kGy or lower, more preferably 1000 kGy or lower, still more preferably 800 kGy or lower.

For irradiation at 50° C., the absorbed dose of the radiation is preferably 60 kGy or higher, more preferably 120 kGy or higher, still more preferably 140 kGy or higher, most preferably 160 kGy or higher, while preferably 700 kGy or lower, more preferably 600 kGy or lower, still more preferably 500 kGy or lower.

For irradiation at 100° C., the absorbed dose of the radiation is preferably 50 kGy or higher, more preferably 100 kGy or higher, still more preferably 120 kGy or higher, most preferably 150 kGy or higher, while preferably 600 kGy or lower, more preferably 500 kGy or lower, still more preferably 400 kGy or lower.

For irradiation at 150° C., the absorbed dose of the radiation is preferably 40 kGy or higher, more preferably 80 kGy or higher, still more preferably 100 kGy or higher, most preferably 120 kGy or higher, while preferably 550 kGy or lower, more preferably 450 kGy or lower, still more preferably 350 kGy or lower.

For irradiation at 200° C., the absorbed dose of the radiation is preferably 30 kGy or higher, more preferably 60 kGy or higher, still more preferably 80 kGy or higher, most preferably 100 kGy or higher, while preferably 500 kGy or lower, more preferably 400 kGy or lower, still more preferably 300 kGy or lower.

The temperature during the irradiation can be easily measured by, for example, a method of measuring the temperature of the atmosphere where the step is performed using a thermocouple or a platinum resistor, a method of measuring the temperature of the surface or inside of a sample using a thermocouple or a platinum resistor in a contact manner, or a method of measuring the infrared radiation from the surface of a sample using an infrared thermometer.

The step (1) is performed in a substantially oxygen-free state.

The phrase "substantially oxygen-free" herein means that the oxygen concentration in the atmosphere for performing a step is less than 2.0 vol %. In order to further reduce generation of C6-C14 perfluorocarboxylic acids or salts thereof, the oxygen concentration is preferably 1.0 vol % or less, more preferably less than 1.0 vol %, still more preferably 0.5 vol % or less, further more preferably 0.1 vol % or less, particularly preferably 0.01 vol % or less. The lower limit of the oxygen concentration may be lower than the detection limit. The principal gas at this time may be inert gas. Examples of the inert gas include nitrogen gas, argon gas, helium gas, and a gas mixture of any of these. Nitrogen gas is preferred for industrial use.

The oxygen concentration can be easily determined by a method of analyzing the atmosphere for performing a step, such as a gaseous phase inside a container where the high-molecular-weight PTFE is to be placed by gas chromatography, a method of using an oxygen concentration meter, or a method of observing the color tone of an oxygen detection agent placed in the container.

The environment where the step (1) is to be performed may be any of a pressurized environment, an atmospheric environment, and a decompressed environment. From the viewpoint of safety measures for the working environment against generation of decomposed gas in the step (1), a decompressed environment is preferred. The decompressed environment herein means an environment evacuated to have a degree of vacuum of 100 Pa or lower using a vacuum pump such as a diaphragm pump, an oil rotary pump, or a scroll pump. In order to further reduce generation of C6-C14 perfluorocarboxylic acids or salts thereof, the degree of vacuum is preferably 10 Pa or lower, more preferably 1 Pa or lower.

The decompressed environment in the step (1) may be maintained by the use of an airtight container for decompression, may be maintained by continual evacuation of the container using a vacuum pump, or may be maintained by repeated turning on and off of a vacuum pump in an intermittent manner.

An oxygen adsorbent may be used to remove oxygen in the environment and achieve a substantially oxygen-free environment. An oxygen absorbent is also referred to as a deoxidant and they are synonymous. Of course an oxygen adsorbent may be used in combination with any of the above methods. Such combination use may be performed by placing an oxygen adsorbent in the airtight container together with the high-molecular-weight PTFE or by uniformly or nonuniformly coating the inside of the airtight container with an oxygen adsorbent.

An example of a method of performing the step (1) in a substantially oxygen-free state may be a method of performing the step (1) in a substantially oxygen-free space.

The substantially oxygen-free space as used herein means a space where the oxygen concentration in the space can be locally adjusted during the step (1) and the step (2).

An example thereof is a container that is to be sealed (hereinafter, referred to as an airtight container) so as to adjust the oxygen concentration in the internal space.

Alternatively, the space where the step (1) and the step (2) are to be performed may be locally converted to a substantially oxygen-free space by differential pumping using inert gas shower or a vacuum pump system.

In the case of using inert gas, the substantially oxygen-free state in the step (1) may be maintained by the use of an airtight container, may be maintained by introduction of inert gas, or may be maintained by intermittent turning on and off of the introduction of inert gas.

The airtight container may be coupled with pipes for intake and exhaust of substances such as inert gas to be described later and for exhausting the gas inside the airtight container, and may be coupled with components such as other pipes, caps, valves, and flanges. The airtight container may have any shape, such as a cylindrical shape, a prismatic shape, or a spherical shape, or may be a capacity-variable bag. The container may be formed from any material, such as metal, glass, a polymer, or a combined material prepared by stacking any of these materials. The material and structure of the airtight container is preferably, but not limited to, be, radiolucent and non-radiolytic. The airtight container is not limited to a pressure-resistant container.

The airtight container, particularly a capacity-variable bag is preferably formed from a material such as a rubbery material that can be sealed by a physical stress, including ethylene-propylene rubber, tetrafluoroethylene-propylene rubber, chloroprene rubber, and a polyester elastomer, as well as a material that can be sealed by thermal adhesion or with adhesive such as epoxy-based adhesive. Particularly preferred among these are thermoplastic organic materials that can be sealed by thermal adhesion. In terms of the resistance to the irradiation in the step (1), preferred among the thermoplastic organic materials are polyesters such as polyethylene terephthalate (PET), polyamide (PA), polyethylene (PE), polyamide-imide (PAI), thermoplastic polyimide (TPI), polyphenylene sulfide (PPS), polyetherimide (PEI), cyclic polyolefin (COP), polyvinylidene fluoride, ethylene-tetrafluoroethylene copolymers (ETFE), polychlorotrifluoroethylene (PCTFE), hexafluoropropylene-tetrafluoroethylene copolymers (FEP), and perfluoroalkoxyalkane (PFA). These materials each may be in the form of a multilayer material including two, three, or more layers, or may be in the form of an organic-inorganic combined multilayer material with aluminum foil, for example.

The substantially oxygen-free state in the airtight container may be achieved by making substantially a vacuum in the airtight container or by filling the airtight container with inert gas. The phrase substantially making a vacuum herein means that the pressure inside a container is 100 Pa or lower, preferably 50 Pa or lower, more preferably 10 Pa or lower.

The inert gas is a gas inert to a reaction of decomposing the molecular weight of high-molecular-weight PTFE into a low-molecular-weight component by irradiation and to main-chain radicals and end radicals generated by the irradiation. Examples of the inert gas include gases such as nitrogen, helium, and argon. Preferred is nitrogen.

The inert gas preferably has an oxygen content of less than 2.0 vol %, more preferably 1.0 vol % or less, still more preferably lower than 1.0 vol %, further more preferably 0.5 vol % or less, still further more preferably 0.1 vol % or less, particularly preferably 0.01 vol % or less. The lower limit thereof may be, but is not limited to, a value lower than the detection limit. With the inert gas having an oxygen content within the above range, C6-C14 perfluorocarboxylic acids and salts thereof are much less likely to generate.

The oxygen content can be checked by gas chromatography analysis, as well as by the use of a galvanic cell oxygen concentration meter, a zirconia oxygen concentration meter, or oxygen detection paper, for example.

The oxygen adsorbent may be any adsorbent having a function of adsorbing oxygen. Examples thereof include known oxygen adsorbents having an oxygen-adsorbing effect, including inorganic oxygen adsorbents such as iron-based, zinc-based, or hydrosulfite-based adsorbents, and organic oxygen adsorbents such as ascorbic acid-based, polyhydric alcohol-based, or activated carbon-based adsorbents. The oxygen adsorbent may be of either a water-dependent type which uses water for a reaction with oxygen or self-reactive type which does not use water. Preferred is a self-reactive type. The oxygen adsorbent is preferably an iron-based self-reactive oxygen adsorbent, quicklime, or the like, and is more preferably an iron-based self-reactive oxygen adsorbent.

The production method of the disclosure preferably includes feeding the high-molecular-weight PTFE into an airtight container in a substantially oxygen-free state before the step (1).

Examples of methods of feeding the high-molecular-weight PTFE into an airtight container in a substantially oxygen-free state include a method in which the high-molecular-weight PTFE is placed in the airtight container, optionally followed by feeding of an acid adsorbent into the airtight container, and then the airtight container is vacuum-evacuated, a method in which the high-molecular-weight PTFE and at least one selected from the group consisting of inert gas and an oxygen adsorbent are fed into the airtight container, and combination of these methods.

Specific examples thereof include a vacuum evacuation method in which the high-molecular-weight PTFE is placed in the airtight container, the airtight container is evacuated into a decompressed environment using a vacuum pump, and the airtight container is sealed, a gas replacement method in which the high-molecular-weight PTFE is placed in the airtight container, the airtight container is optionally vacuumed, and the airtight container is filled with the inert gas, a method in which the methods such as the vacuum evacuation method and the gas replacement method are repeated to provide a substantially oxygen-free state, and a gas flow replacement method in which the high-molecular-weight PTFE is placed in the airtight container and the inert gas is continually introduced into the airtight container to gradually reduce the oxygen concentration, thereby achieving a desired substantially oxygen-free environment.

In the case of using an oxygen adsorbent, examples of methods include a method in which the high-molecular-weight PTFE and the oxygen adsorbent are placed in the airtight container in the air and the airtight container is sealed, a method in which the high-molecular-weight PTFE and the oxygen adsorbent are placed in the airtight container, the airtight container is vacuum-evacuated, and the airtight container is sealed, and a method in which the high-molecular-weight PTFE and the oxygen adsorbent are placed in the airtight container, the airtight container is optionally vacuum-evacuated, and the airtight container is filled with the inert gas.

The step (1) may be performed by adding a halogen-containing material together with the high-molecular-weight PTFE. The halogen-containing material in this case may be any of solid, liquid, and gas. A preferred halogen-containing material is a fluorine-based oil.

The step (1) may be performed by adding a substance having an ability to generate a free hydrogen atom together with the high-molecular-weight PTFE. The substance having an ability to generate a free hydrogen atom in this case may be any of solid, liquid, and gas, and is preferably solid.

Examples of the substance having an ability to generate a free hydrogen atom include hydrocarbon-based organic materials, amines (e.g., ammonia), and water.

Examples of the hydrocarbon-based organic materials include paraffin, polyethylene, and acetylene. Preferred are paraffin and polyethylene.

The substance having an ability to generate a free hydrogen atom is preferably added in an amount of 0.1% by mass or more relative to the high-molecular-weight polytetrafluoroethylene. The amount is also preferably 25% by mass or less.

The step (1) may be performed in the presence of an additive such as a radical scavenger so as to more reduce generation of C6-C14 perfluorocarboxylic acids or salts thereof. Still, a radical scavenger reacts with radicals generated on the molecular chain and deactivates the radicals, so that main-chain scission is inhibited. This reduces the efficiency of PTFE main-chain scission, in other words, causes the main-chain scission to require an increased absorbed dose of radiation. Accordingly, the step (1) is preferably performed substantially in the absence of an additive. The additive may be an additive having a radical-scavenging ability.

Such a substantial absence of an additive can save the labor of handling such an additive and eliminate equipment therefor, can reduce generation of by-products from such an additive, or can eliminate equipment for removing such by-products, for example. Since gases other than volatile substances and the air are substantially absent, oxygen can be removed by introduction of inert gas or vacuum evacuation of the container. This can lead to a reduced amount of an oxygen adsorbent used for achieving a substantially oxygen-free environment and to efficient, inexpensive achievement of a substantially oxygen-free state. Further, such a reduced amount of an oxygen adsorbent can reduce damages such as melting, deformation, or breakage of a container due to heating of the oxygen adsorbent in response to oxygen adsorption.

The oxygen adsorbent does not inhibit decomposition of the high-molecular-weight PTFE into a low-molecular-weight component. Thus, the step (1) can be performed in the presence of the oxygen adsorbent with no problem.

An example of the additive may be a chain-transferable substance. Preferred chain-transferable substances are halogen gas and an organic compound containing at least one selected from the group consisting of a hydrogen atom and a chain-transferable halogen atom.

Examples of the organic compound include hydrocarbons (e.g., C1-C20 saturated hydrocarbons), chlorinated hydrocarbons (e.g., chlorinated products of C1-C18 saturated hydrocarbons), alcohols (e.g., C1-C12 monohydric saturated alcohols), carboxylic acids (e.g., C1-C13 saturated monocarboxylic acids), halogen compound derivatives (e.g., carbon tetrachloride, dichloroether) containing a halogen atom (which encompasses a fluorine atom), and low-molecular-weight or high-molecular-weight compounds containing any of these organic compounds as structural units.

Examples of the high-molecular-weight compounds include halogenated polymers containing a halogen atom other than a fluorine atom (optionally further containing a fluorine atom, and preferably polymers containing a chlorine atom).

Examples of the halogen gas include fluorine gas, chlorine gas, bromine gas, and iodine gas.

The phrase "substantially in the absence of an additive" means that the amount of the additive (total amount of additives) is less than 0.1% by mass relative to the high-molecular-weight PTFE. The amount is preferably less than 0.001% by mass, preferably 0.0005% by mass or less, more preferably 0.0001% by mass or less. The lower limit thereof may be, but is not limited to, a value lower than the detection limit.

The step (1) is also preferably performed substantially in the absence of a chain-transferable substance.

The step (1) is also preferably performed substantially in the absence of halogen gas and organic compounds containing at least one selected from the group consisting of a hydrogen atom and a chain-transferable halogen atom.

The step (1) is also preferably performed substantially in the absence of an organic compound containing at least one selected from the group consisting of a hydrogen atom and a chain-transferable halogen atom.

The step (1) is also preferably performed substantially in the absence of hydrocarbons, chlorinated hydrocarbons, alcohols, carboxylic acids, halogenated polymers containing a halogen atom other than a fluorine atom, and halogen gas.

The step (1) is also preferably performed substantially in the absence of hydrocarbons, chlorinated hydrocarbons, alcohols, carboxylic acids, and halogenated polymers containing a halogen atom other than a fluorine atom.

The step (1) is also preferably performed substantially in the absence of C1-C20 saturated hydrocarbons, chlorinated products of C1-C18 saturated hydrocarbons, C1-C12 monohydric saturated alcohols, C1-C13 saturated monocarboxylic acids, polymers containing a chlorine atom, fluorine gas, chlorine gas, bromine gas, and iodine gas.

The step (1) is also preferably performed substantially in the absence of C1-C20 saturated hydrocarbons, chlorinated products of C1-C18 saturated hydrocarbons, C1-C12 monohydric saturated alcohols, C1-C13 saturated monocarboxylic acids, low-molecular-weight or high-molecular-weight compounds (polymers) containing a chlorine atom, fluorine gas, chlorine gas, bromine gas, and iodine gas.

The step (1) is also preferably performed substantially in the absence of C1-C20 saturated hydrocarbons, chlorinated products of C1-C18 saturated hydrocarbons, C1-C12 monohydric saturated alcohols, C1-C13 saturated monocarboxylic acids, and polymers containing a chlorine atom.

In these embodiments, the amount of substances that are substantially absent preferably falls within the same numerical range as of the aforementioned amount of the additive that is present.

In the step (2), at least part of main-chain radicals and end radicals generated by the irradiation is deactivated in a substantially oxygen-free state, whereby the low-molecular-weight PTFE is provided.

Irradiation of high-molecular-weight PTFE with radiation generates main-chain radicals (alkyl radicals) and end radicals of PTFE. The main-chain radicals herein mean radicals generated at parts of the main chain of PTFE other than the ends. The end radicals herein mean radicals generated at ends of the main chain of PTFE. The main-chain radicals and end radicals are radicals generated immediately after irradiation in a substantially oxygen-free state and are different from peroxy radicals generated by reactions of such radicals with oxygen.

The inventors found that reactions of these radicals, particularly radicals (end radicals) generated at ends of the main chain, with oxygen generates C6-C14 perfluorocarboxylic acids or salts thereof.

In the step (2), at least part of the radicals generated and scavenged, particularly end radicals involved in generation of C6-C14 perfluorocarboxylic acids or salts thereof, is deactivated in a substantially oxygen-free state. Thereby, the low-molecular-weight PTFE can be provided while perfluorocarboxylic acids or salts thereof are hardly generated.

The step (2) is preferably performed after the step (1).

The step (2) is preferably performed successively after the step (1).

The step (1) and the step (2) may be performed repeatedly multiple times. Still, in the case of performing these steps multiple times, the step (2), which is a step of deactivating particularly end radicals, is necessarily the last step.

The step (2) is performed in a substantially oxygen-free state.

The substantially oxygen-free state is as described above. The oxygen concentration in the atmosphere for the step is less than 2.0 vol %, preferably 1.0 vol % or less, more preferably less than 1.0 vol %, still more preferably 0.5 vol % or less, further more preferably 0.1 vol % or less, particularly preferably 0.01 vol % or less. The lower limit of the oxygen concentration may be lower than the detection limit.

The step (2) is preferably performed with the environment (substantially oxygen-free state) in the step (1) being maintained in terms of industrial process.

The step (2) is preferably performed in a substantially oxygen-free space.

The step (2) may be performed in the same space as for the step (1) or may be performed in a different space.

In order to surely prevent a contact between the low-molecular-weight component and oxygen and to ensure easiness of the steps, the low-molecular-weight component is more preferably fed to the step (2) while it is kept in the space where the step (1) has been performed.

The step (2) may be performed continually after the step (1) as a series of steps.

In the case of performing the step (2) in a space different from that for the step (1), the low-molecular-weight component obtained in the step (1) may be transferred to a space where the step (2) is to be performed in a substantially oxygen-free state or, as will be described later, may be transferred thereto in the air under predetermined conditions.

The step (2) may preferably be a step (2a) of warming or heating the low-molecular-weight component obtained in the step (1) at a temperature of not lower than the room temperature transition temperature (19° C. that is the $\beta_1$ dispersion temperature) of PTFE in a substantially oxygen-free state and providing the low-molecular-weight PTFE (hereinafter, also referred to as an accelerated deactivating process). In this embodiment, the radicals can be deactivated in a relatively short time.

The low-molecular-weight component is a substance generated by scission of the main chain of the high-molecular-weight PTFE in response to the irradiation in the step (1) and contains main-chain radicals and end radicals generated by the irradiation.

The half time of radical deactivation at room temperature of alkyl radicals and end radicals on the main chain generated and scavenged on PTFE is 1000 hours (Radiat. Phys. Chem., Vol. 50 (1997) pp. 601-606). Heating can accelerate the radical deactivation.

Warming or heating in the step (2a) is performed at a temperature of not lower than the room temperature transition temperature ($\beta_1$ dispersion temperature) of PTFE. The room temperature transition temperature ($\beta_1$ dispersion temperature) of PTFE is 19° C.

The warming or heating temperature is preferably not lower than the room temperature transition temperature ($\beta_2$ dispersion temperature) (30° C.) of PTFE, more preferably 70° C. or higher, still more preferably 100° C. or higher, particularly preferably 140° C. or higher, while preferably 310° C. or lower, more preferably 300° C. or lower, still more preferably 260° C. or lower.

The temperature during the warming or heating can be easily measured by, for example, a method of measuring the temperature of the atmosphere where the step is performed using a thermocouple or a platinum resistor, a method of measuring the temperature of the surface or inside of a sample using a thermocouple or a platinum resistor in a contact manner, or a method of measuring the infrared radiation from the surface of a sample using an infrared thermometer.

The sample temperature may vary within the range from −80° C. to 340° C. during the step (2a).

Although it is in accordance with the warming or heating temperature, the warming or heating duration is preferably 10 minutes or longer, more preferably 1 hour or longer, still more preferably 4 hours or longer, while preferably shorter than 100 hours, more preferably 50 hours or shorter, still more preferably 30 hours or shorter, for example.

The warming or heating duration is a duration from when the whole sample reaches a thermal equilibrium state.

The above range of the duration can particularly suitably be applied to heating at 150° C., for example.

Although not limited thereto, the warming or heating is preferably performed using equipment that is able to apply heat artificially, and may be performed by a method using any of the following heating devices. Examples thereof include a box dryer, a band dryer, a tunnel dryer, a jet flow dryer, a mobile layer dryer, a rotary dryer, a fluidized bed dryer, a jet dryer, a box dryer, a disc dryer, a cylindrical agitation dryer, an inverted conical agitation dryer, a microwave device, a vacuum heating dryer, a box electric furnace, a hot-air circulating device, a flash dryer, a vibration dryer, a belt dryer, an extrusion dryer, a spray dryer, and an infrared heater.

The warming or heating may be performed such that the low-molecular-weight component left in a substantially oxygen-free space (e.g., the airtight container used in the step (1) or an airtight container to which the low-molecular-weight component is transferred) is placed in a heating furnace, the temperature inside the heating furnace is increased up to a desired temperature, and the low-molecular-weight component is left for a desired period of time.

In the case of performing the step (2a), the airtight container is preferably a container that enables inward/outward heat transfer and that has heat resistance.

The airtight container is preferably formed from a material such as a rubbery material that can be sealed by a physical stress, including ethylene-propylene rubber, tetrafluoroethylene-propylene rubber, chloroprene rubber, and a polyester elastomer, as well as a material that can be sealed by thermal adhesion or with adhesive such as epoxy-based adhesive. Particularly preferred among these are thermoplastic organic materials that can be sealed by thermal adhesion. In terms of the resistance to the warming or heating, preferred among these are polyesters such as polyethylene terephthalate (PET), polyamide (PA), polyamide-imide (PAI), thermoplastic polyimide (TPI), polyphenylene sulfide (PPS), polyether imide (PEI), polypropylene (PP), cyclic polyolefin (COP), polyvinylidene fluoride, ethylene-tetrafluoroethylene copolymers (ETFE), polychlorotrifluoroethylene (PCTFE), hexafluoropropylene-tetrafluoroethylene copolymers (FEP), and perfluoroalkoxyalkane (PFA). These materials each may be in the form of a multilayer material including two, three, or more layers, or may be in the form of an organic-inorganic combined multilayer material with aluminum foil, for example.

The step (2a) may be performed in the presence of water. Water is preferably water vapor. Water is preferably in an amount of less than 20% by mass, more preferably less than 15% by mass, still more preferably less than 10% by mass, while preferably 0.00001% by mass or more, more preferably 0.0001% by mass or more, relative to the high-molecular-weight PTFE.

The step (2) may also be a step (2b) of maintaining the low-molecular-weight component obtained in the step (1) in a substantially oxygen-free environment for five minutes or longer and providing the low-molecular-weight PTFE (hereinafter, also referred to as a naturally deactivating process). In this embodiment, the radicals (particularly end radicals) are deactivated in response to maintaining the low-molecular-weight component in a substantially oxygen-free environment for a specific period of time. Thus, the radicals can be deactivated without using equipment that is able to apply heat artificially, such as a heating device.

The low-molecular-weight component is as described above.

The step (2b) may be such that the low-molecular-weight component is maintained while the temperature is controlled artificially, but is preferably performed without using equipment that is able to apply heat artificially.

The step (2a) may be performed after the step (2b).

In the step (2b), the temperature of the environment for maintaining the low-molecular-weight component is preferably a temperature that can be achieved without using equipment that is able to apply heat artificially. In order to shorten the duration for deactivating radicals, the temperature is preferably not lower than the room temperature transition temperature ($\beta_1$ dispersion temperature) (19° C.) of PTFE, preferably not lower than the room temperature transition temperature ($\beta_2$ dispersion temperature) (30° C.) of PTFE, more preferably 40° C. or higher.

The temperature may be lower than 100° C., or may be lower than 70° C.

The sample temperature may vary within the range from −20° C. to 100° C. during the step (2b).

In the step (2b), the duration of maintaining the low-molecular-weight component in the environment is five minutes or longer. In the case of performing the step (1) and the step (2b) successively, the duration means the period of time from the timing of completion of the irradiation.

The duration in the step (2b) is preferably 10 minutes or longer, more preferably 1 hour or longer, still more preferably 10 hours or longer, further more preferably 1 day or longer, further more preferably 50 hours or longer, further more preferably 100 hours or longer, particularly preferably 200 hours or longer.

The step (2b) may be performed by a method in which the low-molecular-weight component obtained in the step (1) is left to stand for the above duration while it is maintained in the substantially oxygen-free space used in the step (1).

The leaving may be performed in a warehouse or a greenhouse, for example.

The greenhouse herein may be a building such as a sunroom constructed of lighting glass or agricultural greenhouse, including buildings not provided with equipment for active warming or temperature control.

The step (2) may also be performed in the presence of a radical-scavenging substance.

The step (2) is also preferably a step (2c) of reacting the low-molecular-weight component obtained in the step (1) with a radical-scavenging substance in a substantially oxygen-free state and providing the low-molecular-weight PTFE. In this embodiment, the radicals can be deactivated in a relatively short time even without warming or heating. Warming or heating may be performed in combination.

The step (2a) may be performed after the step (2c) or the step (2c) and the step (2a) may be performed simultaneously.

The low-molecular-weight component is as described above.

The radical-scavenging substance is a substance having an ability to deactivate main-chain radicals and end radicals generated in the step (1). The radical-scavenging substance may be a radical-scavenging gas.

The radical-scavenging gas preferably includes hydrogen gas and halogen gas.

Examples of the halogen gas include fluorine gas, chlorine gas, bromine gas, and iodine gas.

Examples of the radical-scavenging substance also include alkane gases, alkene gases, alkyne gases, fluoroalkanes, tetrafluoroethylene, carbon monooxide, nitrogen monooxide, nitrogen dioxide, water, amines, alcohols, and ketones.

The radical-scavenging substance may be a substance having an ability to generate a free hydrogen atom. Specific examples of the substance having an ability to generate a free hydrogen atom are as described above.

Examples of the alkane gases include methane, ethane, propane, and butane.

Examples of the alkene gases include ethylene, propylene, and butene.

Examples of the alkyne gases include acetylene, monovinylacetylene, and divinylacetylene.

Examples of the fluoroalkanes include difluoromethane, trifluoromethane, 1,1,1-trifluoroethane, and 1,1,1,2-tetrafluoroethane.

The water used as a radical-scavenging gas may be water vapor. The water vapor may be, but is not limited to, water vapor generated by heating or sonicating liquid water.

Examples of the water include deionized water, distilled water, hard water, soft water, and tap water. In order to reduce contamination of low-molecular-weight polytetrafluoroethylene by impurities, preferred are deionized water and distilled water.

The water may be water generated from an oxygen adsorbent or may be water generated when the moisture adsorbed on silica gel is evaporated by heat.

An example of the amines is ammonia.

Examples of the alcohols include methanol, ethanol, isopropanol, and alcohol derivatives.

Examples of the ketones include acetone and benzophenone. One or two or more of the above radical-scavenging gases may be used.

Any of the above gases may be used in admixture with inert gas such as nitrogen or carbon dioxide.

The radical-scavenging gas also preferably includes at least one selected from the group consisting of hydrogen gas, halogen gas, alkane gases, alkene gases, alkyne gases, fluoroalkanes, tetrafluoroethylene, carbon monooxide, nitrogen monooxide, nitrogen dioxide, water, amines, alcohols, and ketones, also preferably includes at least one selected from the group consisting of hydrogen gas, fluorine gas, chlorine gas, bromine gas, iodine gas, alkane gases, alkene gases, alkyne gases, fluoroalkanes, tetrafluoroethylene, carbon monooxide, nitrogen monooxide, nitrogen dioxide, water, amines, alcohols, and ketones, also preferably includes at least one selected from the group consisting of hydrogen gas and water, is also preferably hydrogen gas, or is also preferably water.

The reaction in the step (2c) may be performed by introducing the radical-scavenging substance into the substantially oxygen-free space where the low-molecular-weight component is maintained (e.g., the airtight container used in the step (1)) or evacuating this space using a vacuum pump before introducing the radical-scavenging substance thereinto, and then bringing the low-molecular-weight component and the radical-scavenging substance into contact with each other.

Introduction of the radical-scavenging substance may be stopped by closing a valve, for example, after the concentration reaches equilibrium in the space, or may be continued.

The reaction may also be performed such that high-molecular-weight PTFE and the radical-scavenging substance are fed into an airtight container in a substantially oxygen-free state, and then the high-molecular-weight PTFE is irradiated in a substantially oxygen-free state. In this embodiment, the step (1) and the step (2c) are performed simultaneously. Introduction of the radical-scavenging substance may be stopped by closing a valve, for example, after the concentration reaches equilibrium in the space, or may be continued.

In the case of using an airtight container formed from a hydrogen-atom-containing material as the airtight container where the step (1) is to be performed, the irradiation causes the airtight container to generate radiolytically decomposed gas that contains hydrogen gas as a principal component. The decomposed gas may be used as a radical-scavenging substance in the step (2c). In the case of using an airtight container formed from a halogen-atom-containing material, halogen gas is also generated as radiolytically decomposed gas as well as hydrogen gas. The decomposed gas may be used as a radical-scavenging substance in the step (2c).

The hydrogen-atom-containing material is preferably an organic hydrogen-atom-containing material, and examples thereof include rubbery hydrogen-atom-containing materials such as ethylene-propylene rubber and a polyester elastomer, and thermoplastic organic hydrogen-atom-containing materials such as polyesters, e.g., polyethylene terephthalate (PET), polyamide (PA), polyethylene (PE), polyamide-imide (PAI), thermoplastic polyimide (TPI), polyphenylene sulfide (PPS), polyether imide (PEI), and cyclic polyolefins (COP).

The halogen-atom-containing material is preferably a halogen-atom-containing organic material, and examples thereof include halogen-atom-containing rubbery materials such as tetrafluoroethylene-propylene rubber and chloroprene rubber, and halogen-atom-containing thermoplastic organic materials such as polyvinylidene fluoride, ethylene-tetrafluoroethylene copolymers (ETFE), polychlorotrifluoroethylene (PCTFE), hexafluoropropylene-tetrafluoroethylene copolymers (FEP), and perfluoroalkoxyalkanes (PFA).

The presence of hydrogen gas (which may be hydrogen gas contained in the decomposed gas) as the radical-scavenging substance enables formation of a hydrogen-atom-containing molecular structure or of a double-bond-containing molecular chain inside the resulting low-molecular-weight PTFE, resulting in improved miscibility of the low-molecular-weight PTFE and a different type of organic substance containing a hydrogen atom.

The radical-scavenging substance to be introduced has a concentration of 0.1 vol % or more, preferably 3 vol % or more, more preferably 10 vol % or more. The higher the concentration of the radical-scavenging substance is, the shorter the radical deactivating time.

In the step (1), substantially, the number of radical-scavenging atoms or molecules is 1% or more, preferably 5% or more, more preferably 10% or more, of the total number per gram of main-chain radicals (alkyl radicals) and end radicals generated and scavenged immediately after irradiation or the total number per gram of peroxy radicals generated after these radicals are exposed to the air and reacted with oxygen.

The reaction temperature is preferably the γ-dispersion temperature (around −80° C.) of PTFE or higher, more preferably the $\beta_1$ dispersion temperature (19° C.) or higher, still more preferably 25° C. or higher, particularly preferably the $\beta_2$ dispersion temperature (30° C.) or higher.

The sample temperature may vary within the range from −80° C. to 380° C. during the step (2c).

The reaction duration is preferably 30 minutes or longer, more preferably 1 hour or longer, from the timing when the radical-scavenging substance reaches the concentration equilibrium in the reaction space.

The steps (2a), (2b), and (2c) each may be performed alone or may be performed in any combination.

Deactivation of the end radicals in the step (2) can be checked by observing the presence or absence of a triplet signal in measurement at room temperature using an electron spin resonance (ESR) spectrometer. A failure in clear detection of the triplet signal in the room temperature (25° C.) measurement is taken as deactivation of the end radicals.

Similarly, deactivation of the main-chain radicals can be checked by observing a decrease in the intensity of a double quintet signal or the presence or absence of the signal in measurement at room temperature using an electron spin resonance (ESR) spectrometer. A failure in clear detection of the double quintet signal is taken as deactivation of the main-chain radicals.

In the case where residual radicals react with oxygen in the air and peroxy radicals on the main chain (alkyl peroxy radicals) and peroxy radicals at ends (end peroxy radicals) are formed, deactivation can be checked by observing a decrease in the intensity of signals corresponding to these peroxy radicals or the presence or absence of the signals. The symmetricity or asymmetricity of the spectrum determined using the ESR spectrometer enables determination of whether the peroxy radicals are of main chain type (asymmetric) or of end type (symmetric). If they are difficult to distinct in room temperature measurement, the temperature may be reduced and the measurement may be performed at the liquid nitrogen temperature of 77 K. This enables clear distinction.

The alkyl peroxy radicals and the end peroxy radicals seem to be generated as follows. Specifically, after deactivation of the main-chain radicals and the end radicals are confirmed based on the triplet and double quintet signals in the aforementioned ESR measurement and the low-molecular-weight PTFE sample is exposed to the air, the main-chain radicals and the end radicals which slightly remain in the sample in amounts below the detection sensitivity of the ESR spectrometer seem to react with oxygen in the air and converted into the peroxy radicals. As in conventional cases, the alkyl peroxy radicals and the end peroxy radicals are also generated even by irradiation in the presence of oxygen. Still, most of the radicals observed are end peroxy radicals.

The double quintet or triplet ESR signals have a relatively wider sweep width than peroxy radicals and have a poorer S/N ratio to the base line than peroxy radicals. Thus, even when the double quintet or triplet ESR signals are not clearly observed, such ESR signals may be detected in some cases where the radicals are converted into peroxy radicals by exposure to the air.

In the production method of the disclosure, the low-molecular-weight component obtained in the step (1) is preferably substantially free from a reaction with oxygen during the period from completion of the step (1) to start of the step (2). This can further reduce the amount of C6-C14 perfluorocarboxylic acids or salts thereof generated. The reaction of the low-molecular-weight component with oxygen as used herein means a reaction of main-chain radicals and/or end radicals in the low-molecular-weight component with oxygen, particularly a reaction of the end radicals with oxygen.

The phrase "the low-molecular-weight component is substantially free from a reaction with oxygen" means, as described below, that the amount of oxygen to be in contact with the low-molecular-weight component is controlled to a very small amount or that the low-molecular-weight component is brought into contact with oxygen under very limited conditions.

In the production method of the disclosure, the substantially oxygen-free state is preferably maintained during the period from start of the step (1) to completion of the step (2). In other words, during the period from start of the step (1) to completion of the step (2), the oxygen concentration in the atmosphere is preferably maintained at less than 2.0 vol %, more preferably less than 1.0 vol %, still more preferably 1.0 vol % or less, further more preferably 0.5 vol % or less, still further more preferably 0.1 vol % or less, particularly preferably 0.01 vol % or less. The lower limit of the oxygen concentration may be a value lower than the detection limit. This can further reduce reactions of main-chain radicals and end radicals generated by irradiation with oxygen and can further reduce the amount of C6-C14 perfluorocarboxylic acids or salts thereof generated.

Examples of methods of maintaining the substantially oxygen-free state during the period from start of the step (1) to completion of the step (2) include a method in which the steps (1) and (2) are performed in the same airtight container and the airtight container is not opened during the period from start of the step (1) to completion of the step (2), a method in which the space is evacuated using a vacuum pump at regular intervals, a method in which inert gas is introduced into the space at regular intervals, and a method in which evacuation of the airtight container using a vacuum pump at regular intervals and introduction of inert gas are repeated.

Another example thereof is a method in which the airtight container where the step (1) has been performed is opened in a substantially oxygen-free space and, in the same space, the low-molecular-weight component is transferred to another airtight container to be used in the step (2). An example of this method is a method in which the airtight container where the step (1) has been performed is opened in a container such as a glovebox filled with inert gas and, in the same space, the low-molecular-weight component is transferred to another airtight container to be used in the step (2), so that the oxygen-free state is maintained.

In the production method of the disclosure, the step (1) and the step (2) may be performed in different spaces (preferably, in different airtight containers).

In this embodiment, an optimum space (airtight container) can be selected for each of the steps (1) and (2). In particular, for the step (2), a heat-resistant airtight container or a pressure-resistant airtight container can be selected which enables effective performance of processes such as warming, heating, and decompression. This results in more easy reduction in the amount of C6-C14 perfluorocarboxylic acids or salts thereof generated. This embodiment is particularly useful when the step (2) is the step (2a).

The production method of the disclosure may include transferring the low-molecular-weight component obtained in the step (1) from the space where the step (1) has been performed to a space where the step (2) is to be performed under conditions where the low-molecular-weight component is substantially free from a reaction with oxygen.

The transferring the low-molecular-weight component is preferably performed in a substantially oxygen-free state. Still, the transferring may also be performed in the air under conditions where end radicals of the low-molecular-weight component that are likely to induce C6-C14 perfluorocarboxylic acids and salts thereof are substantially free from reactions with oxygen. In terms of industrial processes, the transferring is advantageously performed in the air.

Examples of the conditions where end radicals in the low-molecular-weight component are substantially free from reactions with oxygen include conditions where the contact time between the low-molecular-weight component and the air is 180 minutes of shorter, preferably 60 minutes or shorter. The lower limit of the contact time may be 1 second.

The temperature of the air to be in contact with the low-molecular-weight component may be 30° C. or lower, preferably 19° C. or lower. The lower limit of the temperature may be −196° C.

In the case of repeating the step (2) multiple times or performing multiple steps as the steps (2) (e.g., performing the steps (2a) and (2b)) in the production method of the disclosure, the low-molecular-weight component may be exposed to the air (e.g., transferred to another container in the air) between one step and a next step. Such exposure to the air (air release) between steps is advantageous in terms of industrial processes. Even such exposure to the air is not directly linked to an increase in C6-C14 perfluorocarboxylic acids and salts thereof as long as the radicals are deactivated to some degree before the exposure (in particular, the radicals are deactivated to some degree by performing the step (2b) after the step (1)).

In this embodiment, particularly preferably, the step (2b) is followed by exposure to the air, then by the step (2) (e.g., at least one selected from the steps (2a), (2b), and (2c), preferably at least one selected from the steps (2a) and (2c)).

The production method of the disclosure preferably includes the step (2b), i.e., maintaining the low-molecular-weight component obtained in the step (1) at a temperature of 19° C. or higher for five minutes or longer in a substantially oxygen-free space to deactivate at least part of the end radicals in the sample and transferring, in the air, the low-molecular-weight component from the space where the steps (1) and (2b) have been performed to a substantially oxygen-free space where the step (2) is to be performed.

The production method of the disclosure more preferably includes the step (2b), i.e., maintaining the low-molecular-weight component obtained in the step (1) at a temperature of 19° C. or higher for one hour or longer in a substantially oxygen-free space to deactivate at least part of the end radicals in the sample and transferring, in the air, the low-molecular-weight component from the space where the steps (1) and (2b) have been performed to a substantially oxygen-free space where the step (2) is to be performed.

The production method of the disclosure still more preferably includes the step (2b), i.e., maintaining the low-molecular-weight component obtained in the step (1) at a temperature of 19° C. or higher for one day or longer in a substantially oxygen-free space to deactivate at least part of the end radicals in the sample and transferring, in the air, the low-molecular-weight component from the space where the steps (1) and (2b) have been performed to a substantially oxygen-free space where the step (2) is to be performed.

The longer the duration of maintaining the low-molecular-weight component at a temperature of 19° C. or higher in a substantially oxygen-free space (the duration of the step (2b)) is, the higher the proportion of end radicals deactivated is. This can lead to a longer acceptable air-exposure time of the low-molecular-weight component.

The duration of the air exposure between the steps in the aforementioned case of repeating the step (2) multiple times or performing multiple steps as the steps (2) may be 10 days or shorter, preferably 7 days or shorter. The lower limit of the duration may be one second or may be five minutes.

The temperature of the air to be in contact with the low-molecular-weight component may be 40° C. or lower, preferably 30° C. or lower, more preferably 19° C. or lower. The lower limit of the temperature may be −196° C.

In the production method of the disclosure, the aforementioned steps (1) and (2) may be performed simultaneously.

For example, the step (1) and the step (2a) may be performed simultaneously (combined step (A)). The step (1) and the step (2a) may be simultaneously performed by an exemplary method in which high-molecular-weight PTFE is fed into an airtight container in a substantially oxygen-free state and the high-molecular-weight PTFE is irradiated with radiation while the high-molecular-weight PTFE is warmed or heated.

Specifically, the combined step (A) may be performed by a method in which high-molecular-weight PTFE is fed into an airtight container in a substantially oxygen-free state and then the high-molecular-weight PTFE is irradiated with γ-rays, X-rays, or electron beams from the outside of the airtight container while the airtight container is warmed or heated using an external unit having a warming or heating function.

The γ-rays used may be γ-rays generated from cobalt 60, for example.

The X-rays used may be X-rays generated by applying electron beams from an electron accelerator to a target. Alternatively, the X-rays used may be quasi-monochromatic X-rays generated by inverse compton scattering (laser compton scattering) resulting from collision of laser beams with high energy electron beams from a linear accelerator. Still alternatively, X-rays may be generated by synchrotron radiation or may be generated from an undulator or a wiggler provided on the lower stage of a particle accelerator.

Use of γ-rays or X-rays having excellent material penetrability enables arrangement of the external unit at the whole surroundings of the airtight container or at any positions such as surroundings, upper and lower parts, right and left parts, and front and rear parts thereof. In order to allow easy penetration of γ-rays or X-rays, no external unit is preferably provided at a position facing the surface to be irradiated.

The γ-rays or X-rays may be replaced by electron beams having a lower penetrability than γ-rays or X-rays. In this case, the external unit is preferably provided at a position other than the position facing the surface to be irradiated with electron beams.

The airtight container itself may be integrated with a warming or heating system.

In the combined step (A), the warming or heating temperature is more preferably 70° C. or higher, still more preferably 100° C. or higher, while preferably 310° C. or lower.

The sample may be warmed or heated by any method, such as beam heating in which the energy of radiation is converted into thermal energy. In the case of beam heating, the radiation used preferably includes electron beams from an electron accelerator or X-rays generated by applying electron beams from an electron accelerator to a target. Thermal insulation or other components may be provided at the whole surroundings of an airtight container or positions such as surroundings, upper and lower parts, right and left parts, or front and rear parts thereof. In order to allow easy penetration of radiation, no components such as thermal insulation are preferably provided at a position facing the surface to be irradiated.

The step (1) and the step (2c) may be performed simultaneously (combined step (C)). The step (1) and the step (2c) may be simultaneously performed by an exemplary method in which high-molecular-weight PTFE is fed into an airtight container in a substantially oxygen-free state and the high-molecular-weight PTFE is irradiated with radiation with the radical-scavenging gas sealed in the airtight container.

Specifically, the combined step (C) may be performed by a method in which high-molecular-weight PTFE is fed into an airtight container in a substantially oxygen-free state and then the high-molecular-weight PTFE is irradiated with γ-rays, X-rays, or electron beams from the outside of the airtight container while the radical-scavenging gas at a concentration of 3% or higher is sealed in or introduced into the airtight container.

The γ-rays may be γ-rays generated from cobalt 60, for example.

The X-rays used may be X-rays generated by applying electron beams from an electron accelerator to a target. Alternatively, the X-rays used may be quasi-monochromatic X-rays generated by inverse compton scattering (laser compton scattering) resulting from collision of laser beams with high energy electron beams from a linear accelerator. Still alternatively, X-rays may be generated by synchrotron radiation or may be generated from an undulator or a wiggler provided on the lower stage of a particle accelerator.

Use of γ-rays or X-rays having excellent material penetrability enables arrangement of the external unit at the whole surroundings of the airtight container or at any positions such as surroundings, upper and lower parts, right and left parts, and front and rear parts thereof. In order to allow easy penetration of γ-rays or X-rays, no external unit is preferably provided at a position facing the surface to be irradiated.

The γ-rays or X-rays may be replaced by electron beams having a lower penetrability than γ-rays or X-rays. In this case, the external unit is preferably provided at a position other than the position facing the surface to be irradiated with electron beams.

The airtight container itself may be integrated with a warming or heating system.

The combined step (C) may include warming or heating. The warming or heating temperature is preferably 19° C. or higher, more preferably 30° C. or higher, still more preferably 70° C. or higher, while preferably 310° C. or lower.

The sample may be warmed or heated by any method, such as beam heating in which the energy of radiation is converted into thermal energy. In the case of beam heating, the radiation used preferably includes electron beams from an electron accelerator or X-rays generated by applying electron beams from an electron accelerator to a target. Thermal insulation or other components may be provided at the whole surroundings of the airtight container or positions such as surroundings, upper and lower parts, right and left parts, or front and rear parts thereof. In order to allow easy penetration of radiation, no components such as thermal insulation are preferably provided at a position facing the surface to be irradiated.

The disclosure also relates to a method for producing low-molecular-weight polytetrafluoroethylene having a melt viscosity at 380° C. of $1.0 \times 10^2$ to $7.0 \times 10^5$ Pa·s, including (X) irradiating high-molecular-weight polytetrafluoroethylene with radiation under conditions including a sample temperature during the irradiation of not lower than the room temperature transition temperature (Pi dispersion temperature) of polytetrafluoroethylene and not higher than 320° C. and a dose rate of 0.1 kGy/s or higher to provide the low-molecular-weight polytetrafluoroethylene.

The step (X) may be performed in a substantially oxygen-free space, but may be performed in the air atmosphere containing oxygen or may be performed in a component-adjusted air atmosphere. An example of the component-adjusted air is the air containing oxygen provided with 0.5 vol % or more radical-scavenging hydrogen gas or halogen gas in the form of single gas or gas mixture.

A document (Radiat. Phys. Chem. Vol. 50, pp. 611-615, 1997) reports that irradiation of PTFE heated up to a temperature of not higher than the crystal melting point of PTFE can improve the decomposition efficiency.

The inventors found the following. Specifically, in this state, even in the air atmosphere with 21 vol % oxygen, irradiation at an increased temperature using a radiation source such as electron beams having a high dose rate allows progress of scission of the main chain before reactions of generated end radicals with oxygen, promoting the decomposition.

In view of conventional academic, technical common knowledge, irradiation of high-molecular-weight PTFE in an oxygen-containing atmosphere (particularly in the air) is expected to cause oxidative degradation, generating a large amount of C6-C14 perfluorocarboxylic acids or salts thereof. On the contrary, the inventors surprisingly found that even irradiation in the air atmosphere is less likely to generate C6-C14 perfluorocarboxylic acids or salts thereof under the aforementioned conditions where the irradiation temperature is not lower than the pi dispersion temperature and the dose rate is very limited.

The sample temperature during the irradiation in the step (X) is not lower than the room temperature transition temperature ($\beta_1$ dispersion temperature) of PTFE (19° C. or higher), preferably not lower than the room temperature transition temperature ($\beta_2$ dispersion temperature) of PTFE (30° C. or higher), more preferably 50° C. or higher, still more preferably 70° C. or higher, further more preferably 100° C. or higher, particularly preferably not lower than the α dispersion temperature (130° C. or higher). The sample temperature during the irradiation is also 320° C. or lower.

The temperature during the irradiation in the step (X) can be easily measured by, for example, a method of measuring the temperature of the atmosphere where the step is performed using a thermocouple or a platinum resistor, a method of measuring the temperature of the surface or inside of a sample using a thermocouple or a platinum resistor in a contact manner, or a method of measuring the infrared radiation from the surface of a sample using an infrared thermometer.

The sample temperature may change within the range from 19° C. to 320° C. during the irradiation in the step (X).

The radiation in the step (X) may be electron beams or X-rays. The electron beams may be electron beams generated from an electron accelerator. The X-rays may be X-rays generated by applying particle beams from a particle accelerator to a target, or may be quasi-monochromatic X-rays generated by inverse compton scattering resulting from collision of laser beams with high energy electron beams from a linear accelerator. Alternatively, X-rays may be generated by synchrotron radiation or may be generated from an undulator or a wiggler provided on the lower stage of a particle accelerator.

Specifically, the step (X) may be performed by a method in which high-molecular-weight PTFE is fed into a container provided with a warming or heating system and the high-molecular-weight PTFE is irradiated with electron beams or X-rays from the outside of the container while warmed or heated in the air.

The electron beams used may be electron beams generated from an electron accelerator.

The X-rays used may be X-rays generated by applying electron beams from an electron accelerator to a target.

In the case of using X-rays having excellent material penetrability, the heating system may be arranged at the whole surroundings of the container or at any positions such as surroundings, upper and lower parts, right and left parts, and front and rear parts thereof. In order to allow easy penetration of X-rays, no heating system is preferably provided at a position facing the surface to be irradiated.

In the case of using electron beams having a lower material penetrability than X-rays, the heating system is preferably provided at a position other than the position facing the surface to be irradiated with electron beams.

The dose rate in the step (X) is 0.1 kGy/s or higher, preferably 1 kGy/s or higher, more preferably 10 kGy/s or higher, or alternatively preferably 0.1 kGy/pass or higher, more preferably 1 kGy/pass or higher, still more preferably 10 kGy/pass or higher.

The irradiation in the step (X) may be performed continually until the absorbed dose reaches a desired value, or may be performed intermittently and repeatedly until the absorbed doses add up to a desired value. In the case of intermittent and repeated irradiation, the interval of intermittent irradiation operations is preferably five minutes or shorter, more preferably three minutes or shorter, still more preferably one minute or shorter to prevent generation of C6-C14 perfluorocarboxylic acids or salts thereof that is caused by oxidation of residual radicals into peroxy radicals and scission of the PTFE main chain due to oxidative decomposition during the interval of intermittent irradiation operations.

The step (X) may be performed in the presence of a radical-scavenging substance. The radical-scavenging substance may be a substance that is able to be used in the step (2c). The amount and introduction method for the substance may be the amount and method for the step (2c).

In the production method of the disclosure, the irradiation reduces generation of C6-C14 perfluorocarboxylic acids and salts thereof in the step of providing low-molecular-weight PTFE. Thus, the production method is also applicable to the case where the target to be irradiated with radiation is low-molecular-weight PTFE.

In other words, in the aforementioned step (1), combined step (A), combined step (C), or step (X), radiation may be applied to low-molecular-weight PTFE instead of high-molecular-weight PTFE. Also in this case, generation of C6-C14 perfluorocarboxylic acids and salts thereof, particularly of perfluorooctanoic acid and salts thereof can be reduced. This is also a preferred embodiment of the production method of the disclosure.

In this embodiment, the low-molecular-weight PTFE as a target to be irradiated with radiation may have a melt viscosity at 380° C. of $1.0 \times 10^2$ to $7.0 \times 10^5$ Pa·s.

The low-molecular-weight PTFE as a target to be irradiated with radiation may be one obtainable by direct polymerization, or may be one obtainable by pyrolysis of high-molecular-weight PTFE, or may be one obtainable by irradiating high-molecular-weight PTFE with radiation.

The disclosure also relates to a method for producing low-molecular-weight polytetrafluoroethylene having a melt viscosity at 380° C. of $1.0 \times 10^2$ to $7.0 \times 10^5$ Pa·s, including (Y1) irradiating polytetrafluoroethylene having a melt viscosity at 380° C. of $1.0 \times 10^2$ to $7.0 \times 10^5$ Pa·s with radiation in a substantially oxygen-free state and decomposing the polytetrafluoroethylene into a low-molecular-weight component, and (Y2) deactivating, in a substantially oxygen-free state, at least part of main-chain radicals and end radicals generated by the irradiation and providing the low-molecular-weight polytetrafluoroethylene.

Irradiation of PTFE having a low melt viscosity (low molecular weight) with radiation can also reduce generation of C6-C14 perfluorocarboxylic acids and salts thereof, particularly perfluorooctanoic acid and salts thereof.

The PTFE to be irradiated with radiation in the step (Y1) may be one obtainable by direct polymerization, or may be one obtainable by pyrolysis of high-molecular-weight PTFE, or may be one obtainable by irradiating high-molecular-weight PTFE with radiation.

Preferred embodiments and conditions of the step (Y1) may be the same as those of the aforementioned step (1). The irradiation conditions such as the dose of radiation and the irradiation temperature are preferably adjusted in accordance with the target molecular weight (melt viscosity) of low-molecular-weight PTFE.

Preferred embodiments and conditions of the step (Y2) may be the same as those of the aforementioned step (2).

The production method of the disclosure may further include (3) heating the high-molecular-weight PTFE up to a temperature that is not lower than the primary melting point thereof and providing a molded article before the step (1), the combined step (A), the combined step (C), or the step (X). In this case, the molded article obtained in the step (3) can be used as the high-molecular-weight PTFE in the step (1).

The primary melting point is preferably 300° C. or higher, more preferably 310° C. or higher, still more preferably 320° C. or higher.

The primary melting point means the maximum peak temperature on an endothermic curve present on the crystal melting curve when unsintered high-molecular-weight PTFE is analyzed with a differential scanning calorimeter. The endothermic curve is obtainable by increasing the temperature at a temperature-increasing rate of 10° C./min using a differential scanning calorimeter.

The molded article in the step (3) preferably has a specific gravity of 1.0 g/cm$^3$ or higher, more preferably 1.5 g/cm$^3$ or higher, while preferably 2.5 g/cm$^3$ or lower. The molded article having a specific gravity within the above range can have smaller pores or irregularities on the surface, resulting in production of low-molecular-weight PTFE having a small specific surface area.

The specific gravity can be determined by water displacement.

The production method of the disclosure may further include pulverizing the molded article and providing powder of the high-molecular-weight PTFE after the step (3). The molded article may be first coarsely and then finely pulverized.

The production method of the disclosure may further include pulverizing the low-molecular-weight PTFE and providing a low-molecular-weight PTFE powder after the step (2), the combined step (A), the combined step (C), the step (X), or the step (Y2). Even pulverization of the low-molecular-weight PTFE obtainable by the production method of the disclosure does not increase the amount of C6-C14 perfluorocarboxylic acids or salts thereof contained.

The pulverization may be performed by any method, such as pulverization using a pulverizer. Examples of the pulverizer include impact-type pulverizers such as planetary mills, hammer mills, pin mills, and jet mills, and grinding-type pulverizers utilizing shearing force generated by unevenness between a rotary blade and a peripheral stator, such as cutter mills.

The pulverization temperature is preferably not lower than −200° C. but lower than 50° C. In the case of freeze pulverization, the pulverization temperature is usually −200° C. to −100° C. Still, the pulverization may be performed around room temperature (10° C. to 30° C.). Freeze pulverization is usually achieved by the use of liquid nitrogen, but such pulverization requires enormous equipment and high pulverization cost. In order to simplify the step and reduce the pulverization cost, the pulverization temperature is more preferably not lower than 10° C. but lower than 50° C., still more preferably 10° C. to 40° C., particularly preferably 10° C. to 30° C.

The pulverization may be followed by removal of fine particles and fibrous particles by air classification, and further followed by removal of coarse particles by classification.

In the air classification, the pulverized particles are sent to a cylindrical classification chamber by decompressed air and dispersed by swirl flow inside the chamber, and fine particles are classified by centrifugal force. The fine particles are collected from the central portion into a cyclone and a bag filter. Inside the classification chamber is provided a rotary device such as a circular-cone-like cone or rotor configured to achieve homogeneous gyrating movement of the pulverized particles and the air.

In the case of using classification cones, the classification point is adjusted by controlling the volume of the secondary air and the gap between classification cones. In the case of using a rotor, the air volume inside the classification chamber is adjusted by the number of rotations of the rotor.

Examples of the method of removing coarse particles include air classification, vibration sieving, and ultrasonic sieving with meshes. Air classification is preferred.

The production method of the disclosure may further include (4) storing the low-molecular-weight PTFE obtained in the step (2), the combined step (A), the combined step (C), the step (X), or the step (Y2) in an environment blocking the ultraviolet rays of a natural environment.

When the low-molecular-weight PTFE obtained in the step (2), the combined step (A), the combined step (C), the step (X), or the step (Y2) is exposed to the air, peroxides may be generated from slightly remaining main-chain radicals and/or end radicals. Exposure of these peroxides to ultraviolet rays may regenerate main-chain radicals and/or end radicals. In particular, when end radicals are regenerated, C6-C14 perfluorocarboxylic acids or salts thereof may unfortunately be generated.

Performing the step (4) can reduce generation of C6-C14 perfluorocarboxylic acids or salts thereof for a long time.

The ultraviolet rays blocked in the step (4) may be ultraviolet rays including visible light at a wavelength of 450 nm or shorter. The ultraviolet rays are preferably ultraviolet rays at a wavelength of 400 nm or shorter, more preferably ultraviolet rays at a wavelength of 385 nm or shorter. The lower limit of the wavelength of the ultraviolet rays is preferably 200 nm.

The storage in the step (4) may be performed by maintaining the low-molecular-weight PTFE in a container having an ability to block the ultraviolet rays or by maintaining a container containing the low-molecular-weight PTFE in a space (e.g., warehouse) having an ability to block the ultraviolet rays.

The temperature of the storage environment in the step (4) is preferably not higher than the α dispersion temperature of non-crosslinked PTFE, more preferably −273° C. to 130° C., still more preferably −196° C. to 130° C., further more preferably −80° C. to 70° C. Storage at a temperature within the above range can further reduce generation of C6-C14 perfluorocarboxylic acids or salts thereof during storage.

Next, the following describes high-molecular-weight PTFE to be irradiated with radiation in the step (1), the combined step (A), the combined step (C), or the step (X) of the production method of the disclosure and low-molecular-weight PTFE obtainable after the step (2), the combined step (A), the combined step (C), or the step (X).

The following also describes PTFE to be irradiated with radiation in the step (Y1) and low-molecular-weight PTFE obtainable after the step (Y2).

The low-molecular-weight PTFE obtainable after the step (2), the combined step (A), the combined step (C), or the step (X) has a melt viscosity at 380° C. of $1.0 \times 10^2$ to $7.0 \times 10^5$ Pa·s. The term "low molecular weight" herein means that the melt viscosity is within the above range.

The melt viscosity is preferably $1.0 \times 10^3$ Pa·s or higher, more preferably $1.5 \times 10^3$ Pa·s or higher, while preferably $3.0 \times 10^5$ Pa·s or lower, more preferably $1.0 \times 10^5$ Pa·s or lower.

The low-molecular-weight PTFE obtainable after the step (Y2) has a melt viscosity at 380° C. of $1.0 \times 10^2$ to $7.0 \times 10^5$ Pa·s. The melt viscosity is preferably $3.0 \times 10^5$ Pa·s or lower, more preferably $1.0 \times 10^5$ Pa·s or lower.

The PTFE to be irradiated in the step (Y1) has a melt viscosity at 380° C. of $1.0 \times 10^2$ to $7.0 \times 10^5$ Pa·s. The melt viscosity is preferably $5.0 \times 10^2$ Pa·s or higher, more preferably $1.0 \times 10^3$ Pa·s or higher, still more preferably $1.5 \times 10^3$ Pa·s or higher.

The melt viscosity is a value determined by heating a 2-g sample at 380° C. for five minutes in advance and then keeping this sample at this temperature under a load of 0.7 MPa using a flow tester (available from Shimadzu Corp.) and a 2φ-8 L die in conformity with ASTM D1238.

The high-molecular-weight PTFE to be irradiated with radiation preferably has a standard specific gravity (SSG) of 2.130 to 2.230. The standard specific gravity (SSG) is a value determined in conformity with ASTM D4895.

The high-molecular-weight PTFE has a significantly higher melt viscosity than the low-molecular-weight PTFE, and thus the melt viscosity thereof is difficult to measure accurately. In contrast, the melt viscosity of the low-molecular-weight PTFE is measurable, but the low-molecular-weight PTFE has difficulty in providing a molded article usable for measurement of standard specific gravity. Thus, the standard specific gravity thereof is difficult to measure accurately. Therefore, in the disclosure, the standard specific gravity is used as an indicator of the molecular weight of the high-molecular-weight PTFE to be irradiated with radiation, while the melt viscosity is used as an indicator of the molecular weight of the low-molecular-weight PTFE. For both the high-molecular-weight PTFE and the low-molecular-weight PTFE, no method for determining the molecular weight directly has been known so far.

The high-molecular-weight PTFE may contain perfluorooctanoic acid and salts thereof in a total amount by mass of less than 25 ppb by mass, or not more than 20 ppb by mass, or not more than 15 ppb by mass, or not more than 10 ppb by mass, or not more than 5 ppb by mass, or less than 5 ppb by mass. The lower limit thereof may be, but is not limited to, a value lower than the detection limit.

The amount of the perfluorooctanoic acid and salts thereof can be determined by liquid chromatography.

The low-molecular-weight PTFE has a melting point of 320° C. to 340° C., more preferably 324° C. to 336° C.

The melting point is defined as follows using a differential scanning calorimeter (DSC). Specifically, temperature calibration is performed in advance with indium and lead as standard samples. Then, about 3 mg of low-molecular-weight PTFE is put into an aluminum pan (crimped container), and the temperature is increased at a rate of 10° C./min within the temperature range of 250° C. to 380° C. under air flow at 200 ml/min. The minimum point of the heat of fusion within this range is defined as the melting point.

In the production method of the disclosure, the high-molecular-weight PTFE may be in any form, such as powder (e.g., fine powder, molding powder), a molded article of the high-molecular-weight PTFE, or shavings generated by cutting a molded article of the high-molecular-weight PTFE. The high-molecular-weight PTFE in the form of powder can easily provide powder of the low-molecular-weight PTFE.

The high-molecular-weight PTFE may be crosslinked.

The low-molecular-weight PTFE obtainable by the production method of the disclosure may be in any form, and is preferably in the form of powder.

The low-molecular-weight PTFE obtainable by the production method of the disclosure, when in the form of powder, preferably has a specific surface area of 0.5 to 20 m$^2$/g.

For the low-molecular-weight PTFE powder, both of the following two types are demanded, i.e., a small specific surface area type having a specific surface area of not smaller than 0.5 m$^2$/g but smaller than 7.0 m$^2$/g and a large specific surface area type having a specific surface area of not smaller than 7.0 m$^2$/g and not larger than 20 m$^2$/g.

The low-molecular-weight PTFE powder of a small specific surface area type has an advantage of easy dispersion in a matrix material such as a coating material. In contrast, such powder disperses in a matrix material with a large dispersed particle size, i.e., with poor fine dispersibility.

The low-molecular-weight PTFE powder of a small specific surface area type preferably has a specific surface area of 1.0 m$^2$/g or larger, while preferably 5.0 m$^2$/g or smaller, more preferably 3.0 m$^2$/g or smaller. Suitable examples of the matrix material include plastics and inks, as well as coating materials.

The low-molecular-weight PTFE powder of a large specific surface area type, when dispersed in a matrix material such as a coating material, has advantages of high surface-modifying effects, such as a small dispersed particle size in a matrix material and improved texture of the film surface, and a large amount of oil absorption. In contrast, such powder may not be easily dispersed in a matrix material, for example, may take a long time for dispersion, and may cause an increased viscosity of a coating material, for example.

The low-molecular-weight PTFE powder of a large specific surface area type preferably has a specific surface area of 8.0 m$^2$/g or larger, while preferably 25 m$^2$/g or smaller, more preferably 20 m$^2$/g or smaller. Suitable examples of the matrix material include oils, greases, and coating materials, as well as plastics.

The specific surface area is determined by the BET method using a surface analyzer (trade name: BELSORP-mini II, available from MicrotracBEL Corp.), a gas mixture of 30% nitrogen and 70% helium as carrier gas, and liquid nitrogen for cooling.

The low-molecular-weight PTFE obtainable by the production method of the disclosure, when in the form of powder, preferably has an average particle size of 0.5 to 200 μm, more preferably 50 μm or smaller, still more preferably 25 μm or smaller, particularly preferably 10 μm or smaller. As mentioned here, powder having a relatively small average particle size can provide a film having much better surface smoothness when used as an additive for a coating material, for example.

The average particle size is equivalent to the particle size corresponding to 50% of the cumulative volume in the particle size distribution determined using a laser diffraction particle size distribution analyzer (HELOS & RODOS) available from JEOL Ltd. at a dispersive pressure of 3.0 bar without cascade impaction.

The production method of the disclosure can provide low-molecular-weight PTFE substantially free from C6-C14 perfluorocarboxylic acids and salts thereof after the step (2), the combined step (A), the combined step (C), the step (X), or the step (Y2). The low-molecular-weight PTFE obtainable by the production method of the disclosure may contain C6-C14 perfluorocarboxylic acids and salts thereof in a total amount by mass of not more than 50 ppb, preferably less than 25 ppb, more preferably not more than 20 ppb, still more preferably not more than 15 ppb, further preferably not more than 10 ppb, particularly preferably not more than 5 ppb, most preferably less than 5 ppb. The lower limit of the amount may be, but is not limited to, a value lower than the detection limit, or may be 0.001 ppb or 1 ppb.

The amount of the perfluorocarboxylic acids and salts thereof can be determined by liquid chromatography.

The low-molecular-weight PTFE obtainable by the production method of the disclosure is also characterized by being substantially free from perfluorooctanoic acid and salts thereof. The low-molecular-weight PTFE obtainable by the production method of the disclosure may contain perfluorooctanoic acid and salts thereof in an amount by mass of less than 25 ppb, preferably not more than 20 ppb, more preferably not more than 15 ppb, still more preferably not more than 10 ppb, further preferably not more than 5 ppb, particularly preferably less than 5 ppb. The lower limit may be, but is not limited to, a value lower than the detection limit, or may be 0.001 ppb or 1 ppb.

The amount of perfluorooctanoic acid and salts thereof can be determined by liquid chromatography.

The low-molecular-weight PTFE obtainable after the step (2), the combined step (A), the combined step (C), the step (X), or the step (Y2) is preferably low-molecular-weight PTFE containing an oxygen atom in at least part of the side chains on the main chain or low-molecular-weight PTFE consisting of carbon atoms and fluorine atoms.

The low-molecular-weight PTFE containing an oxygen atom in at least part of the side chains on the main chain or the low-molecular-weight PTFE consisting of carbon atoms and fluorine atoms are each a compound containing a carbon-carbon bond and not containing an oxygen atom at the molecular-chain ends. The molecular structure exhibits the following structure.

(Deactivating Process for Main-Chain Radicals/End Radicals)

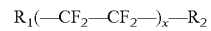

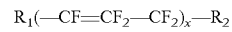

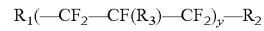

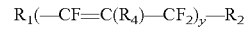

(Deactivating process for end radicals alone)

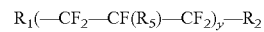

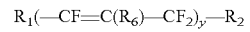

In the formulas, $R_1$s at respective appearances are each independently a hydrogen atom, a fluorine atom, a chlorine atom, a bromine atom, an iodine atom, a —$CF_3$ group, a —$CF=CF_2$ group, a —$CF=CHF$ group, a —$CH_2F$ group, a —$CHF_2$ group, or a —$CH_3$ group.

In the formulas, $R_2$s at respective appearances are each independently a hydrogen atom, a fluorine atom, a chlorine atom, a bromine atom, an iodine atom, a —$CF_3$ group, a —$CF=CF_2$ group, a —$CF=CHF$ group, a —$CH_2F$ group, a —$CHF_2$ group, or a —$CH_3$ group.

In the formulas, $R_3$s at respective appearances are each independently a hydrogen atom, a fluorine atom, a chlorine atom, a bromine atom, an iodine atom, a —$CF_3$ group, a —$CF_2$—$CF_3$ group, a —$CF=CF_2$ group, a —$CF_2CF_2$— group, or a —O—R$_f$ group (wherein R$_f$ is a perfluoroorganic group, preferably a C1-C10 perfluoroalkyl group).

In the formulas, R$_4$s at respective appearances are each independently a hydrogen atom, a fluorine atom, a chlorine atom, a bromine atom, an iodine atom, a —CF$_3$ group, a —CF$_2$—CF$_3$ group, a —CF═CF$_2$ group, a —CF$_2$CF$_2$— group, or a —O—R$_f$ group (wherein R$_f$ is a perfluoroorganic group, preferably a C1-C10 perfluoroalkyl group).

In the formulas, R$_5$s at respective appearances are each independently a hydrogen atom, a fluorine atom, a chlorine atom, a bromine atom, an iodine atom, a —CF$_3$ group, a —CF$_2$—CF$_3$ group, a —CF═CF$_2$ group, a —CF$_2$CF$_2$— group, a —O—R$_f$ group (wherein R$_f$ is a perfluoroorganic group, preferably a C1-C10 perfluoroalkyl group), a —OH group, a —OF group, a —OCl group, a —OBr group, a —OI group, a —O—CF$_3$ group, a —O—CF$_2$—CF$_3$ group, or a —O—O. (peroxy radical).

In the formulas, R$_6$s at respective appearances are each independently a hydrogen atom, a fluorine atom, a chlorine atom, a bromine atom, an iodine atom, a —CF$_3$ group, a —CF$_2$—CF$_3$ group, a —CF═CF$_2$ group, a —CF$_2$CF$_2$— group, a —O—R$_f$ group (wherein R$_f$ is a perfluoroorganic group, preferably a C1-C10 perfluoroalkyl group), a —OH group, a —OF group, a —OCl group, a —OBr group, a —OI group, a —O—CF$_3$ group, or a —O—CF$_2$—CF$_3$ group.

In the formulas, x is an integer of 1 to 1000, preferably 2 to 500.

In the formulas, y is an integer of 1 to 1000, preferably 2 to 500.

The molecular structure can be specified by measurement using a $^{19}$F nuclear magnetic resonance device (NMR), as well as a technique such as one using a device such as a Fourier transform infrared spectrometer (FT-IR), Fourier transform Raman spectroscopy (FT-Raman), or X-ray photoelectron spectroscopy (XPS).

The low-molecular-weight PTFE preferably has a ratio (main-chain radical/end radical) of the intensity of the signal corresponding to the main-chain radicals to the intensity of the signal corresponding to the end radicals obtainable by electron spin resonance (ESR) measurement of 10/1 or higher, more preferably 15/1 or higher, more preferably 20/1 or higher, still more preferably 30/1 or higher.

When the signal (double quintet) corresponding to the main-chain radicals and the signal (triplet) corresponding to the end radicals are clearly detected in ESR measurement in a vacuum, the ratio is calculated based on the intensities of these signals. When the signals are not clearly detected in a vacuum, the ratio is calculated based on the intensities of the signals corresponding to the main chain (asymmetric) peroxy radicals and to the end (symmetric) peroxy radicals detected in ESR measurement after a sample is exposed to the air. In particular, measurement at the liquid nitrogen temperature is useful for separation of peroxy radicals.

Many end radicals remain in the low-molecular-weight PTFE obtained by a conventional method of irradiating high-molecular-weight PTFE with radiation in the air atmosphere (without radical deactivation in the step (2)). Thus, the above ratio fails to fall within the above range.

The low-molecular-weight PTFE preferably contains at least one selected from the group consisting of a hydrogen-atom-containing molecular structure and a double-bond-containing molecular chain in the molecule.

Examples of the hydrogen-atom-containing molecular structure include —CHF—, ═CHF, —CFH$_2$, a —CH$_3$ group, and a —CHF$_2$ group.

Examples of the double-bond-containing molecular chain include structures such as —CF═CF—, —CF═CF$_2$, and —CF═CF—CF$_3$.

The low-molecular-weight PTFE also preferably contains a molecular structure represented by —CF$_2$CF(CF$_3$)CF$_2$— or —CF(CF$_3$)$_2$, for example.

In the case of using an airtight container formed from a hydrogen-atom-containing material as the airtight container where the step (1) is to be performed, the irradiation causes the airtight container to generate radiolytically decomposed gas that contains hydrogen gas as a principal component. Use of the radiolytically decomposed gas as a radical-scavenging gas in the step (2c) can form a hydrogen-atom-containing molecular structure or a double-bond-containing molecular chain inside the resulting low-molecular-weight PTFE.

The hydrogen-atom-containing material is preferably an organic hydrogen-atom-containing material, and examples thereof include rubbery hydrogen-atom-containing materials such as ethylene-propylene rubber, tetrafluoroethylene-propylene rubber, and a polyester elastomer, and thermoplastic organic hydrogen-atom-containing materials such as polyesters, e.g., polyethylene terephthalate (PET), polyamide (PA), polyethylene (PE), polyamide-imide (PAI), thermoplastic polyimide (TPI), polyphenylene sulfide (PPS), polyether imide (PEI), cyclic polyolefins (COP), polyvinylidene fluoride, and ethylene-tetrafluoroethylene copolymers.

Also, direct use of hydrogen gas as a radical-scavenging gas in the step (2c) can form a hydrogen-atom-containing molecular structure or a double-bond-containing molecular chain inside the resulting low-molecular-weight PTFE.

The presence of the aforementioned structures in the molecule of the low-molecular-weight PTFE can be confirmed by $^{19}$F MAS NMR under any of the following measurement conditions.

<Measurement Conditions (1)>
  Device: VNS600 available from Varian, Inc.
  Resonance frequency: 564.491 MHz
  Observation nucleus: $^{19}$F
  Sample tube diameter: 1.2 mmφ
  Rotational speed: 50 kHz
  Measurement temperature: rt (23.3° C.)
  Measurement method: single pulse method
  Number of scans: 512 or more
  Relaxation delay: 5 s or longer
  Pulse width: 1.15 μs
<Measurement Conditions (2)>
  Device: AVANCE III HD400 available from Bruker
  Resonance frequency: 376.6412776 MHz
  Observation nucleus: $^{19}$F
  Sample tube diameter: 1.3 mmφ
  Rotational speed: 60 kHz
  Measurement temperature: 70° C.
  Measurement method: single pulse method
  Number of scans: 10 thousands or more
  Relaxation delay: 5 s or longer
  Pulse width: 0.8 μs The signal assigned to —CHF$_2$ is observed at around −140 ppm, the signal assigned to ═CHF is observed at around −150 ppm, and the signal assigned to —CHF— or —CFH$_2$ is observed at around a range from −210 ppm to −215 ppm. The signal assigned to —CF═CF— is observed at around −156 ppm. The signals assigned to —CF═CF$_2$ are observed at around −92 ppm and at around −190 ppm. The signals assigned to —CF═CF—CF$_3$ are observed at around −75 ppm and at around −128 ppm. The signals assigned to —CF$_2$CF(CF$_3$)CF$_2$— are observed at around −71 ppm and at around −114 ppm. The signal assigned to —CF(CF$_3$)$_2$ is observed at around −58 ppm.

The presence of the structure containing a hydrogen atom in the low-molecular-weight PTFE can be confirmed by $^1$H NMR measurement under the following measurement conditions and subsequently by $^{13}$C CP/MAS NMR measurement.

<Measurement Conditions (3)>

Device: AVANCEIII600 wide-bore spectrometer available from Bruker
Resonance frequency: hydrogen 600.23 MHz
carbon 150.9 MHz
Observation nuclei: $^1$H and $^{13}$C
Sample tube diameter: 2.5 mmϕ or 4.0 mmϕ
Rotational speed: 6 kHz
Measurement temperature: rt (24.1° C.)
Decoupling method: CW/TPPM method
Time constant: 3.0 ms
Number of scans: 65,536 or more The above measurement can detect the signal assigned to —CH$_3$ at around 17 ppm.

Electron spin resonance (ESR) measurement in a vacuum of the low-molecular-weight PTFE obtained through the steps (1) and (2) in a vacuum with no contact with oxygen can detect a triplet peak corresponding to the end radicals and a double quintet peak corresponding to the main-chain radicals (alkyl radicals).

The ratio M/A is preferably lower than 3.0, more preferably lower than 2.5, still more preferably lower than 2.0, wherein M represents the central peak height of the triplet and A represents the peak height of the double quintet.

The ratio A/M is preferably higher than 0.3, more preferably higher than 0.4, still more preferably higher than 0.45.

Figure 3:
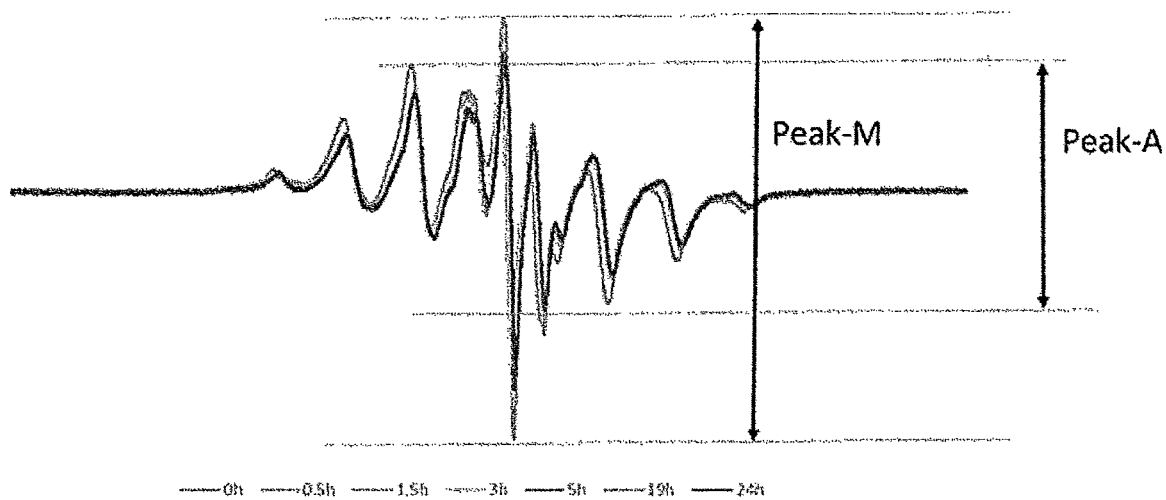
FIG. 3 is a diagram of exemplary peaks obtained by electron spin resonance (ESR) measurement in a vacuum.

FIG. 3 shows an example of the above peaks.

The ESR measurement is performed in a vacuum under the following conditions.

Device: JES-X330 available from JEOL Ltd.
Measurement temperature: 23±1° C.
Microwave frequency: 9.42 to 9.44 GHz
Microwave outputs: 0.1 mW and 0.04 mW
Center field: 337.0 mT
Sweep width: ±25 mT
Sweep time: 2 min
Time constant: 0.1 s
Field modulation width: 0.2 mT
Number of scans: 1
Modulation frequency: 100 kHz The disclosure also relates to a low-molecular-weight polytetrafluoroethylene (hereinafter, also referred to as a low-molecular-weight PTFE (1)) having a melt viscosity at 380° C. of 1.0×10$^2$ to 7.0×10$^5$ Pa·s, exhibiting peaks that are obtainable by electron spin resonance (ESR) measurement in an air and that satisfy the following relational expressions (1) and (2), and containing less than 25 ppb by mass of perfluorooctanoic acid and salts thereof, Relational expression (1): Peak M2/Peak A1≥1.0 wherein Peak M2 represents an absolute value of a negative peak intensity that corresponds to a peroxy radical scavenged on a molecular-chain end of the low-molecular-weight polytetrafluoroethylene; and Peak A1 represents an absolute value of a negative peak intensity that corresponds to an alkyl peroxy radical scavenged on a main chain of the low-molecular-weight polytetrafluoroethylene, Relational expression (2): Peak M2/Peak M3<1.0 wherein Peak M2 represents the absolute value of the negative peak intensity that corresponds to a peroxy radical scavenged on a molecular-chain end of the low-molecular-weight polytetrafluoroethylene; and Peak M3 represents an absolute value of a positive peak intensity that corresponds to a peroxy radical scavenged on a molecular-chain end of the low-molecular-weight polytetrafluoroethylene.

The low-molecular-weight PTFE (1) exhibits peaks that are obtainable by ESR measurement in the air and that satisfy the above relational expressions (1) and (2). This means that alkyl peroxy radicals on the main chain are present in a proportion of 90.91% or higher of peroxy radicals scavenged on molecular-chain ends.

The ESR measurement is performed in the air under the following conditions.

Device: JES-RE2X available from JEOL Ltd.
Measurement temperature: 24±2° C.
Microwave frequency: 9.42 to 9.44 GHz
Microwave outputs: 0.1 mW and 0.04 mW
Center field: 333.0 mT
Sweep width: ±15 mT or ±25 mT
Sweep time: 2 min
Time constant: 0.1 s
Field modulation width: 0.2 mT
Number of scans: 1
Modulation frequency: 100 kHz The ESR measurement (in the air) mainly observes a negative peak M2 corresponding to peroxy radicals scavenged on molecular-chain ends of the low-molecular-weight PTFE, a positive peak M3 corresponding to peroxy radicals scavenged on molecular-chain ends of the low-molecular-weight PTFE, and a negative peak A1 corresponding to alkyl peroxy radicals scavenged on the main chain of the low-molecular-weight PTFE.

The peak M2 may be a positive peak observed at a field intensity of 332.0 to 333.0 mT.

The peak M3 may be a negative peak observed at a field intensity of 333.2 to 334.2 mT.

The peak A1 may be a negative peak observed at a field intensity of 334.5 to 335.5 mT.

Figure 4:
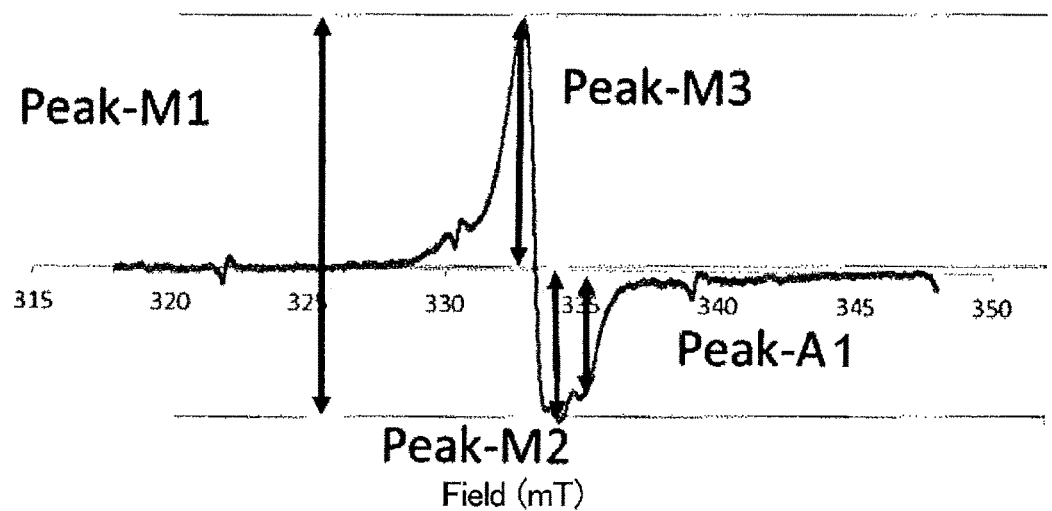
FIG. 4 is a diagram of exemplary peaks obtained by electron spin resonance (ESR) measurement in the atmosphere.

FIG. 4 shows examples of these peaks. A combination of the peaks M2 and M3 is expressed as the peak M1.

The low-molecular-weight PTFE obtained by irradiation in the presence of oxygen has a low peak A1.

In the relational expression (1), Peak M2 represents the absolute value of the intensity of the above Peak M2 and Peak A1 represents the absolute value of the intensity of the above peak A1.

In the relational expression (1), Peak M2/Peak A1 is 1.0 or higher, preferably 1.2 or higher. Peak M2/Peak A1 may also be 6.0 or lower, preferably 5.5 or lower.

In the relational expression (2), Peak M2 represents the absolute value of the intensity of the above peak M2 and Peak M3 represents the absolute value of the intensity of the above peak M3.

In the relational expression (2), Peak M2/Peak M3 is lower than 1.0, preferably 0.9 or lower. Peak M2/Peak M3 may also be 0.1 or higher, preferably 0.2 or higher.

The low-molecular-weight PTFE (1) is also preferably a TFE homopolymer.

The disclosure also relates to a low-molecular-weight polytetrafluoroethylene (hereinafter, also referred to as a low-molecular-weight PTFE (2)) containing at least one hydrogen-atom-containing molecular structure selected from the group consisting of =CHF, —CHF—, —CH$_2$F, —CHF$_2$, and —CH$_3$, CF$_3$— at a molecular-chain end, and at least one double-bond-containing molecular structure selected from the group consisting of —CF=CF—, —CF=CF$_2$, and —CF=CF—CF$_3$, the low-molecular-weight polytetrafluoroethylene having a melt viscosity at 380° C. of 1.0×10$^2$ to 7.0×10$^5$ Pa·s, and containing less than 25 ppb by mass of perfluorooctanoic acid and salts thereof.

The low-molecular-weight PTFE (2) contains at least one hydrogen-atom-containing molecular structure selected from the group consisting of —CHF—, =CHF, —CH$_2$F, —CHF$_2$, and —CH$_3$, CF$_3$— at a molecular-chain end, and at least one double-bond-containing molecular structure selected from the group consisting of —CF=CF—, —CF=CF$_2$, and —CF=CF—CF$_3$. Thereby, the low-molecular-weight PTFE (2) has excellent miscibility with a different organic substance containing a hydrogen atom.

The low-molecular-weight PTFE (2) preferably contains at least one hydrogen-atom-containing molecular structure selected from the group consisting of —CHF—, =CHF, —CH$_2$F, and —CHF$_2$, CF$_3$— at a molecular-chain end, and a molecular structure represented by —CF=CF—CF$_3$, more preferably contains a molecular structure represented by —CHF—, =CHF, —CH$_2$F, and —CHF$_2$, CF$_3$— at a molecular-chain end, and a molecular structure represented by —CF=CF—CF$_3$.

The presence of the aforementioned structures in the molecule of the low-molecular-weight PTFE can be confirmed by $^{19}$F MAS NMR. The measurement conditions and the positions of the signals assigned to the respective structures are as described above.

The disclosure also relates to a low-molecular-weight polytetrafluoroethylene (hereinafter, also referred to as a low-molecular-weight PTFE (3)) containing at least one molecular structure selected from the group consisting of —CF$_2$CF(CF$_3$)CF$_2$— and —CF(CF$_3$)$_2$, CF$_3$— at a molecular-chain end, and at least one double-bond-containing molecular structure selected from the group consisting of —CF=CF—, —CF=CF$_2$, and —CF=CF—CF$_3$, the low-molecular-weight polytetrafluoroethylene having a melt viscosity at 380° C. of 1.0×10$^2$ to 7.0×10$^5$ Pa·s, and containing less than 25 ppb by mass of perfluorooctanoic acid and salts thereof.

The low-molecular-weight PTFE (3) contains at least one molecular structure selected from the group consisting of —CF$_2$CF(CF$_3$)CF$_2$— and —CF(CF$_3$)$_2$, CF$_3$— at a molecular-chain end, and at least one double-bond-containing molecular structure selected from the group consisting of —CF=CF—, —CF=CF$_2$, and —CF=CF—CF$_3$.

The low-molecular-weight PTFE (3) preferably contains a molecular structure represented by CF$_2$CF(CF$_3$)CF$_2$— and —CF(CF$_3$)$_2$, CF$_3$— at a molecular-chain end, and a molecular structure represented by —CF=CF—, —CF=CF$_2$ and —CF=CF—CF$_3$.

The low-molecular-weight PTFE (3) also preferably contains a molecular structure represented by —CF$_2$CF(CF$_3$)CF$_2$—, CF$_3$— at a molecular-chain end, and a molecular structure represented by —CF=CF—CF$_3$.

The presence of the aforementioned structures in the molecule of the low-molecular-weight PTFE can be confirmed by $^{19}$F MAS NMR. The measurement conditions and the positions of the signals assigned to the respective structures are as described above.

A preferred melt viscosity and a preferred amount of perfluorooctanoic acid and salts thereof of the low-molecular-weight PTFEs (1) to (3) are the same as those described for the low-molecular-weight PTFE obtainable by any of the production methods of the disclosure.

The low-molecular-weight PTFEs (1) to (3) are obtainable by any of the aforementioned production methods of the disclosure, for example.

The low-molecular-weight PTFE preferably contains 5 or less carboxyl groups at ends of the molecular chain per 10$^6$ carbon atoms in the main chain. The number of carboxyl groups is more preferably 4 or less, still more preferably 3 or less, per 10$^6$ carbon atoms in the main chain. The lower limit thereof may be, but is not limited to, a value lower than the detection limit. The carboxyl groups are generated at ends of the molecular chain of the low-molecular-weight PTFE by, for example, irradiation of the high-molecular-weight PTFE with the radiation in the presence of oxygen.

The number of carboxyl groups is a value determined by the following method. The detection limit of this measurement method is 0.5.

(Measurement Method)

The following measurement is performed in conformity with the method of analyzing end groups described in JP H04-20507 A.

Low-molecular-weight PTFE powder is pre-formed with a hand press, so that a film having a thickness of 0.1 to 1.0 mm is prepared. The resulting film is subjected to infrared absorption spectrum analysis. PTFE with completely fluorinated ends produced by a contact with fluorine gas is also subjected to infrared absorption spectrum analysis. Based on the difference spectrum therebetween, the number of end carboxyl groups is calculated by the following formula.

Number of end carboxyl groups (per 10$^6$ carbon atoms)=$(l \times K)/t$ l: absorbance
K: correction coefficient
t: film thickness (mm)

The absorption frequency and correction coefficient of the carboxyl group are respectively set to about 3560 cm$^{-1}$ and 440.

The low-molecular-weight PTFE also contains smaller amounts of functional groups other than the carboxyl group that may be generated by irradiation in the presence of oxygen or reactions of radicals generated by the irradiation with oxygen. Examples of the functional groups other than the carboxyl group include an acid fluoride group (—COF) at a molecular-chain end and a carbonyl group (—CO—) in the molecular chain.

The low-molecular-weight PTFE preferably has an absorbance corresponding to the acid fluoride group at a molecular-chain end of 0.025 or lower, more preferably 0.020 or lower. The lower limit may be, but is not limited to, a value lower than the detection limit.

The absorbance corresponding to the carbonyl group in the molecular chain is preferably 0.020 or lower, more preferably 0.010 or lower. The lower limit may be, but is not limited to, a value lower than the detection limit.

The absorbance is a value measured in conformity with the method of analyzing end groups described in JP H04-20507 A.

The absorption frequency of the acid fluoride group is around 1880 cm$^{-1}$ and the absorption frequency of the carbonyl group is around 1810 cm$^{-1}$.

The low-molecular-weight PTFE may contain, at ends of the molecular chain, unstable end groups derived from the chemical structure of a polymerization initiator or chain-transfer agent used in the polymerization reaction for the high-molecular-weight PTFE. Examples of the unstable end groups include, but are not limited to, —CH$_2$OH, —COOH, and —COOCH$_3$.

The low-molecular-weight PTFE may be one having undergone stabilization of the unstable end groups. The unstable end groups may be stabilized by any method, such as a method of exposing the unstable end groups to fluorine-containing gas to convert them into trifluoromethyl groups (—$CF_3$), for example.

The low-molecular-weight PTFE may contain amidated ends. The end amidation may be performed by any method, such as a method of bringing fluorocarbonyl groups (—COF) obtained by exposure to fluorine-containing gas into contact with ammonia gas as disclosed in JP H04-20507 A, for example.

The low-molecular-weight PTFE with stabilization or end amidation of the unstable end groups as described above can be well compatible with opposite materials and have improved dispersibility when used as an additive for opposite materials such as coating materials, greases, cosmetics, plating solutions, toners, and plastics.

The PTFE to be irradiated with radiation may be a homo-PTFE consisting only of a tetrafluoroethylene (TFE) unit or may be a modified PTFE containing a TFE unit and a modifying monomer unit based on a modifying monomer copolymerizable with TFE. In the production method of the disclosure, the composition of the polymer is not changed. Thus, the low-molecular-weight PTFE has the composition of the PTFE to be irradiated with radiation as it is.

The modified PTFE preferably contains the modifying monomer unit in an amount of 0.001 to 1% by mass, more preferably 0.01% by mass or more, while more preferably 0.5% by mass or less, still more preferably 0.1% by mass or less, of all monomer units. The term "modifying monomer unit" herein means a moiety that is part of the molecular structure of the modified PTFE and is derived from a modifying monomer. The term "all monomer units" herein means all moieties derived from monomers in the molecular structure of the modified PTFE. The amount of the modifying monomer unit can be determined by a known method such as Fourier transform infrared spectroscopy (FT-IR).

The modifying monomer may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkylethylenes; and ethylene. One modifying monomer may be used, or multiple modifying monomers may be used.

Examples of the perfluorovinyl ether include, but are not limited to, perfluorinated unsaturated compounds represented by the following formula (1):

$$CF_2=CF—ORf \quad (1)$$

(wherein Rf is a perfluoroorganic group). The "perfluoroorganic group" herein means an organic group in which all the hydrogen atoms bonded to any carbon atom are replaced by fluorine atoms. The perfluoroorganic group may contain ether oxygen.

Examples of the perfluorovinyl ether include perfluoro (alkyl vinyl ethers) (PAVEs) represented by the formula (1) in which Rf is a C1-C10 perfluoroalkyl group. The perfluoroalkyl group preferably contains 1 to 5 carbon atoms.

Examples of the perfluoroalkyl group in the PAVE include perfluoromethyl, perfluoroethyl, perfluoropropyl, perfluorobutyl, perfluoropentyl, and perfluorohexyl groups. Preferred is perfluoro(propyl vinyl ether) (PPVE) in which the perfluoroalkyl group is a perfluoropropyl group.

Examples of the perfluorovinyl ether also include those represented by the formula (1) in which Rf is a C4-C9 perfluoro(alkoxyalkyl) group, those represented by the formula (1) in which Rf is a group represented by the following formula:

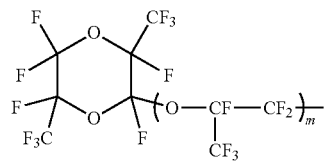

[Chem. 1]

(wherein m is 0 or an integer of 1 to 4), and those represented by the formula (1) in which Rf is a group represented by the following formula:

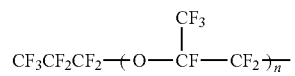

[Chem. 2]

wherein n is an integer of 1 to 4.

Examples of the perfluoroalkylethylenes include, but are not limited to, (perfluorobutyl)ethylene (PFBE), (perfluorohexyl)ethylene, and (perfluorooctyl)ethylene.

The modifying monomer in the modified PTFE is preferably at least one selected from the group consisting of HFP, CTFE, VDF, PPVE, PFBE, and ethylene, more preferably at least one selected from the group consisting of HFP and CTFE.

The low-molecular-weight PTFE can suitably be used as a molding material, an ink, a cosmetic, a coating material, a grease, a component for office automation devices, an additive for modifying toners, an organic photoconductor material for copiers, and an additive for plating solutions, for example. Examples of the molding material include engineering plastics such as polyoxybenzoyl polyester, polyimide, polyamide, polyamide-imide, polyacetal, polycarbonate, and polyphenylene sulfide. The low-molecular-weight PTFE is particularly suitable as a thickening agent for greases.

The low-molecular-weight PTFE can suitably be used as an additive for molding materials for improving the non-adhesiveness and slidability of rollers of copiers, for improving the texture of molded articles of engineering plastics, such as surface sheets of furniture, dashboards of automobiles, and covers of home appliances, and for improving the smoothness and abrasion resistance of machine elements generating mechanical friction, such as light-load bearings, gears, cams, buttons of push-button telephones, movie projectors, camera components, and sliding materials, and as a processing aid for engineering plastics, for example.

The low-molecular-weight PTFE can be used as an additive for coatings for the purpose of improving the smoothness of varnish and paint. The low-molecular-weight PTFE can be used as an additive for cosmetics for the purpose of improving the smoothness of cosmetics such as foundation.

The low-molecular-weight PTFE can also be suitably used for improving the oil or water repellency of wax and for improving the smoothness of greases and toners.

The low-molecular-weight PTFE can be used as an electrode binder of secondary batteries and fuel cells, a hardness adjuster for electrode binders, and a water repellent for electrode surfaces.

The low-molecular-weight PTFE may be combined with a lubricant to provide grease. The grease is characterized by containing the low-molecular-weight PTFE and a lubricant.

Thus, the low-molecular-weight PTFE is uniformly and stably dispersed in the lubricant and the grease exhibits excellent performance such as load resistance, electric insulation, and low moisture absorption.

The lubricant (base oil) may be either mineral oil or synthetic oil. Examples of the lubricant (base oil) include paraffinic or naphthenic mineral oils, and synthetic oils such as synthetic hydrocarbon oils, ester oils, fluorine oils, and silicone oils. In terms of heat resistance, fluorine oils are preferred. Examples of the fluorine oils include perfluoropolyether oil and polychlorotrifluoroethylene with a low polymerization degree. The polychlorotrifluoroethylene with a low polymerization degree may have a weight average molecular weight of 500 to 1200.

The grease may further contain a thickening agent. Examples of the thickening agent include metal soaps, composite metal soaps, bentonite, phthalocyanin, silica gel, urea compounds, urea/urethane compounds, urethane compounds, and imide compounds. Examples of the metal soaps include sodium soap, calcium soap, aluminum soap, and lithium soap. Examples of the urea compounds, urea/urethane compounds, and urethane compounds include diurea compounds, triurea compounds, tetraurea compounds, other polyurea compounds, urea/urethane compounds, diurethane compounds, and mixtures thereof.

The grease preferably contains the low-molecular-weight PTFE in an amount of 0.1 to 60% by mass, more preferably 0.5% by mass or more, still more preferably 5% by mass or more, while more preferably 50% by mass or less. A grease containing too large an amount of the low-molecular-weight PTFE may be too hard to exert sufficient lubrication. A grease containing too small an amount of the low-molecular-weight PTFE may fail to exert the sealability.

The grease may also contain any of additives such as solid lubricants, extreme pressure agents, antioxidants, oilness agents, anticorrosives, viscosity index improvers, and detergent dispersants.

EXAMPLES

The disclosure is more specifically described below with reference to examples. Still, the disclosure is not intended to be limited to the examples.

The parameters in the examples were determined by the following methods.

Melt Viscosity

The melt viscosity was determined by heating a 2-g sample at 380° C. for five minutes in advance and then keeping this sample at this temperature under a load of 0.7 MPa using a flow tester (available from Shimadzu Corp.) and a 2ϕ-8 L die in conformity with ASTM D1238.

Number of End Carboxyl Groups

The following measurement was performed in conformity with the method of analyzing end groups described in JP H04-20507 A.

Low-molecular-weight PTFE powder was pre-formed with a hand press, so that a film having a thickness of 0.1 to 1.0 mm was produced. The resulting film was subjected to infrared absorption spectrum analysis. PTFE with completely fluorinated ends produced by a contact with fluorine gas was also subjected to infrared absorption spectrum analysis. Based on the difference spectrum therebetween, the number of end carboxyl groups was calculated by the following formula.

Number of end carboxyl groups (per $10^6$ carbon atoms)=$(l \times K)/t$ l: absorbance
K: correction coefficient
t: film thickness (mm)

The absorption frequency and correction coefficient of the carboxyl group were respectively set to about 3560 cm$^{-1}$ and 440.

The absorption frequency of the acid fluoride group and the absorption frequency of the carbonyl group were respectively set to around 1880 cm$^{-1}$ and around 1810 cm$^{-1}$.

Amount of Perfluorooctanoic Acid and Salts Thereof (PFOA)

The amount of perfluorooctanoic acid and salts thereof was determined using a liquid chromatography-mass spectrometer (LC-MS ACQUITY UPLC/TQD, Waters). First, 1 g of measurement powder was mixed with 5 mL of acetonitrile and the mixture was sonicated for 60 minutes, so that perfluorooctanoic acid was extracted. The resulting liquid phase was analyzed by multiple reaction monitoring (MRM). Acetonitrile (A) and an aqueous ammonium acetate solution (20 mmol/L) (B) were delivered at a predetermined concentration gradient (A/B=40/60 for 2 min and 80/20 for 1 min) as mobile phases. A separation column (ACQUITY UPLC BEH C18 1.7 μm) was used at a column temperature of 40° C. and an injection volume of 5 μL. Electrospray ionization (ESI) in a negative mode was used for ionization, the cone voltage was set to 25 V, and the ratio of the molecular weight of precursor ions to the molecular weight of product ions was measured to be 413/369. The amount of perfluorooctanoic acid and salts thereof was calculated by the external standard method. The detection limit of this measurement is 5 ppb.

Amount of C6-C14 Perfluorocarboxylic Acids and Salts Thereof (PFC)

C6-C14 perfluorocarboxylic acids and salts thereof were detected using a liquid chromatography-mass spectrometer (LC-MS ACQUITY UPLC/TQD, Waters). The solution used was the liquid phase extracted in the measurement of perfluorooctanoic acid, and the measurement was performed by MRM. The measurement conditions were based on the measurement conditions for perfluorooctanoic acid, but the concentration gradient was changed (A/B=10/90 for 1.5 min and 90/10 for 3.5 min). The ratio of the molecular weight of precursor ions to the molecular weight of product ions was measured to be 313/269 for perfluorohexanoic acid (C6), 363/319 for perfluoroheptanoic acid (C7), 413/369 for perfluorooctanoic acid (C8), 463/419 for perfluorononanoic acid (C9), 513/469 for perfluorodecanoic acid (C10), 563/519 for perfluoroundecanoic acid (C11), 613/569 for perfluorododecanoic acid (C12), 663/619 for perfluorotridecanoic acid (C13), and 713/669 for perfluorotetradecanoic acid (C14).

The total amount of C6-C14 perfluorocarboxylic acids and salts thereof was calculated from the amount (X) of the perfluorooctanoic acid obtained in the above measurement by the following formula. The detection limit of this measurement is 5 ppb.

$(A_{C6}+A_{C7}+A_{C8}+A_{C9}+A_{C10}+A_{C11}+A_{C12}+A_{C13}+A_{C14})/A_{C8} \times X$ $A_{C6}$: peak area of perfluorohexanoic acid
$A_{C7}$: peak area of perfluoroheptanoic acid
$A_{C8}$: peak area of perfluorooctanoic acid
$A_{C9}$: peak area of perfluorononanoic acid
$A_{C10}$: peak area of perfluorodecanoic acid
$A_{C11}$: peak area of perfluoroundecanoic acid
$A_{C12}$: peak area of perfluorododecanoic acid
$A_{C13}$: peak area of perfluorotridecanoic acid $A_{C14}$: peak area of perfluorotetradecanoic acid X: amount of perfluorooctanoic acid calculated from the MRM measurement result by the external standard method ESR measurement (radical peak ratio and radical retention)

(Measurement in Vacuum)
  Device: JES-X330 available from JEOL Ltd.
  Measurement temperature: 23±1° C.
  Microwave frequency: 9.42 to 9.44 GHz
  Microwave outputs: 0.1 mW and 0.04 mW
  Center field: 337.0 mT
  Sweep width: ±25 mT
  Sweep time: 2 min
  Time constant: 0.1 s
  Field modulation width: 0.2 mT
  Number of scans: 1
  Modulation frequency: 100 kHz (Measurement in Air)
  Device: JES-RE2X available from JEOL Ltd.
  Measurement temperature: 24±2° C.
  Microwave frequency: 9.42 to 9.44 GHz
  Microwave outputs: 0.1 mW and 0.04 mW
  Center field: 333.0 mT
  Sweep width: ±15 mT or ±25 mT
  Sweep time: 2 min
  Time constant: 0.1 s
  Field modulation width: 0.2 mT
  Number of scans: 1
  Modulation frequency: 100 kHz The definition of the radical retention is described.

The spectrum intensity (NSI) of ESR can be determined by double integral of the spectrum obtained and can be normalized by the following formula:

$$NSI = \frac{AreaSignal \times SR^2}{gain \times Mod \times \sqrt{P}} \quad \text{[Math. 1]}$$

wherein SR represents the sweep width (mT), P represents the microwave output (mW), gain represents the amplification, AreaSignal represents the spectrum intensity obtained by double integral of the measured ESR spectrum, and Mod represents the modulation width (mT).

The radical concentration (spin/g) can be calculated based on the number of stable radicals ($3.78 \times 10^{23}$ spin/g) of 2,2,6,6-tetramethyl-1-piperidinyloxyl (TEMPO), for example.

The radical retention can be calculated by the following formula using the radical concentrations obtained by the calculation.

Radical retention (%)=$(1-(S_0-S_t)/S_0) \times 100$)

$S_0$ represents the radical concentration immediately after irradiation, and $S_t$ represents the radical concentration at each timing.

A relative retention may be calculated by the following formula using the AreaSignal values if the measurement conditions are the same.

Radical retention (%)=$(1-(AS_0-AS_t)/AS_0) \times 100$)

$AS_0$ represents the AreaSignal value immediately after irradiation, and $AS_t$ represents the AreaSignal value at each time.

Melting Point

A differential scanning calorimeter (DSC) was used. Temperature calibration was performed in advance with indium and lead as standard samples. Then, about 3 mg of low-molecular-weight PTFE was put into an aluminum pan (crimped container), and the temperature was increased at a rate of 10° C./min within the temperature range of 250° C. to 380° C. under air flow at 200 ml/min. The minimum point of the heat of fusion within this range was defined as the melting point.

Z Value

A ϕ50×17 mm petri dish was packed with Low-molecular-weight polytetrafluoroethylene powder to the maximum and the Z value was measured using a color meter ZE6000 (available from Nippon Denshoku Industries Co., Ltd.). A calibration curve was drawn with C/2° selected in the Munsell color system (HV/C) and using a standard (X: 92.69, Y: 94.70, Z: 111.42).

Oxygen Concentration in Airtight Container

The oxygen concentration was determined by analyzing a gaseous layer inside the airtight container by gas chromatography. Moreover, the color tone of oxygen indicator enclosed in the airtight container was observed to change from purple to pink, which demonstrated that the oxygen concentration was less than 2.0 vol % (oxygen free). An oxygen concentration meter was also used to confirm that the oxygen concentration was less than 2.0 vol %.

The same process was performed to confirm that the oxygen concentration was 0.1 vol %.

Example 1

A 5-g portion of a high-molecular-weight PTFE fine powder (1) (standard specific gravity measured in conformity with ASTM D 4895: 2.175, modified polymer 1, concentrations of PFC and PFOA: lower than the detection limit) weighed using a weight balance was sealed into a Pyrex® glass test tube. Then, the test tube was connected to a glass vacuum line equipped with an oil diffusion pump and vacuum-evacuated (degree of vacuum: $10^{-2}$ Pa or lower). The test tube was maintained in this state for 16 hours, and the glass was processed and sealed using a glass burner.

The glass ampule containing the PTFE fine powder in a vacuum was irradiated with 327 kGy of cobalt-60 γ-rays. The irradiation conditions thereof included an average dose rate at the center of the sample of 11 kGy/h and an irradiation temperature of 30° C. Then, the test tube without opening was heated at 150° C. for 20 hours using a forced convection oven (DRX620DA available from Advantec Co., Ltd.). The test tube was cooled down to room temperature and opened, whereby a low-molecular-weight PTFE powder was obtained.

The physical properties of the resulting low-molecular-weight PTFE powder were determined. The results are shown in Table 1.

The peaks of the FTIR difference spectrum of the resulting low-molecular-weight PTFE were assigned to as follows:
  —COH (1778 cm$^{-1}$), —CO— (1813 cm$^{-1}$), —COF (1880 cm$^{-1}$), and —COOH (3556 cm$^{-1}$).

Example 1-2

A 50-g portion of the high-molecular-weight PTFE fine powder (1) weighed using a weight balance was put into a barrier nylon bag. Then, the pressure inside the bag was reduced (−400 torrG) using a vacuum sealer (V-300-10 W available from Fujiimpulse Co., Ltd.) and the bag was sealed by heat sealing. The absence of oxygen inside the bag was confirmed using oxygen detection paper placed in the bag in advance, and then the barrier nylon bag was irradiated with 50 to 300 kGy of γ-rays. The irradiation conditions thereof included an average dose rate at the center of the sample of 10.4 kGy/h and an irradiation temperature of 30° C. The sample was reversed as appropriate so as to make the dose rate uniform.

Then, without opening, the bag was stored at a room temperature of 25° C. for 10 days and opened, whereby a low-molecular-weight PTFE powder was obtained.

The physical properties of the resulting low-molecular-weight PTFE powder were determined as in Example 1. The results are shown in Table 2.

The peaks of the FTIR difference spectrum of the resulting low-molecular-weight PTFE were assigned to as follows:
—COOH (1778 cm$^{-1}$), —CO— (1813 cm$^{-1}$), —COF (1880 cm$^{-1}$), and —COOH (3556 cm$^{-1}$).

Example 1-3

A 1-g portion of the high-molecular-weight PTFE fine powder (1) weighed using a balance was sealed into a quartz sample tube for an electron spin resonance (ESR) device. The test tube was connected to a glass vacuum line equipped with an oil diffusion pump and vacuum-evacuated (degree of vacuum: 10$^{-2}$ Pa or lower). The test tube was maintained in this state for 16 hours, and the glass was processed and sealed using a glass burner.

The ESR sample tube was irradiated with 327 kGy of γ-ray irradiation. The irradiation conditions thereof included a dose rate of 11 kGy/h and an irradiation temperature of 30° C.

The irradiation was followed by ESR measurement (JES-X330 available from JEOL Ltd.) at room temperature. Oven heating (50° C., 100° C., 150° C.) was combined for measurement of the attenuation behavior of residual radicals. The spectrum of the sample after the ESR measurement performed immediately after (30 minutes after) the irradiation showed a double quintet signal that indicates alkyl radicals and a triplet signal that indicates end radicals. Heating at each temperature attenuated the double quintet signal and the triplet signal over time of processing. In particular, no triplet signal was clearly detected after one-hour or longer heating at a temperature of 100° C. or higher. Even in the case of heating at 50° C. for 18-hour or longer caused a failure in clear detection of the triplet signal.

In contrast, the double quintet signal was detected even after heating at 150° C. for 17 hours, but the radical yield was about ⅓ the yield in the measurement immediately after the irradiation. The heated samples with no triplet ESR signal observed in a vacuum environment were opened, exposed to the air, and subjected to ESR measurement. This resulted in observation of only an asymmetric signal of peroxy radicals. This signal is assigned to alkyl-type peroxy radicals on the main chain.

The ESR spectrum of the sample heated at 150° C. in a vacuum is shown in FIG. 1. FIG. 1 shows the 0-hour spectrum and the 17-hour spectrum overlaid with the heights of the spectrum peaks at a field of 332 mT aligned.

Figure 2:
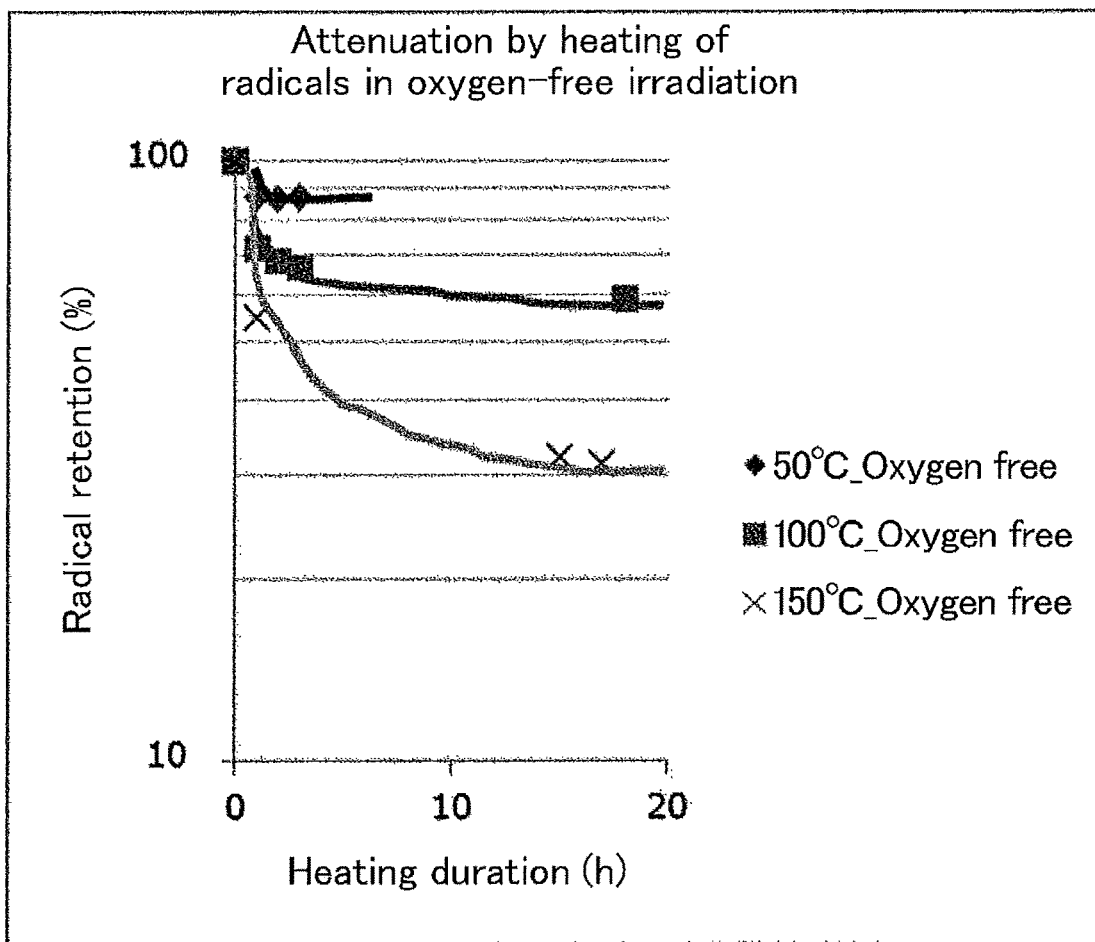
FIG. 2 is a diagram of the attenuation in the yields of the ESR spectra of samples heated at the respective temperatures in a vacuum in Example 1-3 with the yield at 0 hours taken as 100%.

FIG. 2 shows the attenuation in the yields of the ESR spectra of the samples heated at the respective temperatures in a vacuum with the yield at 0 hours taken as 100%.

Example 2

A 0.5-kg portion of the high-molecular-weight PTFE fine powder (1) weighed using a weight balance was put into an aluminum airtight bag (inner bag: polyethylene). Then, introduction of nitrogen gas into the bag and evacuation using an oil rotary pump were repeated 10 times. The pressure inside the bag was reduced (2.7 Pa) and the bag was sealed by heat sealing. The absence of oxygen inside the bag was confirmed using oxygen detection paper placed in the bag in advance, and then the bag was irradiated with 313 kGy of γ-rays. The irradiation conditions thereof included an average dose rate at the center of the sample of 2.42 kGy/h and an irradiation temperature of 30° C. The sample was reversed as appropriate so as to make the dose rate uniform. The irradiation generated hydrogen gas as decomposed gas in the inner bag of the airtight bag.

Then, the bag without opening was heated at 150° C. for 20 hours using a forced convection oven (DRX620DA available from Advantec Co., Ltd.), whereby a low-molecular-weight PTFE powder was obtained.

The physical properties of the resulting low-molecular-weight PTFE powder were determined as in Example 1. The results are shown in Table 1.

The structure of the resulting low-molecular-weight PTFE was analyzed by $^{19}$F solid state MAS NMR. This resulted in clear detection of hydrogen-atom-containing molecular structures such as —CHF$_2$ (around −140 ppm), =CHF (−150 ppm), —CHF—, and —CFH$_2$ (from −210 ppm to −215 ppm) and a molecular-chain-end chemical structure —CF=CF—CF$_3$ (−75 ppm).

For comparison, a low-molecular-weight PTFE (conventional production method) was obtained as in Example 2, except that the irradiation was performed in the presence of oxygen and the heating was not performed. The structure of the resulting low-molecular-weight PTFE (conventional production method) was analyzed by $^{19}$F solid state MAS NMR. As a result, the hydrogen-atom-containing chemical structure species and the molecular-chain-end —CF=CF—CF$_3$ (−75 ppm), which were detected in the NMR analysis of the low-molecular-weight PTFE in Example 2, were hardly detected, but oxygen-atom-containing —CF=O (−64 ppm), which was hardly detected in Example 2, was clearly observed.

Example 3

A low-molecular-weight PTFE powder was obtained as in Example 2, except that the high-molecular-weight PTFE fine powder (1) was replaced by a high-molecular-weight PTFE fine powder (2) (standard specific gravity measured in conformity with ASTM D 4895: 2.168, concentrations of PFC and PFOA: lower than the detection limit).

The physical properties of the resulting low-molecular-weight PTFE powder were determined as in Example 1. The results are shown in Table 1.

The structure of the resulting low-molecular-weight PTFE was analyzed by $^{19}$F solid state MAS NMR. This resulted in clear detection of hydrogen-atom-containing molecular structures such as —CHF$_2$ (around −140 ppm), =CHF (−150 ppm), —CHF—, and —CFH$_2$ (from −210 ppm to −215 ppm) and a molecular-chain-end chemical structure —CF═CF—CF$_3$ (−75 ppm).

For comparison, a low-molecular-weight PTFE (conventional production method) was obtained as in Example 2, except that the irradiation was performed in the presence of oxygen and the heating was not performed. The structure of the resulting low-molecular-weight PTFE (conventional production method) was analyzed by $^{19}$F solid state MAS NMR. As a result, the hydrogen-atom-containing chemical structure species and the molecular-chain-end —CF═CF—CF$_3$ (−75 ppm), which were detected in the NMR analysis of the low-molecular-weight PTFE in Example 3, were hardly detected, but oxygen-atom-containing —CF═O (−64 ppm), which was hardly detected in Example 3, was clearly observed.

Example 4

A 11-kg portion of the high-molecular-weight PTFE fine powder (1) weighed using a weight balance was put into an aluminum airtight bag (inner bag: polyethylene). Then, the inside of the bag was evacuated using an oil rotary pump. The pressure inside the bag was reduced (2E-2 torr) and the bag was sealed by heat sealing. The absence of oxygen inside the bag was confirmed using oxygen detection paper placed in the bag in advance, and then the bag was irradiated with 313 kGy of γ-rays. The irradiation conditions thereof included an average dose rate at the center of the sample of 2.42 kGy/h and an irradiation temperature of 30° C. The sample was reversed as appropriate so as to make the dose rate uniform. The irradiation generated hydrogen gas as decomposed gas in the inner bag of the airtight bag.

Then, the bag without opening was heated at 150° C. for 20 hours using a forced convection oven (DRX620DA available from Advantec Co., Ltd.), whereby a low-molecular-weight PTFE powder was obtained.

The physical properties of the resulting low-molecular-weight PTFE powder were determined as in Example 1. The results are shown in Table 1.

Comparative Example 1

A low-molecular-weight PTFE powder was obtained as in Example 1, except that the oxygen concentration in the sealed test tube was 18 vol %.

The physical properties of the resulting low-molecular-weight PTFE powder were determined as in Example 1. The results are shown in Table 1.

Comparative Example 2

A low-molecular-weight PTFE powder was obtained as in Example 1, except that the oxygen concentration in the sealed test tube was 5.0 vol %.

The physical properties of the resulting low-molecular-weight PTFE powder were determined as in Example 1. The results are shown in Table 1.

Example 5

A 10-g portion of the high-molecular-weight PTFE fine powder (1) weighed using a weight balance was uniformly thinly placed on a 12-cm-square aluminum foil tray such that the thickness was not greater than the penetration depth of electrons. The workpiece was placed in a SUS304 high-temperature irradiation container. With introduction of nitrogen gas having a purity of 99.9% into the high-temperature irradiation container at 3 L/min, the workpiece was heated at 100° C., 150° C., or 200° C. and irradiated with 223, 318, or 445 kGy of electron beams at 200 kV, 1 mA, and a dose rate of 15.9 kGy/s using a low energy electron accelerator (Curetron available from NHV corp., rated: 200 kV, 20 mA). The irradiation was followed by gas introduction until the temperature reached 100° C. or lower. The sample was taken out of the container, whereby a low-molecular-weight PTFE powder was obtained.

The physical properties of the resulting low-molecular-weight PTFE powder were determined as in Example 1. The results are shown in Table 3.

Reference Example 1

As in Example 5, a 10-g portion of the high-molecular-weight PTFE fine powder (1) weighed using a weight balance was uniformly thinly placed on a 12-cm-square aluminum foil tray such that the thickness was not greater than the penetration depth of electrons. The workpiece was placed in a SUS304 high-temperature irradiation container. While the high-temperature irradiation container was maintained in the air at an oxygen concentration of 21%, the workpiece was heated at 100° C., 150° C., or 200° C. and irradiated with 223 or 318 kGy of electron beams at 200 kV, 1 mA, and a dose rate of 15.9 kGy/s using a low energy electron accelerator (Curetron available from NHV corp., rated: 200 kV, 20 mA). The irradiation was followed by waiting until the temperature reached 100° C. or lower. The sample was taken out of the container, whereby a low-molecular-weight PTFE powder was obtained.

The physical properties of the resulting low-molecular-weight PTFE powder were determined as in Example 1. The results are shown in Table 3.

Comparative Example 3

A low-molecular-weight PTFE powder was obtained as in Example 5, except that the temperature of applying electron beams was changed as shown in Table 4 and the sample was taken out of the container and exposed to the air immediately after the irradiation.

The physical properties of the resulting low-molecular-weight PTFE powder were determined as in Example 1. The results are shown in Table 4.

Example 6

A low-molecular-weight PTFE powder was obtained as in Example 5, except that the temperature of applying electron beams was changed as shown in Table 4.

The physical properties of the resulting low-molecular-weight PTFE powder were determined as in Example 1. The results are shown in Table 4.

Reference Example 2

A low-molecular-weight PTFE powder was obtained as in Reference Example 1, except that the temperature of applying electron beams and the absorbed dose thereof were changed as shown in Table 4.

The physical properties of the resulting low-molecular-weight PTFE powder were determined as in Example 1. The results are shown in Table 4.

TABLE 1

| | Amount of high-molecular-weight PTFE fine powder | Oxygen concentration in irradiation atmosphere (Vol %) | Absorbed dose (kGy) | Heating | Amount of PFOA (ppb) | Melt viscosity × 10^3 (Pa · s) | Functional groups in polymer (FT-IR); Absorbance | | | |
|---|---|---|---|---|---|---|---|---|---|---|
| | | | | | | | —COOH 1778 cm⁻¹ (—) | —C(=O)— 1813 cm⁻¹ (—) | —COF 1880 cm⁻¹ (—) | —COOH 3556 cm⁻¹ (—) |
| Example 1 | 5 g | <1.0 | 327 | 150° C./20 h | <5 | 38 | 0.000 | 0.000 | 0.015 | 0.005 (2) |
| Example 2 | 0.5 kg | <1.0 | 313 | 150° C./20 h | <5 | 66 | 0.011 | 0.008 | 0.008 | 0.007 (3) |
| Example 3 | 0.5 kg | <1.0 | 313 | 150° C./20 h | <5 | 94 | 0.012 | 0.009 | 0.012 | 0.005 (2) |
| Example 4 | 11 kg | <1.0 | 313 | 150° C./20 h | <5 | 32 | 0.008 | 0.000 | 0.020 | 0.006 (3) |
| Comparative Example 1 | 5 g | 18 | 327 | 150° C./20 h | 336 | 3 | 0.210 | 0.085 | 0.039 | 0.052 (23) |
| Comparative Example 2 | 5 g | 5.0 | 327 | 150° C./20 h | 95 | 24 | 0.048 | 0.029 | 0.031 | 0.027 (12) |
| Example 1-2 | 50 g | <1.0 | 28 | 25° C./10 days | 19 | >200 | 0.014 | 0.010 | 0.005 | 0.007 (3) |
| | 50 g | <1.0 | 113 | 25° C./10 days | 13 | >200 | 0.010 | 0.010 | 0.004 | 0.007 (3) |
| | 50 g | <1.0 | 141 | 25° C./10 days | 16 | >200 | 0.013 | 0.008 | 0.010 | 0.007 (3) |
| | 50 g | <1.0 | 209 | 25° C./10 days | 15 | 94 | 0.009 | 0.008 | 0.007 | 0.007 (3) |

Figures in ( ): number of carboxyl groups per $10^6$ carbon atoms in the main chain

TABLE 2

| | Amount of high-molecular-weight PTFE fine powder | Oxygen concentration in irradiation atmosphere (Vol %) | Absorbed dose (kGy) | Heating | Amount of PFOA (ppb) | Melt viscosity ×10^3 (Pa · s) | Functional groups in polymer (FT-IR); Absorbance | | | |
|---|---|---|---|---|---|---|---|---|---|---|
| | | | | | | | —COOH 1778 cm⁻¹ (–) | —C(=O)— 1813 cm⁻¹ (–) | —COF 1880 cm⁻¹ (–) | —COOH 3556 cm⁻¹ (–) |
| Example 1-2 | 50 g | <1.0 | 28 | 25° C./10 days | 19 | >200 | 0.014 | 0.010 | 0.005 | 0.007 (3) |
| | 50 g | <1.0 | 113 | 25° C./10 days | 13 | >200 | 0.010 | 0.010 | 0.004 | 0.007 (3) |
| | 50 g | <1.0 | 141 | 25° C./10 days | 16 | >200 | 0.013 | 0.008 | 0.010 | 0.007 (3) |
| | 50 g | <1.0 | 209 | 25° C./10 days | 15 | 94 | 0.009 | 0.008 | 0.007 | 0.007 (3) |

Figures in ( ): number of carboxyl groups per $10^6$ carbon atoms in the main chain

TABLE 3

| | Amount of high-molecular-weight PTFE fine powder | Oxygen concentration in irradiation atmosphere (Vol %) | Absorbed dose (kGy) | Heating temperature (° C.) | Amount of PFOA (ppb) |
|---|---|---|---|---|---|
| Example 5 | 10 g | <1 | 223 | 100 | 6 |
| | | | 318 | | 7 |
| | | | 445 | | 8 |
| | | | 223 | 150 | <5 |
| | | | 318 | | 5 |
| | | | 445 | | 12 |
| | | | 223 | 200 | <5 |
| | | | 318 | | <5 |
| | | | 445 | | <5 |
| Reference Example 1 | 10 g | 21 | 223 | 100 | 5 |
| | | | 318 | | 14 |
| | | | 223 | 150 | <5 |
| | | | 318 | | 21 |
| | | | 223 | 200 | 7 |
| | | | 318 | | 9 |

TABLE 4

| | Amount of high-molecular-weight PTFE fine powder | Oxygen concentration in irradiation atmosphere (Vol %) | Absorbed dose (kGy) | Temperature (° C.) | Amount of PFOA (ppb) |
|---|---|---|---|---|---|
| Comparative Example 3 | 10 g | <1 | 223 | 25 | 59 |
| | | | 318 | | 59 |
| | | | 445 | | 38 |
| Example 6 | 10 g | <1 | 223 | 50 | 21 |
| | | | 318 | | 21 |
| | | | 445 | | 22 |
| Reference Example 2 | 10 g | 21 | 223 | 50 | 38 |
| | | | 318 | | 48 |
| | | | 445 | | 100 |

Example 7-1

A 20-g portion of a high-molecular-weight PTFE fine powder (3) (standard specific gravity measured in conformity with ASTM D 4895: 2.171, homopolymer, concentrations of PFC and PFOA: lower than the detection limit) was prepared and the workpiece was heat-sealed as in Example 1-2. The oxygen indicator inside the bag was pink after about 18 hours from the heat sealing. The PTFE in the barrier nylon bag was uniformly thinly dispersed such that the thickness was not greater than the penetration depth of electrons, and then irradiated with 250 to 500 kGy of electron beams at 2 MV and 1.8 mA using a 2 MV electron accelerator (rated: 2 MV, 20 mA) available from NHV Corp.

The irradiation performed was moving irradiation and the absorbed dose relative to the moving rate was 10 kGy per pass. The irradiation was started at room temperature and the temperature at completion of the irradiation was 50° C. The period of time from completion of the irradiation to transfer of the workpiece to the outside of the irradiation chamber was two minutes.

The workpiece was left to stand at a room temperature of 20° C. to 28° C. for seven days and put into an aluminum airtight bag without opening the barrier nylon bag. The workpiece was then heat-sealed as in Example 1-2.

The workpiece was heated at 150° C. for 18 hours using a forced convection oven (DRX620DA available from Advantec Co., Ltd.), whereby a low-molecular-weight PTFE powder was obtained.

The physical properties of the resulting low-molecular-weight PTFE powder were determined as in Example 1. The results are shown in Table 5.

Example 7-2

A low-molecular-weight PTFE powder was obtained as in Example 7-1, except that the high-molecular-weight PTFE fine powder (1) (standard specific gravity measured in conformity with ASTM D 4895: 2.175, modified polymer 1, concentrations of PFC and PFOA: lower than the detection limit) was used instead of the fine powder (3).

The physical properties of the resulting low-molecular-weight PTFE powder were determined as in Example 1. The results are shown in Table 5.

Example 7-3

A low-molecular-weight PTFE powder was obtained as in Example 7-1, except that the high-molecular-weight PTFE fine powder (4) (standard specific gravity measured in conformity with ASTM D 4895: 2.168, modified polymer 2, concentrations of PFC and PFOA: lower than the detection limit) was used instead of the fine powder (3).

The physical properties of the resulting low-molecular-weight PTFE powder were determined as in Example 1. The results are shown in Table 5.

Example 7-4

A low-molecular-weight PTFE powder was obtained as in Example 7-1, except that a high-molecular-weight PTFE molding powder (1) (standard specific gravity measured in conformity with ASTM D 4895: 2.160, homopolymer, concentrations of PFC and PFOA: lower than the detection limit) was used instead of the fine powder (3).

The physical properties of the resulting low-molecular-weight PTFE powder were determined as in Example 1. The results are shown in Table 5.

TABLE 5

| | High-molecular-weight PTFE (g) | Electron beam irradiation | | Radical deactivation Naturally deactivating process | | | Radical deactivation Acceleratedly deactivating process | | | PFOA (ppb) | Melt viscosity × $10^3$ (Pa·s) |
|---|---|---|---|---|---|---|---|---|---|---|---|
| | | Oxygen concentration (Vol %) | Absorbed dose (kGy) | Oxygen concentration (Vol %) | Temperature (° C.) | Duration (Days) | Oxygen concentration (Vol %) | Temperature (° C.) | Duration (h) | | |
| Example 7-1 | 20 | <0.1 | 250 | <0.1 | 20 to 28 | 7 | <0.1 | 150 | 18 | <5 | 16 |
| | | | 300 | | | | | | | <5 | 20 |
| | | | 350 | | | | | | | <5 | 38 |
| | | | 400 | | | | | | | <5 | 54 |
| | | | 450 | | | | | | | <5 | 116 |
| | | | 500 | | | | | | | <5 | 134 |
| Example 7-2 | 20 | <0.1 | 250 | <0.1 | 20 to 28 | 7 | <0.1 | 150 | 18 | <5 | 11 |
| | | | 300 | | | | | | | <5 | 24 |
| | | | 350 | | | | | | | <5 | 25 |
| | | | 400 | | | | | | | <5 | 44 |
| | | | 450 | | | | | | | <5 | 87 |
| | | | 500 | | | | | | | <5 | 138 |
| Example 7-3 | 20 | <0.1 | 250 | <0.1 | 20 to 28 | 7 | <0.1 | 150 | 18 | <5 | 4 |
| | | | 300 | | | | | | | <5 | 11 |
| | | | 350 | | | | | | | <5 | 15 |
| | | | 400 | | | | | | | <5 | 29 |
| | | | 450 | | | | | | | <5 | 34 |
| | | | 500 | | | | | | | <5 | 41 |
| Example 7-4 | 20 | <0.1 | 250 | <0.1 | 20 to 28 | 7 | <0.1 | 150 | 18 | <5 | 18 |
| | | | 300 | | | | | | | <5 | 29 |
| | | | 350 | | | | | | | <5 | 45 |
| | | | 400 | | | | | | | <5 | 73 |
| | | | 450 | | | | | | | <5 | 94 |
| | | | 500 | | | | | | | <5 | 141 |

Example 8-1

A 10-g portion of the high-molecular-weight PTFE fine powder (3) weighed using a weight balance was sealed into a Pyrex® glass test tube. Then, the test tube was connected to a glass vacuum line equipped with an oil diffusion pump and vacuum-evacuated (degree of vacuum: $3.9 \times 10^3$ Pa or lower). The test tube was maintained in this state for 16 hours, and the glass was processed and sealed using a glass burner.

The test tube containing the PTFE fine powder in a vacuum was irradiated with 400 kGy of cobalt-60 γ-rays. The irradiation conditions thereof included an average dose rate at the center of the sample of 6.25 kGy/h and an irradiation temperature of 30° C. Without opening, the test tube was left to stand at a room temperature of 20° C. to 28° C. for two days for radical deactivation (naturally deactivating process). Then, the workpiece was heated at 150° C., 175° C., or 200° C. for 24 hours using a forced convection oven (DRX620DA available from Advantec Co., Ltd.) (acceleratedly deactivating process). The test tube was cooled down to room temperature and opened, whereby a low-molecular-weight PTFE powder was obtained.

Another low-molecular-weight PTFE powder was also obtained by a method in which the test tube was opened after a similar acceleratedly deactivating process, except that the absorbed dose was 150 kGy.

The physical properties of the resulting low-molecular-weight PTFE powder were determined. The results are shown in Table 6.

The structures of the resulting low-molecular-weight PTFEs were analyzed by $^{19}$F solid state MAS NMR. This resulted in observation of a signal assigned to —CF=CF$_2$ at a molecular-chain end at −92 ppm, a signal assigned to —CF=CF— in the main chain at around −156 ppm, a signal assigned to —CF=CF—CF$_3$ at around −128 ppm, signals assigned to —CF$_2$—CF(CF$_3$)—CF$_2$— at around −71 ppm and around −114 ppm, and a signal assigned to —CF(CF$_3$)$_2$ at around −58 ppm.

Comparative Example 4-1

A low-molecular-weight PTFE powder was obtained as in Example 8-1, except that the high-molecular-weight PTFE fine powder (3) was irradiated with 400 kGy of γ-rays in a test tube maintained in the air atmosphere and then the acceleratedly deactivating process by heating at 150° C. for 24 hours was performed in the test tube in the air atmosphere.

In the case of an absorbed dose of 150 kGy, the test tube was opened after the γ-ray irradiation in the air atmosphere and no acceleratedly deactivating process by heating was performed.

The physical properties of the resulting low-molecular-weight PTFE powder were determined as in Example 8-1. The results are shown in Table 6.

The structures of the resulting low-molecular-weight PTFEs (conventional production method) were analyzed by $^{19}$F solid state MAS NMR. As a result, the double-bond-containing —CF=CF$_2$ at a molecular-chain end and —CF=CF— and —CF=CF—CF$_3$ in the main chain, which were detected by NMR analysis of the low-molecular-weight PTFE in Example 8-1, were at a noise level and not clearly observed. No signals assigned to —CF(CF$_3$)$_2$ or —CF$_2$—CF(CF$_3$)—CF$_2$— were detected, but oxygen-atom-containing —CF=O, which was hardly detected in Example 8-1, was clearly observed (around −64 ppm).

Example 8-2

Low-molecular-weight PTFE powders were obtained as in Example 8-1, except that the high-molecular-weight PTFE fine powder (1) was used. The results are shown in Table 6.

Comparative Example 4-2

Low-molecular-weight PTFE powders were obtained as in Comparative Example 4-1, except that the high-molecular-weight PTFE fine powder (1) was used. The results are shown in Table 6.

Example 8-3

Low-molecular-weight PTFE powders were obtained as in Example 8-1, except that the high-molecular-weight PTFE fine powder (4) was used. The results are shown in Table 6.

Comparative Example 4-3

Low-molecular-weight PTFE powders were obtained as in Comparative Example 4-1, except that the high-molecular-weight PTFE fine powder (4) was used. The results are shown in Table 6.

Example 8-4

Low-molecular-weight PTFE powders were obtained as in Example 8-1, except that the high-molecular-weight PTFE molding powder (1) was used. The results are shown in Table 6.

Comparative Example 4-4

Low-molecular-weight PTFE powders were obtained as in Comparative Example 4-1, except that the high-molecular-weight PTFE molding powder (1) was used. The results are shown in Table 6.

Example 8-5

Low-molecular-weight PTFE powders were obtained as in Example 8-1, except that a high-molecular-weight PTFE molding powder (2) (standard specific gravity measured in conformity with ASTM D 4895: 2.168, homopolymer, concentrations of PFC and PFOA: lower than the detection limit) was used. The results are shown in Table 6.

Comparative Example 4-5

Low-molecular-weight PTFE powders were obtained as in Comparative Example 4-1, except that the high-molecular-weight PTFE molding powder (2) was used. The results are shown in Table 6.

TABLE 6

| | High-molecular-weight PTFE (g) | γ-Ray irradiation | | Radical deactivation Naturally deactivating process | | | Radical deactivation Acceleratedly deactivating process | | | PFOA (ppb) | Melt viscosity × $10^3$ (Pa·s) | End carboxyl groups (grps/ C × $10^6$) |
|---|---|---|---|---|---|---|---|---|---|---|---|---|
| | | Oxygen concentration (Vol %) | Absorbed dose (kGy) | Oxygen concentration (Vol %) | Temperature (° C.) | Duration (Days) | Oxygen concentration (Vol %) | Temperature (° C.) | Duration (h) | | | |
| Example 8-1 | 10 | <0.1 | 400 | <0.1 | 20 to 28 | 2 | <0.1 | 150 | 24 | <5 | 18 | 1 |
| | 10 | <0.1 | 150 | <0.1 | 20 to 28 | 2 | <0.1 | 175 | 24 | 11 | 37 | 1 |
| | 10 | <0.1 | 150 | <0.1 | 20 to 28 | 2 | <0.1 | 200 | 24 | 13 | 39 | 1 |
| | 10 | <0.1 | 150 | <0.1 | 20 to 28 | 2 | <0.1 | 150 | 24 | <5 | >200 | 1 |
| Comparative Example 4-1 | 10 | 21 | 400 | <0.1 | 20 to 28 | 2 | 21 | 150 | 24 | 377 | 0.4 | 24 |
| | 10 | 21 | 150 | <0.1 | 20 to 28 | 2 | — | — | — | 28 | 110 | 4 |
| Example 8-2 | 10 | <1.0 | 400 | <0.1 | 20 to 28 | 2 | <0.1 | 150 | 24 | 12 | 20 | 0 |
| | 10 | <1.0 | 150 | <0.1 | 20 to 28 | 2 | <0.1 | 150 | 24 | <5 | >200 | 1 |
| Comparative Example 4-2 | 10 | 21 | 400 | <0.1 | 20 to 28 | 2 | 21 | 150 | 24 | 177 | 1 | 15 |
| | 10 | 21 | 150 | <0.1 | 20 to 28 | 2 | — | — | — | 54 | 79 | 6 |
| Example 8-3 | 10 | <1.0 | 400 | <0.1 | 20 to 28 | 2 | <0.1 | 150 | 24 | 7 | 18 | 4 |
| | 10 | <1.0 | 150 | <0.1 | 20 to 28 | 2 | <0.1 | 150 | 24 | <5 | >200 | 3 |
| Comparative Example 4-3 | 10 | 21 | 400 | <0.1 | 20 to 28 | 2 | 21 | 150 | 24 | 116 | 0.6 | 26 |
| | 10 | 21 | 150 | <0.1 | 20 to 28 | 2 | — | — | — | 58 | 38 | 11 |
| Example 8-4 | 10 | <1.0 | 400 | <0.1 | 20 to 28 | 2 | <0.1 | 150 | 24 | <5 | 51 | 2 |
| | 10 | <1.0 | 150 | <0.1 | 20 to 28 | 2 | <0.1 | 150 | 24 | <5 | >200 | 1 |
| Comparative Example 4-4 | 10 | 21 | 400 | <0.1 | 20 to 28 | 2 | 21 | 150 | 24 | 195 | 3 | 14 |
| | 10 | 21 | 150 | <0.1 | 20 to 28 | 2 | — | — | — | 42 | 105 | 4 |
| Example 8-5 | 10 | <1.0 | 400 | <0.1 | 20 to 28 | 2 | <0.1 | 150 | 24 | <5 | 68 | 2 |
| | 10 | <1.0 | 150 | <0.1 | 20 to 28 | 2 | <0.1 | 150 | 24 | <5 | >200 | 2 |
| Comparative Example 4-5 | 10 | 21 | 400 | <0.1 | 20 to 28 | 2 | 21 | 150 | 24 | 220 | 0.8 | 15 |
| | 10 | 21 | 150 | <0.1 | 20 to 28 | 2 | — | — | — | 96 | 39 | 10 |

Example 9-1

A 50-g portion of the high-molecular-weight PTFE fine powder (3) was mixed with 9.2 g of hydrocarbon oil marketed under the trade name Isopar E (available from Exxon Mobil Corp.) in a glass bottle and aged at room temperature (25±2° C.) for one hour. The mixture was packed into an extrusion die equipped with a cylinder (inner diameter: 25.4 mm). A load of 5.7 MPa was applied to a piston inserted into the cylinder and maintained for one minute. Immediately thereafter, the mixture was extruded through an orifice at a ram speed of 20 mm/min at room temperature. The reduction ratio RR was 300. An extrusion-molded article was sampled at a latter stage of the extruding operation where the pressure reached equilibrium. The extrusion-molded article before use was dried in a well-ventilated room at room temperature for three days or longer so that Isopar E was evaporated.

The extrusion-molded article was cut to give a piece having a length of about 30 mm and the piece was put into a barrier nylon bag as in Example 1-2. The oxygen indicator in the bag was pink.

With 100 kGy of electron beams, irradiation was performed as in Example 7-1. The irradiation temperature was 40° C. The workpiece was left to stand at a room temperature of 20° C. to 28° C. for four days. Then, the barrier nylon bag was opened and the extrusion-molded article (0.3 g) was put into a quartz tube for ESR and subjected to the measurement. The peak ratios were determined from the resulting ESR chart. The results are shown in Table 7. The radical concentration in the ESR measurement immediately after the irradiation, i.e., within three minutes from the irradiation, was 1.62E+18 spin/g.

Example 9-2

An ESR chart was obtained as in Example 9-1, except that the high-molecular-weight PTFE fine powder (1) was used. The results are shown in Table 7. The radical concentration in the ESR measurement immediately after the irradiation, i.e., within three minutes from the irradiation, was 1.98E+18 spin/g.

Example 9-3

An ESR chart was obtained as in Example 9-1, except that the high-molecular-weight PTFE fine powder (4) was used. The results are shown in Table 7. The radical concentration in the ESR measurement immediately after the irradiation, i.e., within three minutes from the irradiation, was 2.24E+18 spin/g.

Comparative Example 5

The extrusion-molded article obtained using the high-molecular-weight PTFE fine powder (3) (concentrations of PFC and PFOA: lower than the detection limit) was cut to give a piece having a length of about 30 mm. A test tube was opened and exposed to the air (oxygen concentration: 21 vol %). Then, the workpiece was irradiated with 152 kGy of γ-rays from cobalt-60 at an average dose rate at the center of the sample of 9.5 kGy/h and an irradiation temperature of 25° C.

The workpiece after the irradiation was left to stand at a room temperature of 20° C. to 28° C. for four days. Then, the extrusion-molded article (0.3 g) was put into a quartz tube for ESR and subjected to the measurement. The peak ratios were determined from the resulting ESR chart. The results are shown in Table 7. The radical concentration in the ESR measurement immediately after the irradiation, i.e., within three minutes from the irradiation, was 1.52E+18 spin/g.

TABLE 7

| | Peak M1/ Peak A1 | Peak M2/ Peak A1 | Peak M3/ Peak A1 | Peak M2/ Peak M3 |
|---|---|---|---|---|
| Example 9-1 | 4.65 | 1.82 | 2.83 | 0.64 |
| Example 9-2 | 4.14 | 1.61 | 2.53 | 0.64 |
| Example 9-3 | 3.19 | 1.37 | 1.82 | 0.75 |
| Comparative Example 5 | 8.45 | 4.55 | 3.90 | 1.19 |

Example 10-1

An extrusion-molded article obtained as in Example 9-1 using the high-molecular-weight PTFE fine powder (3) was cut to give a piece having a length of about 30 mm and the piece was sealed in a Pyrex® glass test tube. The test tube was vacuum-evacuated and sealed as in Example 8-1.

The test tube containing the PTFE fine powder in a vacuum was irradiated with 152 kGy cobalt-60 γ-rays, and then heated at 150° C. for 96 hours as in Example 8-1. The test tube was cooled down to room temperature and opened, whereby an extrusion-molded article of low-molecular-weight PTFE was obtained. The extrusion-molded article was put into a quartz tube for ESR and subjected to the measurement. The peak ratios were determined from the resulting ESR chart. The results are shown in Table 8. The radical concentration in the ESR measurement immediately after the irradiation, i.e., within three minutes from the irradiation, was 1.58E+18 spin/g.

Example 10-2

An extrusion-molded article obtained using the high-molecular-weight PTFE fine powder (4) was cut to give a piece having a length of about 30 mm and the piece was then processed as in Example 10-1. Thereby, an extrusion-molded article of low-molecular-weight PTFE was obtained. The extrusion-molded article was put into a quartz tube for ESR and subjected to the measurement. The peak ratios were determined from the resulting ESR chart. The results are shown in Table 8. The radical concentration in the ESR measurement immediately after the irradiation, i.e., within three minutes from the irradiation, was 2.31E+18 spin/g.

TABLE 8

| | Peak M1/ Peak A1 | Peak M2/ Peak A1 | Peak M3/ Peak A1 | Peak M2/ Peak M3 |
|---|---|---|---|---|
| Example 10-1 | 10.32 | 4.15 | 6.17 | 0.67 |
| Example 10-2 | 8.07 | 2.23 | 5.84 | 0.38 |

Example 11-1

A 200-g portion of the high-molecular-weight PTFE fine powder (3) weighed using a weight balance was put into an aluminum airtight bag (inner bag: polyethylene) equipped with a cock. Two pieces of deoxidants (A-500HS available from As One Corp.) were also put thereinto. Then, introduction of nitrogen gas into the bag and evacuation using an oil rotary pump were repeated three times. The pressure inside the bag was reduced (2.7 Pa) and the cock was closed. The absence of oxygen inside the bag was confirmed using a zirconia oxygen analyzer LC-860 (available from Toray Engineering Co., Ltd.). Then, the root of the cock was heat-sealed using a vacuum sealer (V-300-10 W available from Fujiimpulse Co., Ltd.), so that the bag was sealed. The workpiece was irradiated with 301 kGy of γ-rays from cobalt-60. The irradiation conditions thereof included an average dose rate at the center of the sample of 6.25 kGy/h and an irradiation temperature of 30° C.

Then, the bag without opening was maintained at 20° C. to 28° C. for 2 to 21 days (naturally deactivating process), and thereafter the bag was opened.

The physical properties of the resulting low-molecular-weight PTFE powder were determined as in Example 1. The results are shown in Table 9.

TABLE 9

| | High-molecular-weight PTFE (g) | γ-Ray irradiation | | | Radical deactivation Naturally deactivating process | | | | End | |
|---|---|---|---|---|---|---|---|---|---|---|
| | | Oxygen concentration (Vol %) | Absorbed dose (kGy) | Deoxidants (pcs) | Oxygen concentration (Vol %) | Temperature (° C.) | Duration (Days) | PFOA (ppb) | Melt viscosity × $10^3$ (Pas) | carboxyl groups (grps/ C × $10^6$) |
| Example 11-1 | 200 | <0.1 | 301 | 2 | <0.1 | 20 to 28 | 2 | 5 | 51 | 2 |
| | 200 | <0.1 | 298 | 2 | <0.1 | 20 to 28 | 9 | <5 | 66 | 3 |
| | 200 | <0.1 | 305 | 2 | <0.1 | 20 to 28 | 16 | <5 | 66 | 1 |
| | 200 | <0.1 | 296 | 2 | <0.1 | 20 to 28 | 21 | <5 | 82 | 1 |

Example 11-2

γ-Ray irradiation was performed as in Example 11-1, except that a 400-g portion of the high-molecular-weight PTFE fine powder (3) weighed using a weight balance was put into an aluminum airtight bag (inner bag: polyethylene) equipped with a cock. Then, the bag without opening was maintained at 20° C. to 28° C. for 1 to 7 days (naturally deactivating process), and thereafter the bag was opened.

The physical properties of the resulting low-molecular-weight PTFE powder were determined. The results are shown in Table 10.

Example 11-3

γ-Ray irradiation was performed as in Example 11-1, except that a 200-g portion of the high-molecular-weight PTFE molding powder (1) was used. Then, the bag without opening was maintained at 20° C. to 28° C. for 1 to 7 days (naturally deactivating process), and thereafter the bag was opened.

The physical properties of the resulting low-molecular-weight PTFE powder were determined. The results are shown in Table 10.

TABLE 10

| | High-molecular-weight PTFE (g) | γ-Ray irradiation | | Radical deactivation Naturally deactivating process | | | | | End carboxyl groups (grps/ C × 10$^6$) |
|---|---|---|---|---|---|---|---|---|---|
| | | Oxygen concentration (Vol %) | Absorbed dose (kGy) | Deoxidants (pcs) | Oxygen concentration (Vol %) | Temperature (° C.) | Duration (Days) | PFOA (ppb) | Melt viscosity × 10$^3$ (Pa · s) | |
| Example 11-2 | 400 | <0.1 | 299 | 4 | <0.1 | 20 to 28 | 1 | 24.5 | 29 | 4 |
| | 400 | <0.1 | 291 | 4 | <0.1 | 20 to 28 | 7 | 10.9 | 27 | 3 |
| Example 11-3 | 200 | <0.1 | 280 | 2 | <0.1 | 20 to 28 | 1 | 13.7 | 31 | 3 |
| | 200 | <0.1 | 285 | 2 | <0.1 | 20 to 28 | 7 | 8.2 | 28 | 3 |

Example 11-4

γ-Ray irradiation was performed as in Example 11-1, except that a 10-g portion of the high-molecular-weight PTFE fine powder (1) was used. Then, the bag without opening was maintained at 20° C. to 28° C. for two days (naturally deactivating process). Then, the bag without opening was maintained at 80° C. for 1 to 4 days (acceleratedly deactivating process), and thereafter the bag was opened.

The PFOA amount of the resulting low-molecular-weight PTFE powder was determined. The results are shown in Table 11.

Example 11-5

The same process was performed as in Example 11-4, except that the heating temperature after the γ-ray irradiation was 100° C.

The PFOA amount of the resulting low-molecular-weight PTFE powder was determined. The results are shown in Table 11.

Example 11-6

The same process was performed as in Example 11-4, except that the heating temperature after the γ-ray irradiation was 150° C. and maintained for 18 hours.

The PFOA amount of the resulting low-molecular-weight PTFE powder was determined. The results are shown in Table 11.

Example 12-1

γ-Ray irradiation was performed as in Example 11-1, except that the high-molecular-weight PTFE fine powder (3) was used. Then, the bag without opening was maintained at 20° C. to 28° C. for two days (naturally deactivating process), and thereafter the bag was opened.

The workpiece was exposed to the air at 20° C. to 28° C. for one day, and a 20-g portion of the sample was weighed and put into a 0.1-L stainless steel cylindrical autoclave. Two pieces of new deoxidants (A-150HS available from As One Corp.) were also packed therein, and the autoclave was sealed.

Then, introduction of nitrogen gas into the autoclave and evacuation using an oil rotary pump were repeated three times and the pressure inside the autoclave was reduced (2.7 Pa). The workpiece was heated at 150° C. for 18 hours using a forced convection oven (DRX620DA available from Advantec Co., Ltd.) (acceleratedly deactivating process), whereby a low-molecular-weight PTFE powder was obtained.

Similarly, the same process as described above was also performed with (used) deoxidants used for the irradiation, whereby a low-molecular-weight PTFE powder was obtained.

The physical properties of the resulting low-molecular-weight PTFE powder were determined as in Example 1. The results are shown in Table 12.

TABLE 11

| | High-molecular-weight PTFE (g) | γ-Ray irradiation | | | Radical deactivation Naturally deactivating process | | | Radical deactivation Acceleratedly deactivating process | | | |
|---|---|---|---|---|---|---|---|---|---|---|---|
| | | Oxygen concentration (Vol %) | Absorbed dose (kGy) | Deoxidants (pcs) | Oxygen concentration (Vol %) | Temperature (° C.) | Duration (Days) | Oxygen concentration (Vol %) | Temperature (° C.) | Duration (h) | PFOA (ppb) |
| Example 11-4 | 10 | <0.1 | 230 | 1 | <0.1 | 20 to 28 | 2 | <0.1 | 80 | 1 | <5 |
| | 10 | <0.1 | 231 | 1 | <0.1 | 20 to 28 | 2 | <0.1 | 80 | 2 | <5 |
| | 10 | <0.1 | 235 | 1 | <0.1 | 20 to 28 | 2 | <0.1 | 80 | 3 | <5 |
| | 10 | <0.1 | 238 | 1 | <0.1 | 20 to 28 | 2 | <0.1 | 80 | 4 | <5 |
| Example 11-5 | 10 | <0.1 | 233 | 1 | <0.1 | 20 to 28 | 2 | <0.1 | 100 | 1 | <5 |
| | 10 | <0.1 | 233 | 1 | <0.1 | 20 to 28 | 2 | <0.1 | 100 | 2 | 6 |
| | 10 | <0.1 | 238 | 1 | <0.1 | 20 to 28 | 2 | <0.1 | 100 | 3 | 5 |
| | 10 | <0.1 | 241 | 1 | <0.1 | 20 to 28 | 2 | <0.1 | 100 | 4 | <5 |
| Example 11-6 | 10 | <0.1 | 232 | 1 | <0.1 | 20 to 28 | 2 | <0.1 | 150 | 0.75 | <5 |
| | 10 | <0.1 | 240 | 1 | <0.1 | 20 to 28 | 2 | <0.1 | 150 | 0.75 | <5 |
| | 10 | <0.1 | 238 | 1 | <0.1 | 20 to 28 | 2 | <0.1 | 150 | 0.75 | <5 |
| | 10 | <0.1 | 236 | 1 | <0.1 | 20 to 28 | 2 | <0.1 | 150 | 0.75 | <5 |

Example 12-2

A low-molecular-weight PTFE powder was obtained as in Example 12-1, except that no deoxidant was put into the stainless steel autoclave.

The physical properties of the resulting low-molecular-weight PTFE powder were determined as in Example 1. The results are shown in Table 12.

Example 12-3

A low-molecular-weight PTFE powder was obtained as in Example 12-1 with new deoxidants, except that the duration of the naturally deactivating process was one day.

The physical properties of the resulting low-molecular-weight PTFE powder were determined as in Example 1. The results are shown in Table 12.

Example 12-4

A low-molecular-weight PTFE powder was obtained as in Example 12-3, except that no deoxidant was packed in the autoclave.

The physical properties of the resulting low-molecular-weight PTFE powder were determined as in Example 1. The results are shown in Table 12.

Example 12-5

A low-molecular-weight PTFE powder was obtained as in Example 12-3, except that the duration of the air exposure was seven days.

The physical properties of the resulting low-molecular-weight PTFE powder were determined as in Example 1. The results are shown in Table 12.

Example 12-6

A low-molecular-weight PTFE powder was obtained as in Example 12-5, except that no deoxidant was packed in the autoclave.

The physical properties of the resulting low-molecular-weight PTFE powder were determined as in Example 1. The results are shown in Table 12.

Example 12-7

γ-Ray irradiation was performed as in Example 12-1. The workpiece was exposed to the air at 20° C. to 28° C. for one day. A 20-g portion of the sample was weighed and put into a 0.1-L stainless steel cylindrical autoclave. The autoclave was sealed with no deoxidant used.

Then, introduction of nitrogen gas into the autoclave and evacuation using an oil rotary pump were repeated three times and the pressure inside the autoclave was reduced (2.7 Pa). The autoclave was put into a forced convection oven (DRX620DA available from Advantec Co., Ltd.) and the oil rotary pump was again connected to the autoclave. An impinger containing a 0.1 N sodium hydroxide aqueous solution was connected between the oil rotary pump and the autoclave. The workpiece was heated at 150° C. for 18 hours (acceleratedly deactivating process) while the oil rotary pump was operated for continual evacuation, whereby a low-molecular-weight PTFE powder was obtained. The 0.1 N sodium hydroxide was neutralized and the PFOA amount was measured, but it was lower than the detection limit.

The physical properties of the resulting low-molecular-weight PTFE powder were determined as in Example 1. The results are shown in Table 12.

TABLE 12

| | γ-Ray irradiated article (g) | Container | Radical deactivation Naturally deactivating process | | Air exposure | | Oxygen concentration (Vol %) | Radical deactivation Acceleratedly deactivating process | | Deoxidants | |
|---|---|---|---|---|---|---|---|---|---|---|---|
| | | | Temperature (° C.) | Duration (Days) | Temperature (° C.) | Duration (Days) | | Temperature (° C.) | Duration (h) | New/used | (pcs) |
| Example 12-1 | 20 | 0.1 L_SUS | 20 to 28 | 2 | 20 to 28 | 1 | <0.1 | 150 | 18 | New | 2 |
| | 20 | 0.1 L_SUS | 20 to 28 | 2 | 20 to 28 | 1 | <0.1 | 150 | 18 | Used | 2 |
| Example 12-2 | 20 | 0.1 L_SUS | 20 to 28 | 2 | 20 to 28 | 1 | <0.1 | 150 | 18 | — | 0 |
| Example 12-3 | 20 | 0.1 L_SUS | 20 to 28 | 1 | 20 to 28 | 1 | <0.1 | 150 | 18 | New | 2 |
| Example 12-4 | 20 | 0.1 L_SUS | 20 to 28 | 1 | 20 to 28 | 1 | <0.1 | 150 | 18 | — | 0 |
| Example 12-5 | 20 | 0.1 L_SUS | 20 to 28 | 1 | 20 to 28 | 7 | <0.1 | 150 | 18 | New | 2 |
| Example 12-6 | 20 | 0.1 L_SUS | 20 to 28 | 1 | 20 to 28 | 7 | <0.1 | 150 | 18 | — | 0 |
| Example 12-7 | 20 | 0.1 L_SUS | 20 to 28 | 2 | 20 to 28 | 1 | <0.1 | 150 | 18 | — | 0 |

| | PFOA (ppb) | Melt viscosity × $10^3$ (Pa·s) | End carboxyl groups (grps/C × $10^6$) |
|---|---|---|---|
| Example 12-1 | <5 | 51 | 3 |
| | <5 | 55 | 4 |
| Example 12-2 | 15 | 52 | 1 |
| Example 12-3 | <5 | 52 | 4 |
| Example 12-4 | 24 | 51 | 4 |
| Example 12-5 | <5 | 50 | 3 |
| Example 12-6 | 23 | 53 | 3 |
| Example 12-7 | <5 | 42 | 2 |

Example 13-1

The physical properties of the low-molecular-weight PTFE powder after the 2-day naturally deactivating process in Example 11-1 were determined. The results are shown in Table 13.

Reference Example 3

A 10-g portion of the low-molecular-weight PTFE powder obtained by the naturally deactivating process in Example 13-1 was weighed, and put into and sealed in a 0.1-L stainless steel cylindrical autoclave. Then, without vacuum evacuation, the autoclave was put into a forced convection oven (DRX620DA available from Advantec Co., Ltd.) and heated at 150° C. for 18 hours. The physical properties of the resulting low-molecular-weight PTFE powder were determined. The results are shown in Table 13.

Example 13-2

The heating in Example 12-1 was performed with new deoxidants packed, and the physical properties of the resulting low-molecular-weight PTFE powder were determined. The results are shown in Table 13.

Example 13-3

The low-molecular-weight PTFE powder obtained in Example 13-2 was heated as in Reference Example 3. The physical properties of the resulting low-molecular-weight PTFE powder were determined. The results are shown in Table 13.

The physical properties of the low-molecular-weight PTFE powder obtained in Comparative Example 4-1 were determined. The results are shown in Table 13.

Example 14-1

γ-Ray irradiation was performed as in Example 11-1, except that the high-molecular-weight PTFE fine powder (1) was used. Then, the bag without opening was maintained at 20° C. to 28° C. for 16 days (naturally deactivating process), and thereafter the bag was opened.

The workpiece was exposed to the air at 20° C. to 28° C. for one day. A 20-g portion of the sample was weighed, and put into and sealed in a 0.1-L stainless steel cylindrical autoclave. Then, introduction of nitrogen gas into the autoclave and evacuation using an oil rotary pump were repeated three times and the pressure inside the autoclave was reduced (2.7 Pa). Further, 99.99% hydrogen gas (canned standard gas, hydrogen, 99.99%, available from GL Sciences Inc.) was introduced in an amount of 2.71E-2% by mass relative to the PTFE.

The workpiece was left to stand at 20° C. to 28° C. for 18 hours (acceleratedly deactivating process), whereby a low-molecular-weight PTFE powder was obtained.

The physical properties of the resulting low-molecular-weight PTFE powder were determined as in Example 1. The results are shown in Table 14.

Example 14-2

A low-molecular-weight PTFE powder was obtained as in Example 14-1, except that the heating was performed at 40° C. for 18 hours using a forced convection oven (DRX620DA available from Advantec Co., Ltd.) (acceleratedly deactivating process).

The physical properties of the resulting low-molecular-weight PTFE powder were determined as in Example 1. The results are shown in Table 14.

Example 14-3

A low-molecular-weight PTFE powder was obtained as in Example 14-2, except that 3% hydrogen gas (available from Koatsu Gas Kogyo Co., Ltd.) was used in an amount of 8.14E-4% by mass.

The physical properties of the resulting low-molecular-weight PTFE powder were determined as in Example 1. The results are shown in Table 14.

Example 14-4

A low-molecular-weight PTFE powder was obtained as in Example 14-3, except that the amount of 3% hydrogen gas was 5.09E-4% by mass and the heating temperature was 150° C.

The physical properties of the resulting low-molecular-weight PTFE powder were determined as in Example 1. The results are shown in Table 14.

TABLE 13

| | Sample name | PFOA (ppb) | Melt viscosity × $10^3$ (Pa · s) | End carboxyl groups (grps/ C × $10^6$) | Z value (—) | Melting point (° C.) |
|---|---|---|---|---|---|---|
| Example 13-1 | Naturally deactivated article | 5 | 51 | 2 | 103 | 329.6 |
| Reference Example 3 | Article obtained by heating the above in the air | 37 | 49 | 2 | 105 | 328.6 |
| Example 13-2 | Acceleratedly deactivated article | <5 | 51 | 3 | 101 | 328.7 |
| Example 13-3 | Article obtained by heating the above in the air | <5 | 41 | 3 | 103 | 328.8 |
| Comparative Example 4-1 | Article obtained by heating in the air after irradiation in the air | 377 | 0.4 | 24 | 105 | 328.6 |

TABLE 14

| | High-molecular-weight PTFE (g) | Radical deactivation Naturally deactivating process | | | | | Radical deactivation Acceleratedly deactivating process (hydrogenation) | | | | |
|---|---|---|---|---|---|---|---|---|---|---|---|
| | | Oxygen concentration (Vol %) | Temperature (° C.) | Duration (Days) | Air exposure Temperature (° C.) | Duration (Days) | Oxygen concentration (Vol %) | Temperature (° C.) | Duration (h) | Hydrogen concentration (Vol %) | Amount of hydrogen fed (Mass %) |
| Example 14-1 | 20 | <0.1 | 20 to 28 | 16 | 20 to 28 | 1 | <0.1 | 20 to 28 | 18 | 99.99 | 2.71E−02 |
| Example 14-2 | 20 | <0.1 | 20 to 28 | 16 | 20 to 28 | 1 | <0.1 | 40 | 18 | 99.99 | 2.71E−02 |
| Example 14-3 | 20 | <0.1 | 20 to 28 | 21 | 20 to 28 | 1 | <0.1 | 40 | 18 | 3.00 | 8.14E−04 |
| Example 14-4 | 20 | <0.1 | 20 to 28 | 21 | 20 to 28 | 1 | <0.1 | 150 | 18 | 3.00 | 5.09E−04 |

| | PFOA (ppb) | Melt viscosity × $10^3$ (Pa · s) | End carboxyl groups (grps/C × $10^6$) | Z value | Melting point (° C.) |
|---|---|---|---|---|---|
| Example 14-1 | 5.8 | 75 | 1 | 105 | 328.4 |
| Example 14-2 | <5 | 53 | 2 | 105 | 328.3 |
| Example 14-3 | <5 | 71 | 1 | 105 | 328.3 |
| Example 14-4 | 6.3 | 60 | 1 | 104 | 328.4 |

Example 15-1

A 0.3-g portion of an extrusion-molded article of the high-molecular-weight PTFE fine powder (3) obtained as in Example 9-1 was used for the vacuum evacuation as in Example 14-1. The sample was sealed in a 0.1-L stainless steel autoclave. Then, 99.99% hydrogen gas was introduced in an amount of 2.15% by mass relative to the PTFE while the vacuum state was maintained. The workpiece was irradiated with 35 kGy of cobalt-60 γ-rays at a room temperature of 24° C. The irradiation conditions thereof included an average dose rate at the center of the sample of 4.50 kGy/h. The autoclave was opened, the molded article after the irradiation was taken out, and the radical retention was determined by ESR. The results are shown in Table 15. The radical concentration in the ESR measurement immediately after the irradiation, i.e., within three minutes from the irradiation, was 1.38E+18 spin/g.

Example 15-2

The same process was performed as in Example 15-1, except that the high-molecular-weight PTFE fine powder (1) was used. The molded article after the irradiation was taken out and the radical retention was determined by ESR. The results are shown in Table 15. The radical concentration in the ESR measurement immediately after the irradiation, i.e., within three minutes from the irradiation, was 1.81E+18 spin/g.

Example 15-3

The same process was performed as in Example 15-1, except that the high-molecular-weight PTFE fine powder (4) was used. The molded article after the irradiation was taken out and the radical retention was determined by ESR. The results are shown in Table 15. The radical concentration in the ESR measurement immediately after the irradiation, i.e., within three minutes from the irradiation, was 2.09E+18 spin/g.

Example 15-4

A 0.3-g portion of an extrusion-molded article of the high-molecular-weight PTFE fine powder (3) was sealed in a 0.1-L stainless steel autoclave. Then, introduction of nitrogen gas into the autoclave and evacuation using an oil rotary pump were repeated three times and the pressure inside the autoclave was reduced (2.7 Pa). The workpiece was irradiated with 35 kGy of cobalt-60 γ-rays at a room temperature of 24° C. while the vacuum state was maintained. The irradiation conditions thereof included an average dose rate at the center of the sample of 4.50 kGy/h. The extrusion-molded article was temporarily exposed to the air and the radical concentration immediately after the irradiation was measured. The extrusion-molded article was again put into the autoclave and the system was vacuum-evacuated. Then, 3% hydrogen gas (amount: 6.44E-2% by mass) was put into the autoclave and the workpiece was heated at 40° C. for 18 hours using a forced convection oven (DRX620DA available from Advantec Co., Ltd.) (acceleratedly deactivating process). The radical retention was determined by ESR. The results are shown in Table 15. The radical concentration in the ESR measurement immediately after the irradiation, i.e., within three minutes from the irradiation, was 1.33E+18 spin/g.

Example 15-5

The same process was performed as in Example 15-4, except that the high-molecular-weight PTFE fine powder (1) was used. The molded article after the irradiation was taken out and the radical retention was determined by ESR. The results are shown in Table 15. The radical concentration in the ESR measurement immediately after the irradiation, i.e., within three minutes from the irradiation, was 1.86E+18 spin/g.

Example 15-6

The same process was performed as in Example 15-4, except that the high-molecular-weight PTFE fine powder (4) was used. The molded article after the irradiation was taken out and the radical retention was determined by ESR. The results are shown in Table 15. The radical concentration in the ESR measurement immediately after the irradiation, i.e., within three minutes from the irradiation, was 2.03E+18 spin/g.

TABLE 15

| | Extrusion-molded article (g) | γ-Ray irradiation | | | | |
|---|---|---|---|---|---|---|
| | | Oxygen concentration (Vol %) | Temperature (° C.) | Absorbed dose (kGy) | Hydrogen concentration (Vol %) | Amount of hydrogen fed (Mass %) | Radical retention (%) |
| Example 15-1 | 0.3 | <0.1 | 20 to 28 | 35 | 99.99 | 2.97E+00 | 8.3 |
| Example 15-2 | 0.3 | <0.1 | 20 to 28 | 35 | 99.99 | 2.97E+00 | 4.7 |
| Example 15-3 | 0.3 | <0.1 | 20 to 28 | 35 | 99.99 | 2.97E+00 | 9.4 |
| Example 15-4 | 0.3 | <0.1 | 20 to 28 | 35 | 3.00 | 6.44E−02 | 79.9 |
| Example 15-5 | 0.3 | <0.1 | 20 to 28 | 35 | 3.00 | 6.00E−02 | 61.6 |
| Example 15-6 | 0.3 | <0.1 | 20 to 28 | 35 | 3.00 | 6.00E−02 | 95.0 |

Example 16-1

γ-Ray irradiation was performed as in Example 11-1, except that the high-molecular-weight PTFE fine powder (3) was used. Then, the bag without opening was maintained at 20° C. to 28° C. for nine days (naturally deactivating process), and thereafter the bag was opened.

The workpiece was exposed to the air at 20° C. to 28° C. for one day. A 20-g portion of the sample and deionized water in an amount of 5.50% by mass relative to the PTFE were weighed, and put into and sealed in a 0.1-L stainless steel cylindrical autoclave. Then, introduction of nitrogen gas into the autoclave and evacuation using an oil rotary pump were repeated three times and the pressure inside the autoclave was reduced (2.7 Pa).

The workpiece was heated at 150° C. for 18 hours using a forced convection oven (DRX620DA available from Advantec Co., Ltd.) (acceleratedly deactivating process), whereby a low-molecular-weight PTFE powder was obtained.

The physical properties of the resulting low-molecular-weight PTFE powder were determined as in Example 1. The results are shown in Table 16.

Example 16-2

A low-molecular-weight PTFE powder was obtained as in Example 16-1, except that deionized water added was 3.00% by mass.

The physical properties of the resulting low-molecular-weight PTFE powder were determined as in Example 1. The results are shown in Table 16.

Example 16-3

A low-molecular-weight PTFE powder was obtained as in Example 16-1, except that silica gel containing water in an amount of 13% by mass relative to the PTFE was added.

The physical properties of the resulting low-molecular-weight PTFE powder were determined as in Example 1. The results are shown in Table 16.

Example 16-4

A low-molecular-weight PTFE powder was obtained as in Example 16-1, except that 5.00% by mass deionized water was added and the inside of the autoclave was not purged with nitrogen.

The physical properties of the resulting low-molecular-weight PTFE powder were determined as in Example 1. The results are shown in Table 16.

TABLE 16

| | | Radical deactivation Naturally deactivating process | | | | | Radical deactivation Acceleratedly deactivating process (water vapor treatment) | | | |
|---|---|---|---|---|---|---|---|---|---|---|
| | γ-Ray irradiated article (g) | Oxygen concentration (Vol %) | Temperature (° C.) | Duration (Days) | Air exposure Temperature (° C.) | Duration (Days) | Oxygen concentration (Vol %) | Temperature (° C.) | Duration (h) | Water (Mass %) |
| Example 16-1 | 20 | <0.1 | 20 to 28 | 9 | 20 to 28 | 1 | <0.1 | 150 | 18 | 5.50E+00 |
| Example 16-2 | 20 | <0.1 | 20 to 28 | 9 | 20 to 28 | 1 | <0.1 | 150 | 18 | 3.00E+00 |
| Example 16-3 | 20 | <0.1 | 20 to 28 | 9 | 20 to 28 | 1 | <0.1 | 150 | 18 | 1.30E+01 |
| Example 16-4 | 20 | <0.1 | 20 to 28 | 9 | 20 to 28 | 1 | 21 | 150 | 18 | 5.00E+00 |

| | PFOA (ppb) | Melt viscosity × $10^3$ (Pa·s) | End carboxyl groups (grps/C × $10^6$) |
|---|---|---|---|
| Example 16-1 | <5 | 47 | 4 |
| Example 16-2 | <5 | 54 | 4 |
| Example 16-3 | <5 | 50 | 4 |
| Example 16-4 | <5 | 47 | 5 |

Example 17-1

In accordance with the production method disclosed in JP S63-146908 A and the production method disclosed in JP 2000-026614 A, respectively, a 5-g portions of ultrafine powdery PTFE (crystal melting point by DSC: 328° C.) and a 5-g portions of fine powdery crosslinked PTFE (crystal melting point by DSC: 320° C.) were each weighed using a weight balance and sealed into a Pyrex® glass test tube. Then, each test tube was connected to a glass vacuum line equipped with an oil diffusion pump and vacuum-evacuated (degree of vacuum: $3.5 \times 10^{-3}$ Pa or lower). The test tube was maintained in this state for 16 hours, and the glass was processed and sealed using a glass burner.

The test tube was irradiated with 20.1 kGy of cobalt-60 γ-rays. The irradiation conditions thereof included an average dose rate at the center of the sample of 5.03 kGy/h and an irradiation temperature of 25° C. Without opening, the test tube was left to stand at a room temperature of 24° C. for one day (naturally deactivating process). Then, the workpiece was heated at 150° C. for 24 hours using a forced convection oven (DRX620DA available from Advantec Co., Ltd.) (acceleratedly deactivating process). The test tube was cooled down to room temperature and opened, whereby a low-molecular-weight PTFE powder was obtained. The physical properties of the resulting sample were determined. The results are shown in Table 17.

Example 17-2

The same process was performed and a low-molecular-weight PTFE powder was obtained as in Example 17-1, except that the absorbed dose of cobalt-60 γ-rays was 40.2 kGy. The results are shown in Table 17.

Example 17-3

The same process was performed as in Example 17-1, except that a low-molecular-weight PTFE powder obtained by the production method disclosed in WO 2009/020187 was used as a material. The results are shown in Table 17.

Example 18-1

A 0.3-g portion of an extrusion-molded article of the high-molecular-weight PTFE fine powder (3) obtained as in Example 9-1 was used. The sample was sealed in a 0.1-L stainless steel autoclave and the vacuum evacuation was performed as in Example 9-1. The autoclave was irradiated with 36.0 kGy of cobalt-60 γ-rays at a room temperature of 24° C. while the vacuum state was maintained. The irradiation conditions thereof included an average dose rate at the center of the sample of 4.50 kGy/h. The autoclave after the irradiation and without opening was left to stand at a room temperature of 25° C. for one day while the vacuum state was maintained (naturally deactivating process). The extrusion-molded article was temporarily exposed to the air and again put into the autoclave. Introduction of nitrogen gas into the autoclave and evacuation using an oil rotary pump were repeated three times and the pressure inside the autoclave was reduced (2.7 Pa). Then, 3% hydrogen gas was introduced in an amount of 2.15% by mass relative to the PTFE. The workpiece was heated at 40° C. for 18 hours using a forced convection oven (DRX620DA available from Advantec Co., Ltd.) (acceleratedly deactivating process). The autoclave was opened, the molded article after the irradiation was taken out, and the radical ratios were determined by ESR. The results are shown in Table 18.

Example 18-2

The same process was performed as in Example 18-1, except that 99.99% hydrogen gas (amount: 6.44E-2% by mass) was used. The autoclave was opened, the molded article after the irradiation was taken out, and the radical ratios were determined by ESR. The results are shown in Table 18.

Comparative Example 6

The same process was performed as in Example 18-1, except that the heating with hydrogen gas was replaced by similar heating in the air. The results are shown in Table 18.

TABLE 18

| | Sample name | Peak M2/Peak A1 | Peak M2/Peak M3 |
|---|---|---|---|
| Example 18-1 | 3% Hydrogen | 5.26 | 0.50 |
| Example 18-2 | 99.99% Hydrogen | 4.09 | 0.43 |
| Comparative Example 6 | Heating in the air | 3.55 | 1.23 |

TABLE 17

| | Low-molecular-weight PTFE (g) | γ-Ray irradiation | | | Radical deactivation Naturally deactivating process | | | Radical deactivation Acceleratedly deactivating process | | | | End | |
|---|---|---|---|---|---|---|---|---|---|---|---|---|---|
| | | Oxygen concentration (Vol %) | Absorbed dose (kGy) | Deoxidants (pcs) | Oxygen concentration (Vol %) | Temperature (° C.) | Duration (Days) | Oxygen concentration (Vol %) | Temperature (° C.) | Duration (h) | PFOA (ppb) | Melt viscosity × $10^3$ (Pa·s) | carboxyl groups (grps/C × $10^6$) |
| Example 17-1 | 5 | <0.1 | 20 | 1 | <0.1 | 20 to 28 | 1 | <0.1 | 150 | 24 | <5 | 23 | 1 |
| Example 17-2 | 5 | <0.1 | 40 | 1 | <0.1 | 20 to 28 | 1 | <0.1 | 150 | 24 | <5 | 15 | 2 |
| Example 17-3 | 5 | <0.1 | 20 | 1 | <0.1 | 20 to 28 | 1 | <0.1 | 150 | 24 | <5 | 8 | 1 |

Example 19-1

A 200-g portion of the high-molecular-weight PTFE fine powder (3) was used and the vacuum evacuation was performed as in Example 11-1. The workpiece was irradiated with 400 kGy of cobalt-60 γ-rays at room temperature. The irradiation conditions thereof included an average dose rate at the center of the sample of 6.25 kGy/h. The sample after the irradiation and without exposure to the air was left to stand at a room temperature of 25° C. for two days while the vacuum state was maintained (naturally deactivating process). A 20-g portion of the extrusion-molded article was temporarily exposed to the air and put into a 0.1-L stainless steel autoclave. Introduction of nitrogen gas into the autoclave and evacuation using an oil rotary pump were repeated three times and the pressure inside the autoclave was reduced (2.7 Pa). Then, 3% hydrogen gas was introduced in an amount of 2.15% by mass relative to the PTFE. The workpiece was heated at 40° C. for 18 hours using a forced convection oven (DRX620DA available from Advantec Co., Ltd.) (acceleratedly deactivating process). The autoclave was opened, the sample was taken out, and the structure of the resulting low-molecular-weight PTFE was analyzed by $^{19}$F solid state MAS NMR. This resulted in clear detection of the hydrogen-atom-containing molecular structures such as —$CHF_2$ (around −140 ppm) and —CHF— and —$CFH_2$ (−215 ppm) and chemical structures of –$CF_2$—$CF(CF_3)$—$CF_2$— (around −71 ppm and around −114 ppm), molecular-chain-end —CF=CF—$CF_3$ (around −75 ppm and around −128 ppm), and —$CF(CF_3)_2$ (around −58 ppm).

Example 19-2

A low-molecular-weight PTFE powder was obtained as in Example 19-1, except that 99.99% hydrogen gas (amount: 6.44E-2% by mass) was used. The structure of the resulting low-molecular-weight PTFE was analyzed by $^{19}$F solid state MAS NMR. This resulted in clear detection of the hydrogen-atom-containing molecular structures such as —$CHF_2$ (around −140 ppm) and —CHF— and —$CFH_2$ (−215 ppm) and chemical structures —$CF_2$—$CF(CF_3)$—$CF_2$— (around −71 ppm and around −114 ppm), molecular-chain-end —CF=CF—$CF_3$ (around −75 ppm and around −128 ppm), and —$CF(CF_3)_2$ (around −58 ppm).

The invention claimed is:

1. A method for producing low-molecular-weight polytetrafluoroethylene having a melt viscosity at 380° C. of $1.0 \times 10^2$ to $7.0 \times 10^5$ Pa·s, the method comprising:
   (1) irradiating high-molecular-weight polytetrafluoroethylene with radiation in a substantially oxygen-free state and decomposing the high-molecular-weight polytetrafluoroethylene into a low-molecular-weight component, wherein the amount of C1-C20 saturated hydrocarbons, chlorinated products of C1-C18 saturated hydrocarbons, C1-C12 monohydric saturated alcohols, and C1-C13 saturated monocarboxylic acids is less than 0.1% by mass relative to the high-molecular-weight polytetrafluoroethylene; and
   (2) deactivating, in a substantially oxygen-free state, at least part of main-chain radicals and end radicals generated by the irradiation and providing the low-molecular-weight polytetrafluoroethylene.

2. A method for producing low-molecular-weight polytetrafluoroethylene having a melt viscosity at 380° C. of $1.0 \times 10^2$ to $7.0 \times 10^5$ Pa·s, the method comprising:
   (1) irradiating high-molecular-weight polytetrafluoroethylene with radiation in a substantially oxygen-free state and decomposing the high-molecular-weight polytetrafluoroethylene into a low-molecular-weight component, wherein the amount of C1-C20 saturated hydrocarbons, chlorinated products of C1-C18 saturated hydrocarbons, C1-C12 monohydric saturated alcohols, and C1-C13 saturated monocarboxylic acids is less than 0.1% by mass relative to the high-molecular-weight polytetrafluoroethylene; and
   (2a) warming or heating the low-molecular-weight component obtained in the step (1) at a temperature of not lower than a room temperature transition temperature (19° C. that is a $\beta_1$ dispersion temperature) of polytetrafluoroethylene in a substantially oxygen-free state and providing the low-molecular-weight polytetrafluoroethylene.

3. The production method according to claim 2, wherein the warming or heating in the step (2a) is performed at a temperature of 70° C. or higher.

4. The production method according to claim 2, wherein the warming or heating in the step (2a) is performed for 10 minutes or longer.

5. A method for producing low-molecular-weight polytetrafluoroethylene having a melt viscosity at 380° C. of $1.0 \times 10^2$ to $7.0 \times 10^5$ Pa·s, the method comprising:
   (1) irradiating high-molecular-weight polytetrafluoroethylene with radiation in a substantially oxygen-free state and decomposing the high-molecular-weight polytetrafluoroethylene into a low-molecular-weight component, wherein the amount of C1-C20 saturated hydrocarbons, chlorinated products of C1-C18 saturated hydrocarbons, C1-C12 monohydric saturated alcohols, and C1-C13 saturated monocarboxylic acids is less than 0.1% by mass relative to the high-molecular-weight polytetrafluoroethylene; and
   (2b) maintaining the low-molecular-weight component obtained in the step (1) in a substantially oxygen-free environment for five minutes or longer and providing the low-molecular-weight polytetrafluoroethylene.

6. The production method according to claim 5, wherein the maintaining in the step (2b) is performed for 10 hours or longer.

7. A method for producing low-molecular-weight polytetrafluoroethylene having a melt viscosity at 380° C. of $1.0 \times 10^2$ to $7.0 \times 10^5$ Pa·s, the method comprising:
   (1) irradiating high-molecular-weight polytetrafluoroethylene with radiation in a substantially oxygen-free state and decomposing the high-molecular-weight polytetrafluoroethylene into a low-molecular-weight component, wherein the amount of C1-C20 saturated hydrocarbons, chlorinated products of C1-C18 saturated hydrocarbons, C1-C12 monohydric saturated alcohols, and C1-C13 saturated monocarboxylic acids is less than 0.1% by mass relative to the high-molecular-weight polytetrafluoroethylene; and
   (2) deactivating, in a substantially oxygen-free state, at least part of main-chain radicals and end radicals generated by the irradiation and providing the low-molecular-weight polytetrafluoroethylene,
   the steps (1) and (2) being performed simultaneously.

8. The production method according to claim 1, wherein the radiation in the step (1) has a dose of 100 kGy or higher.

9. The production method according to claim 1, wherein the radiation in the step (1) has a dose of 100 to 1000 kGy.

10. The production method according to claim 1, wherein the radiation in the step (1) has a dose of 250 to 500 kGy.

11. The production method according to claim 1, wherein the step (1) is performed substantially in an absence of a halogen gas and an organic compound that contains at least one selected from the group consisting of a hydrogen atom and a chain-transferable halogen atom.

12. The production method according to claim 1, wherein the substantially oxygen-free state is maintained during a period from start of the step (1) to completion of the step (2).

13. The production method according to claim 1,
wherein an oxygen adsorbent is used to maintain an oxygen concentration at lower than 1.0 vol % in an atmosphere where the step (1), the step (2), or each of the steps (1) and (2) is performed.

14. The production method according to claim 1,
wherein the step (2) is performed in the presence of a radical-scavenging substance.

15. The production method according to claim 14,
wherein the radical-scavenging substance is a substance having an ability to generate a free hydrogen atom.

16. The production method according to claim 14,
wherein the radical-scavenging substance includes at least one selected from the group consisting of hydrogen gas, fluorine gas, chlorine gas, bromine gas, iodine gas, alkane gas, alkene gas, alkyne gas, fluoroalkanes, tetrafluoroethylene, carbon monooxide, nitrogen monooxide, nitrogen dioxide, water, amines, alcohols, and ketones.

17. The production method according to claim 14,
wherein the radical-scavenging substance is hydrogen gas.

18. The production method according to claim 14,
wherein the radical-scavenging substance is water.

19. The production method according to claim 14,
wherein the step (2) is performed in the presence of an oxygen adsorbent and the radical-scavenging substance is water generated from the oxygen adsorbent.

20. The production method according to claim 1, further comprising, before the step (1),
(3) providing a molded article in response to heating the high-molecular-weight polytetrafluoroethylene up to a temperature that is not lower than a primary melting point thereof,
the molded article having a specific gravity of 1.0 g/cm$^3$ or higher.

21. A low-molecular-weight polytetrafluoroethylene
having a melt viscosity at 380° C. of $1.0 \times 10^2$ to $7.0 \times 10^5$ Pa·s,
exhibiting peaks that are obtainable by electron spin resonance measurement in an air and that satisfy the following relational expressions (1) and (2), and containing less than 25 ppb by mass of perfluorooctanoic acid and salts thereof,
the relational expression (1) being Peak M2/Peak A1≥1.0,
wherein Peak M2 represents an absolute value of a negative peak intensity that corresponds to a peroxy radical scavenged on a molecular-chain end of the low-molecular-weight polytetrafluoroethylene; and Peak A1 represents an absolute value of a negative peak intensity that corresponds to an alkyl peroxy radical scavenged on a main chain of the low-molecular-weight polytetrafluoroethylene,
the relational expression (2) being Peak M2/Peak M3<1.0,
wherein Peak M2 represents the absolute value of the negative peak intensity that corresponds to a peroxy radical scavenged on a molecular-chain end of the low-molecular-weight polytetrafluoroethylene; and Peak M3 represents an absolute value of a positive peak intensity that corresponds to a peroxy radical scavenged on a molecular-chain end of the low-molecular-weight polytetrafluoroethylene.

22. A low-molecular-weight polytetrafluoroethylene comprising:
at least one hydrogen-atom-containing molecular structure selected from the group consisting of =CHF, —CHF—, —CH$_2$F, —CHF$_2$, and —CH$_3$;
CF$_3$— at a molecular-chain end; and
at least one double-bond-containing molecular structure selected from the group consisting of —CF=CF—, —CF=CF$_2$, and —CF=CF—CF$_3$,
the low-molecular-weight polytetrafluoroethylene having a melt viscosity at 380° C. of $1.0 \times 10^2$ to $7.0 \times 10^5$ Pa·s and containing less than 25 ppb by mass of perfluorooctanoic acid and salts thereof.

23. A low-molecular-weight polytetrafluoroethylene comprising:
at least one molecular structure selected from the group consisting of —CF$_2$CF(CF$_3$)CF$_2$— and —CF(CF$_3$)$_2$;
CF$_3$— at a molecular-chain end; and
at least one double-bond-containing molecular structure selected from the group consisting of —CF=CF—, —CF=CF$_2$, and —CF=CF—CF$_3$,
the low-molecular-weight polytetrafluoroethylene having a melt viscosity at 380° C. of $1.0 \times 10^2$ to $7.0 \times 10^5$ Pa·s and containing less than 25 ppb by mass of perfluorooctanoic acid and salts thereof.

24. A low-molecular-weight polytetrafluoroethylene obtainable by the production method according to claim 1,
wherein the low-molecular-weight polytetrafluoroethylene contains five or less carboxyl groups at molecular-chain ends per 10$^6$ main-chain carbon atoms.

* * * * *